US012698240B2

(12) United States Patent (10) Patent No.: US 12,698,240 B2

Walker et al. (45) Date of Patent: Aug. 4, 2026

(54) PLASMA RESISTANT YTTRIUM ALUMINUM OXIDE BODY

(71) Applicant: Heraeus Covantics North America LLC, Chandler, AZ (US)

(72) Inventors: Luke Walker, Chandler, AZ (US); Saurav Bista, Chandler, AZ (US); Matthew Joseph Donelon, Chandler, AZ (US); Steven Roger Kennedy, Chandler, AZ (US)

(73) Assignee: Heraeus Covantics North America LLC, Chandler, AZ (US)

( * ) Notice: Subject to any disclaimer, the term of this patent is extended or adjusted under 35 U.S.C. 154(b) by 1055 days.

(21) Appl. No.: 17/776,043

(22) PCT Filed: Nov. 17, 2020

(86) PCT No.: PCT/US2020/060918

§ 371 (c)(1),
(2) Date: May 11, 2022

(87) PCT Pub. No.: WO2021/141676

PCT Pub. Date: Jul. 15, 2021

(65) Prior Publication Data

US 2022/0388909 A1 Dec. 8, 2022

Related U.S. Application Data

(60) Provisional application No. 63/074,771, filed on Sep. 4, 2020, provisional application No. 62/936,821, filed on Nov. 18, 2019.

(51) Int. Cl.
| | |
|---|---|
| *C04B 35/44* | (2006.01) |
| *C04B 35/626* | (2006.01) |
| *C04B 41/00* | (2006.01) |

(52) U.S. Cl.
CPC ........ *C04B 35/44* (2013.01); *C04B 35/62645* (2013.01); *C04B 41/0081* (2013.01);
(Continued)

(58) Field of Classification Search
None
See application file for complete search history.

(56) References Cited

U.S. PATENT DOCUMENTS

| | | |
|---|---|---|
| 5,798,016 A | 8/1998 | Oehrlein et al. |
| 5,911,852 A | 6/1999 | Katayama et al. |
| | (Continued) | |

FOREIGN PATENT DOCUMENTS

| | | | | |
|---|---|---|---|---|
| JP | 2001097768 A | * | 4/2001 | ............ C04B 35/44 |
| JP | 20010097768 | | 4/2001 | |
| | (Continued) | | | |

OTHER PUBLICATIONS

Machine Translation of JP-2010126430-A ("Yoshida") (Year: 2010).*
(Continued)

*Primary Examiner* — Amber R Orlando
*Assistant Examiner* — Paul Alan Forsyth
(74) *Attorney, Agent, or Firm* — Dicke, Billig & Czaja, PLLC

(57) ABSTRACT

Disclosed herein is a sintered ceramic body comprising from 90% to 99.9% by volume of polycrystalline yttrium aluminum garnet (YAG) as measured using XRD and image processing methods and a volumetric porosity of from 0.1 to 4% as calculated from density measurements performed in accordance with ASTM B962-17. The sintered ceramic body may have a total purity of 99.99% and greater and a grain size of from 0.3 to 8 μm. A method of making the sintered ceramic body is also disclosed.

11 Claims, 33 Drawing Sheets

(52) U.S. Cl.
CPC ................. *C04B 2235/3217* (2013.01); *C04B 2235/3222* (2013.01); *C04B 2235/3225* (2013.01); *C04B 2235/662* (2013.01); *C04B 2235/80* (2013.01)

(56) References Cited

U.S. PATENT DOCUMENTS

| | | | |
|---|---|---|---|
| 6,123,791 | A | 9/2000 | Han et al. |
| 6,352,611 | B1 | 3/2002 | Han et al. |
| 6,447,937 | B1 * | 9/2002 | Murakawa .............. C04B 35/18 |
| | | | 501/153 |
| 7,232,781 | B2 | 6/2007 | Ishitobi et al. |
| 9,790,410 | B2 | 10/2017 | Boden et al. |
| 11,434,143 | B2 | 9/2022 | Makoto et al. |
| 11,613,502 | B2 | 3/2023 | Bartel et al. |
| 2003/0049499 | A1 * | 3/2003 | Murakawa .............. C04B 35/44 |
| | | | 428/697 |
| 2004/0109808 | A1 * | 6/2004 | Lee ......................... C01F 17/34 |
| | | | 501/154 |
| 2015/0156008 | A1 | 6/2015 | Wang et al. |
| 2016/0257618 | A1 * | 9/2016 | Jordan ................... C04B 35/505 |
| 2017/0250057 | A1 * | 8/2017 | Simpson ............. C23C 16/4404 |

FOREIGN PATENT DOCUMENTS

| | | | | |
|---|---|---|---|---|
| JP | 2010-126430 | 6/2010 | | |
| JP | 2010126430 A * | 6/2010 | ............. | C04B 35/44 |
| WO | 2019/187287 | 10/2019 | | |

OTHER PUBLICATIONS

Machine Translation of JP-2001097768-A ("Kakita") (Year: 2001).*

Sellappan, P., et al., "Synthesis of Bulk, Dense, Nanocrystalline Yttrium Aluminum Garnet from Amorphous Powders," J. American Ceramic Society 90(11) [2007]: 3638-3641. https://doi.org/10.1111/j.1551-2916.2007.01913.x (Year: 2007).*

Luan Qi, et al. Yttrium Aluminum Garnet (YAG) Ceramics prepared by Spark Plasma Sintering (SPS), Journal of Functional Materials and Devices, vol. 12, Editing 2, pp. 113-116, Apr. 30, 2006.

International Search Report and Written Opinion mailed Sep. 6, 2021 as the International Searching Authority for counterpart international patent application No. PCT/US2020/060918.

Patel et al., "Mechanisms of Nonstoichiometry in Y3A15012", Applied Physics Letters, Lett. 93, 191902 (2008).

* cited by examiner

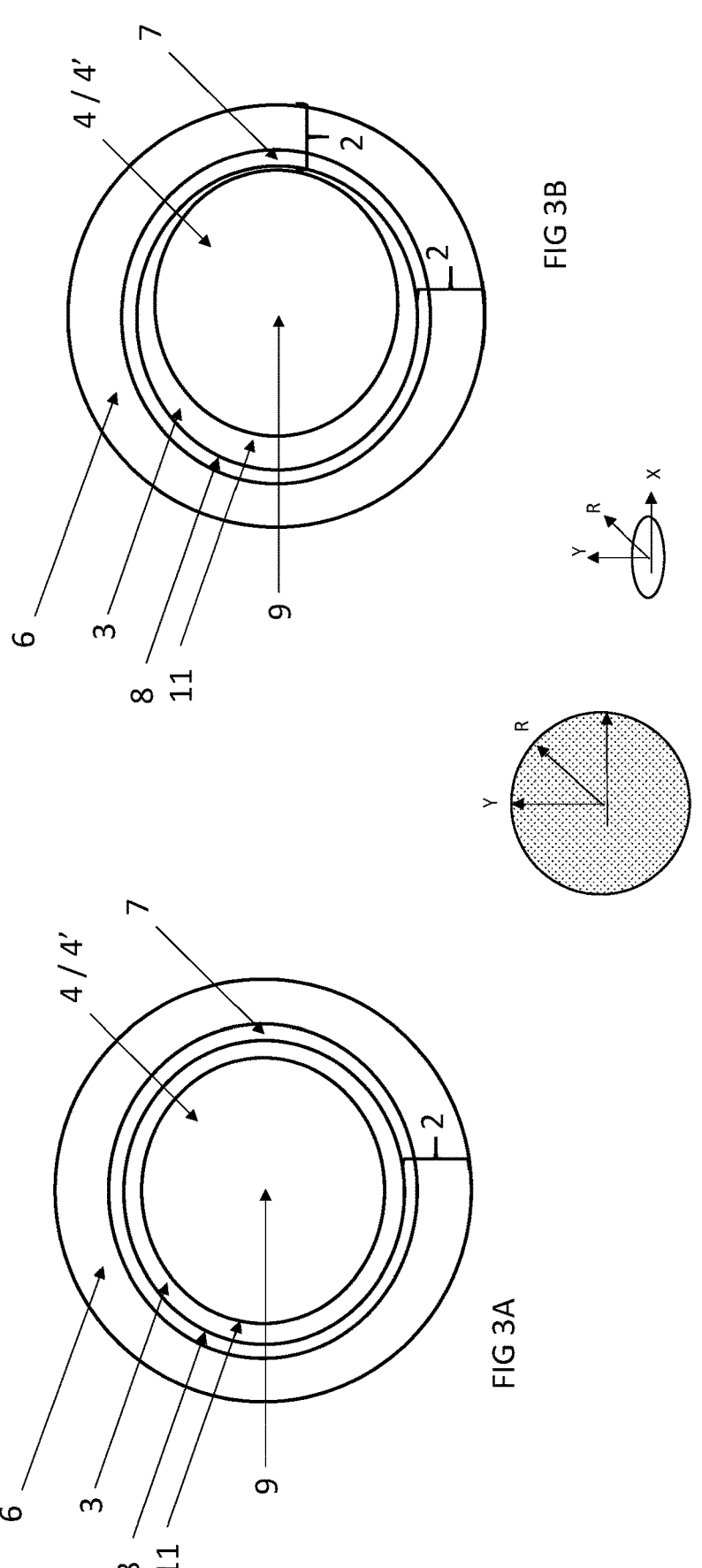

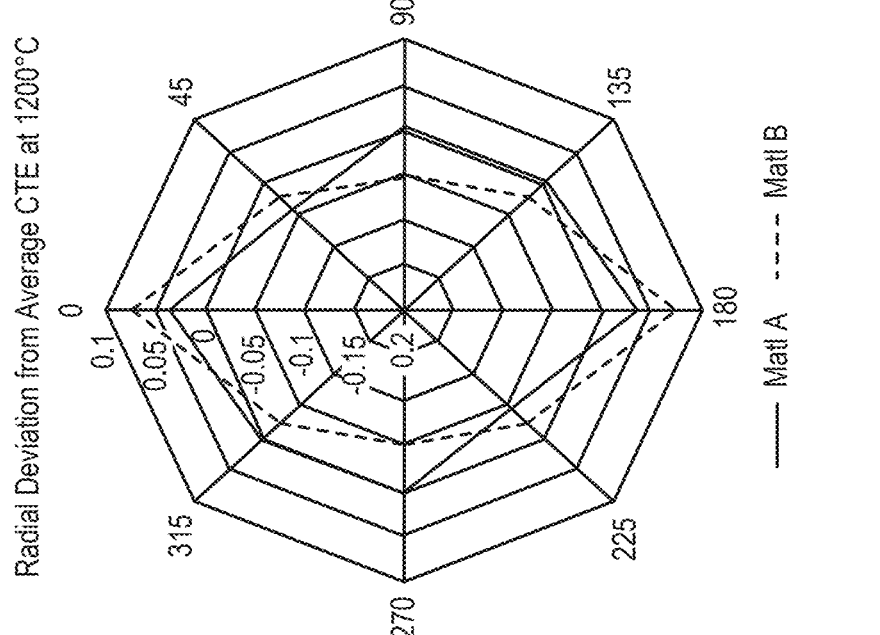
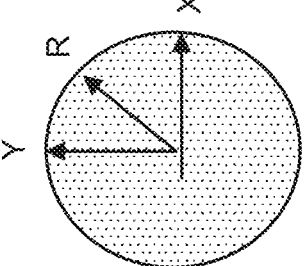
FIG. 4

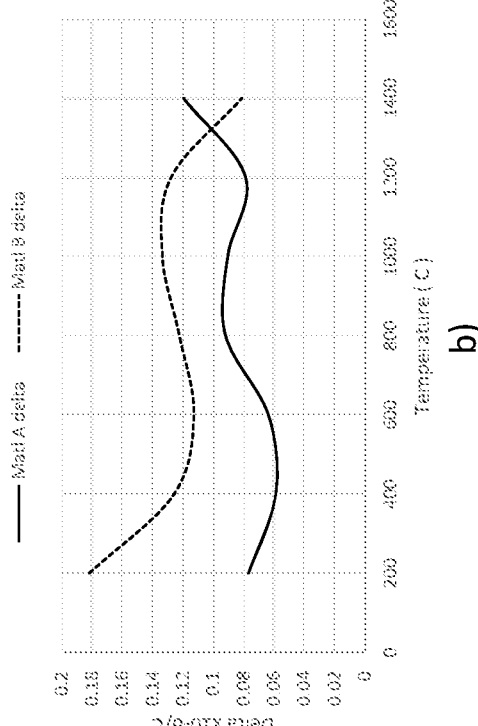
b)
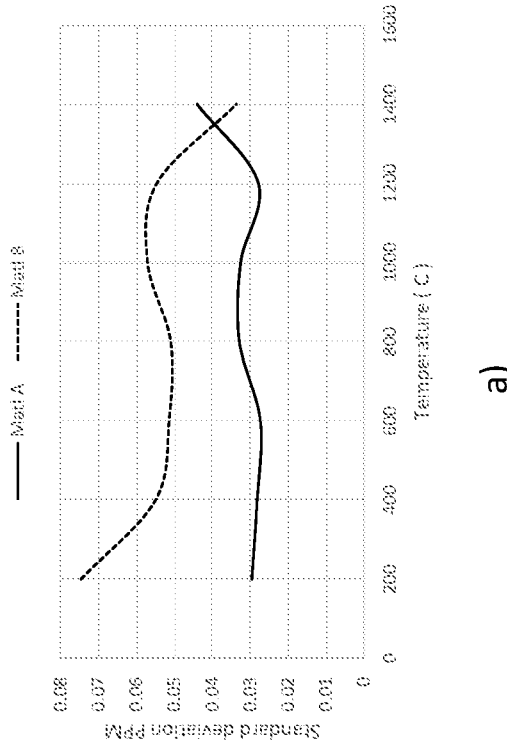
a)
FIG. 5

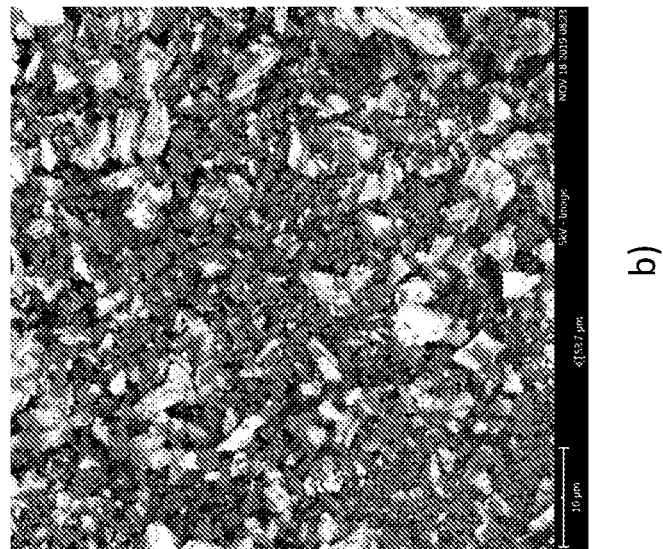
b)
Fig. 16
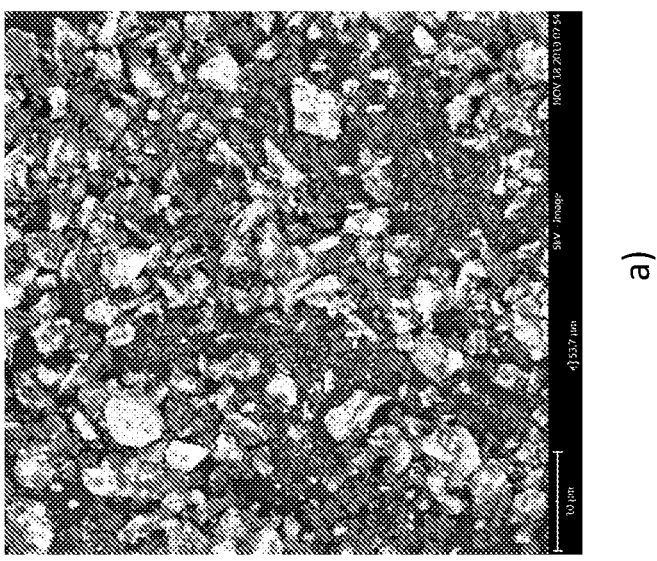
a)

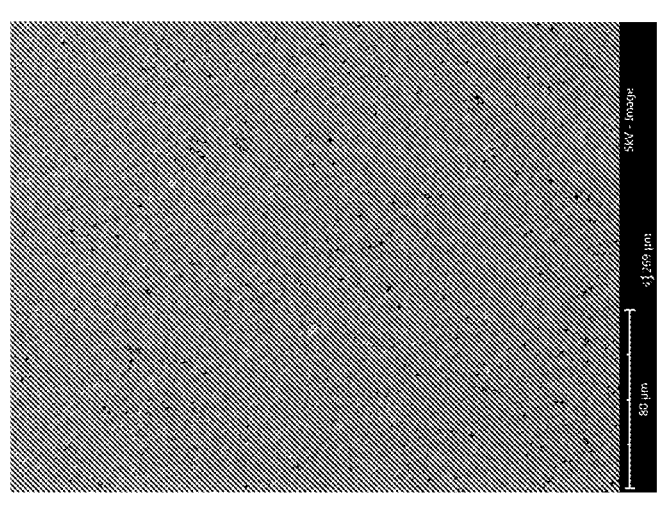
Example 4
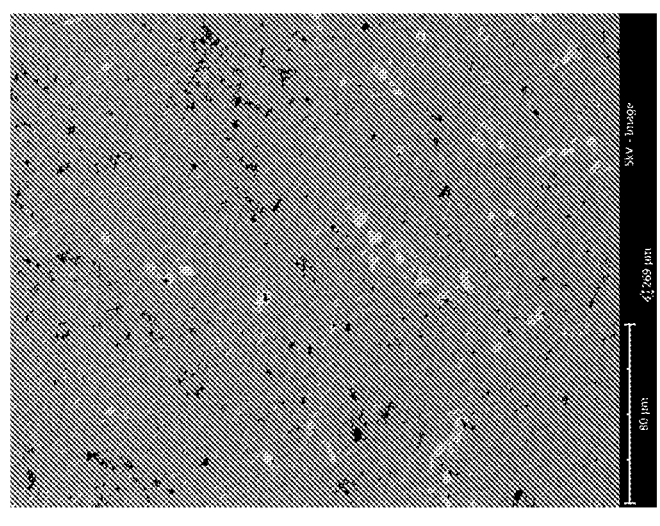
Example 3
FIG. 19
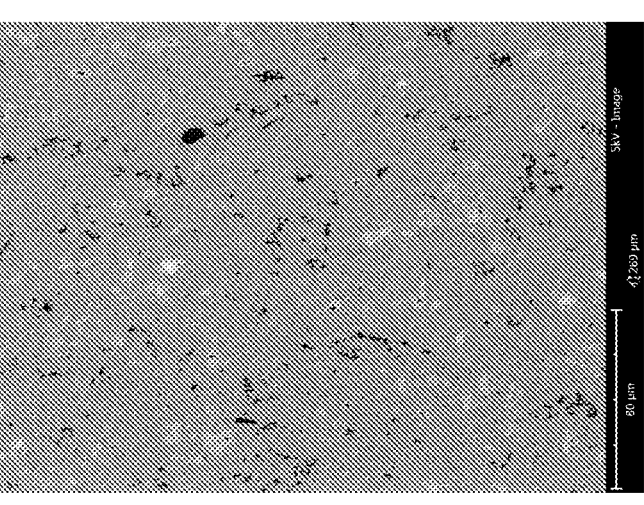
Example 2

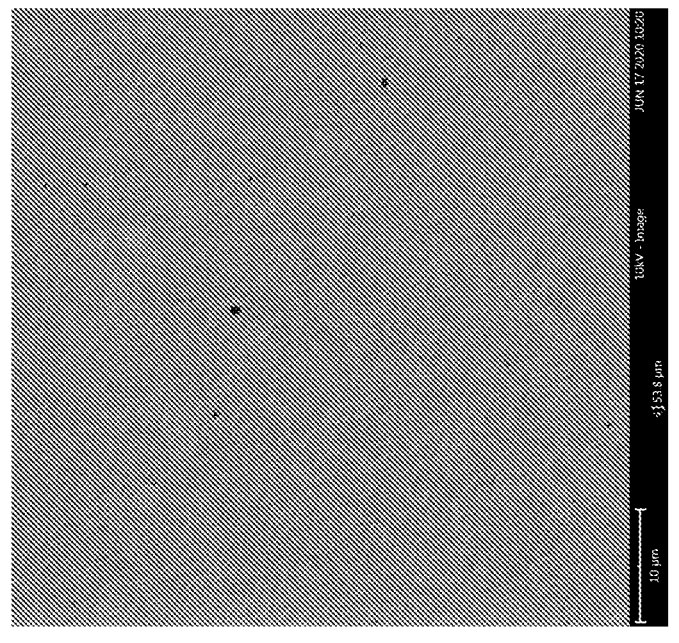
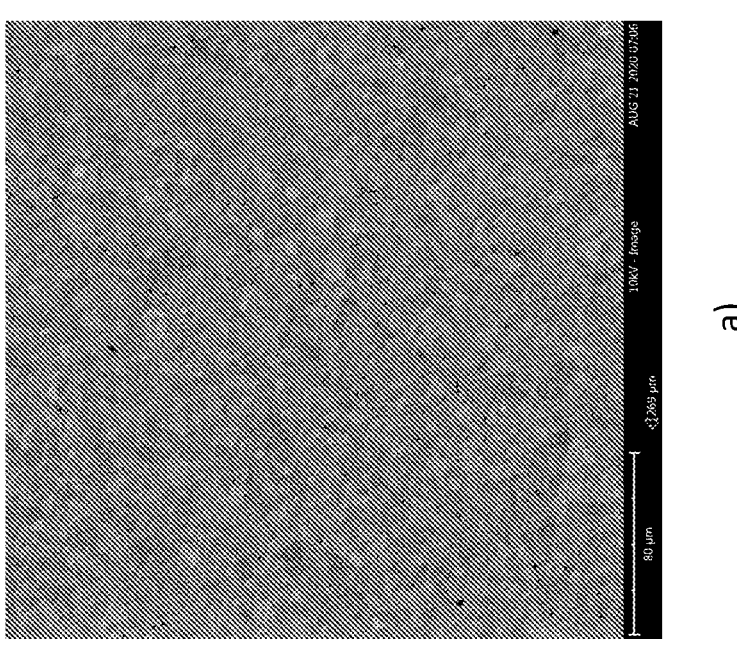
FIG. 24

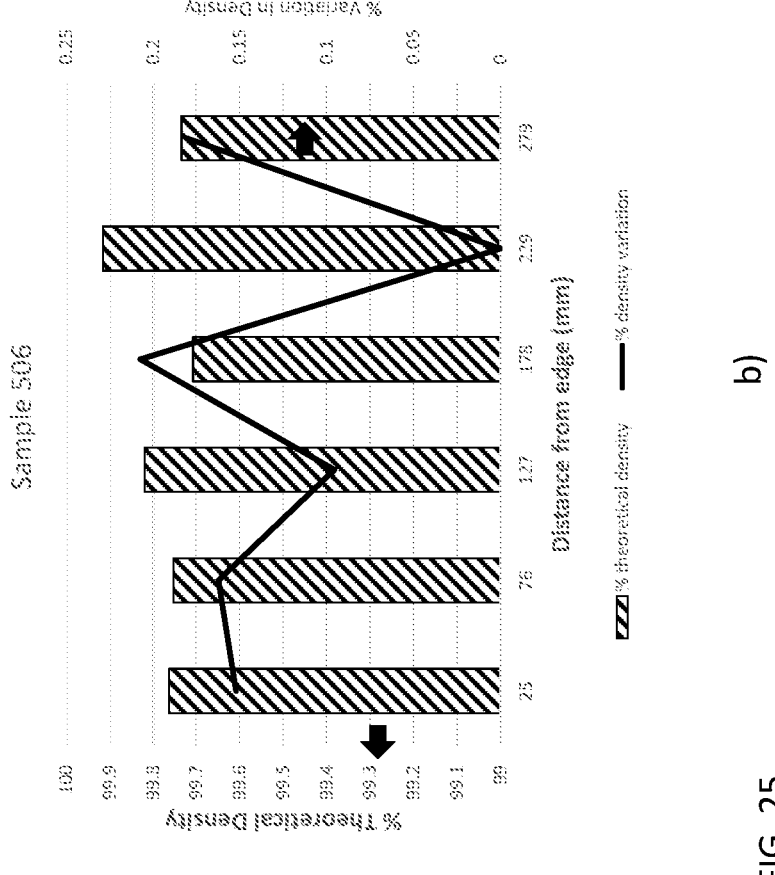
b)
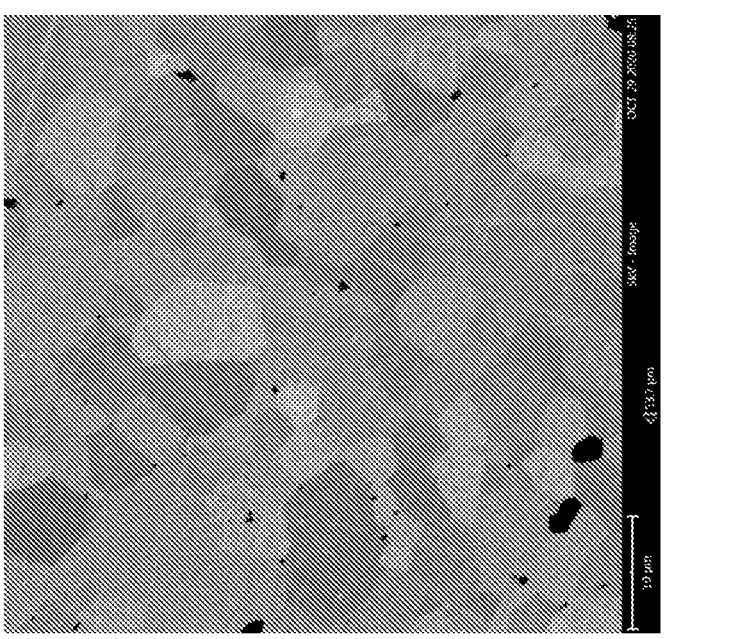
a)
FIG. 25 a)          b)

b)
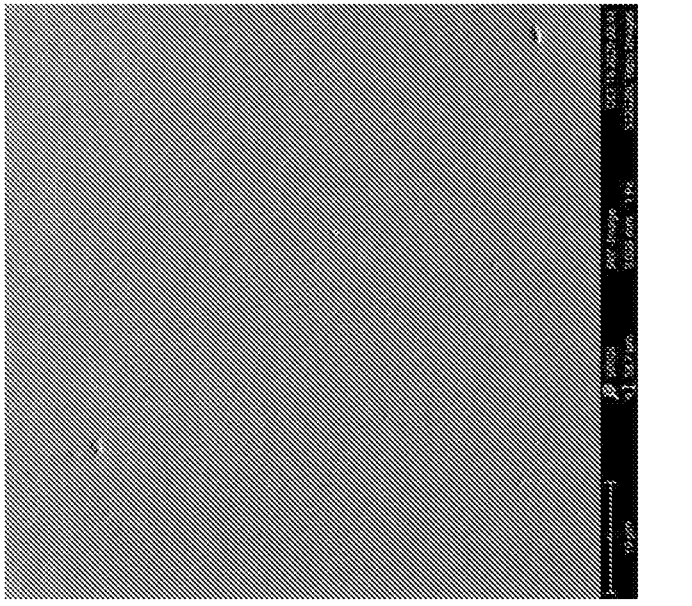
a)
FIG. 27

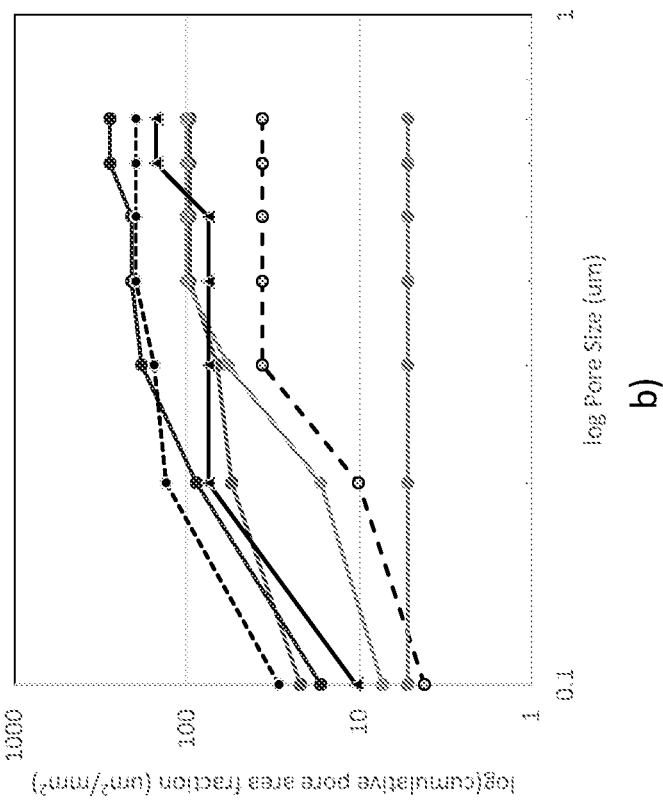
b)
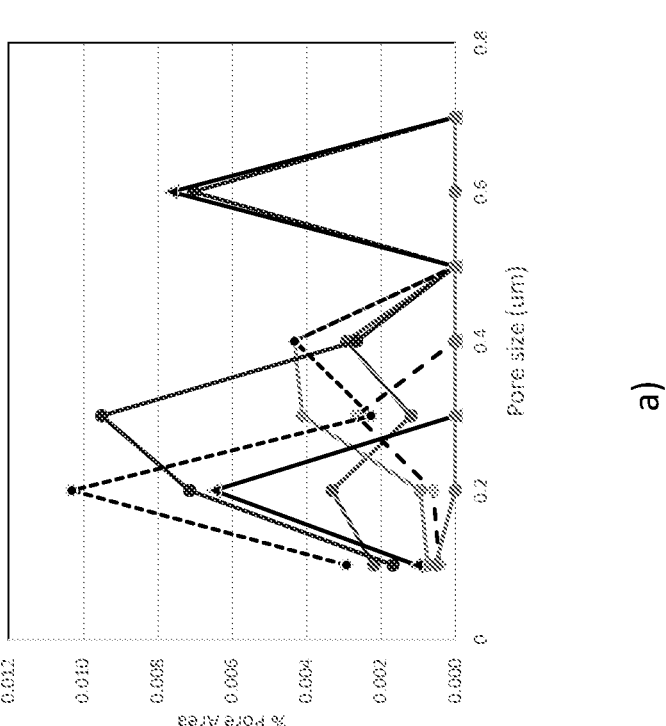
a)
FIG. 28

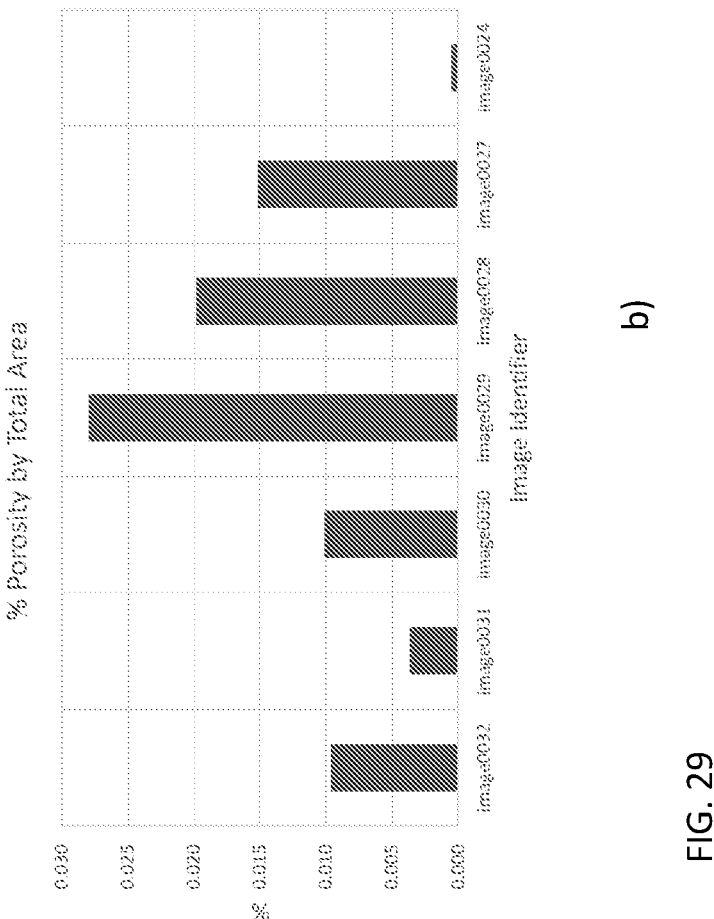
b)
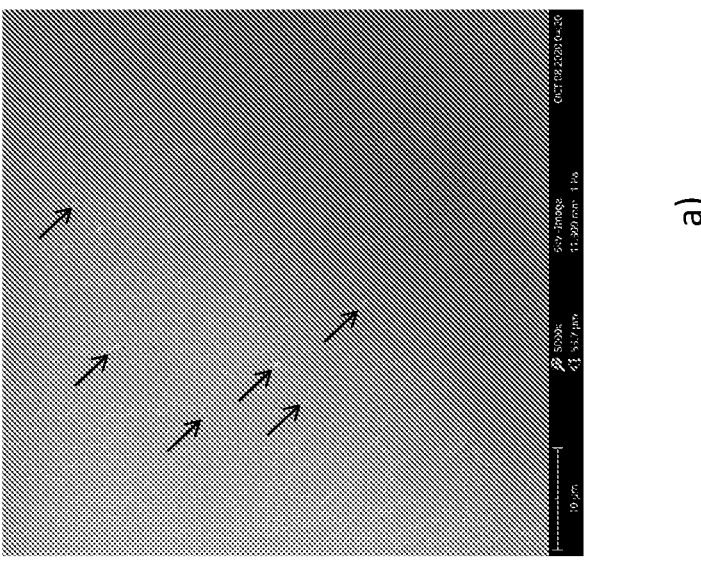
a)
FIG. 29

PLASMA RESISTANT YTTRIUM ALUMINUM OXIDE BODY

FIELD

This disclosure relates to a sintered ceramic body comprising highly crystalline phase pure (>98% by volume) polycrystalline YAG ($Y_3Al_5O_{12}$, garnet phase) having high purity, high density and low volumetric porosity.

The disclosure also relates to a sintered ceramic body made of one or more forms of yttrium aluminum oxides, to include $Y_3Al_5O_{12}$ (YAG, garnet phase), $YAlO_3$ (YAP, perovskite phase), and $Y_4Al_2O_9$ (YAM, monoclinic phase), and optionally aluminum oxide ($Al_2O_3$) and/or yttrium oxide ($Y_2O_3$) in amounts of 2% and less by volume which has high purity, high density and low volumetric porosity.

The disclosure also relates to a sintered ceramic body comprising phase pure (>98% by volume) $Y_3Al_5O_{12}$ (YAG, garnet phase) further comprising an aluminum oxide ($Al_2O_3$) phase and/or a yttrium oxide ($Y_2O_3$) phase in amounts of 2% and less by volume which has high purity, high density and low volumetric porosity.

The properties of high density, low volumetric porosity and high purity translate into exceptional etch resistance when used as a component in a plasma etch chamber. Moreover, the present disclosure provides a process for making the sintered ceramic body.

BACKGROUND

Semiconductor processing requires the use of halogen-based gases as well as oxygen and other gases in combination with high electric and magnetic fields to create a plasma etch environment. This plasma etch environment is made within vacuum chambers for etching materials on semiconductor substrates. The harsh plasma etch environment necessitates the use of highly corrosion resistant materials for chamber components. These chambers include component parts such as disks or windows, liners, gas injectors, rings, and cylinders that confine the plasma over the wafer being processed. These components have been formed from materials that provide resistance to corrosion and erosion in plasma environments and have been described, for example, in U.S. Pat. Nos. 5,798,016, 5,911,852, 6,123,791 and 6,352,611. However, these parts used in plasma processing chambers are continuously attacked by the plasma and, consequently, corrode, erode and roughen on the surfaces of the chamber parts that are exposed to the plasma. This corrosion and erosion contribute to wafer level contamination through the release of particles from the component surface into the chamber, resulting in semiconductor device yield loss.

Rare earth oxides, and among those in particular YAG ($Y_3Al_5O_{12}$, garnet phase) and the family of yttrium aluminum oxides such as YAG, YAP and YAM are known to have a wide range of technological and industrial applications. YAG having a cubic, garnet crystallographic phase has received much attention due to applications such as host materials for solid-state lasers, transparent armors, ballistic window materials and it's remarkable mechanical, thermal and optical features. For laser applications in particular, single crystal YAG is a requirement thus much effort has been expended to fabricate single crystal YAG. YAG is also known to be very chemically inert and exhibit high halogen-based plasma corrosion and erosion resistance.

However, there are several drawbacks to the use of rare earth oxides, and especially the use of yttrium aluminum oxide having cubic garnet (YAG) crystallographic structure.

Yttrium aluminum oxides are known to be difficult to sinter to the high densities required with traditional methods, resulting in significant volumetric porosity remaining in the final part. Residual porosity, and thereby reduced density, leads to accelerated corrosion during plasma etch processes, deteriorating etch performance in the component, as well as decreasing mechanical strength. Sintering the family of yttrium aluminum oxides typically requires high temperatures of about 1600° C. and higher for prolonged periods of time such as 8 hours or more. The high temperatures and lengthy sintering durations leads to exaggerated grain growth, adversely affecting mechanical strength of solid yttrium aluminum oxide bodies. In order to promote densification of the yttrium aluminum oxide compounds, and in particular those of YAG composition to form sintered bodies for use as etch chamber components, sintering aids are frequently used to lower sintering temperatures. However, the addition of sintering aids effectively degrades the corrosion and erosion resistance of the yttrium aluminum oxide materials and increases the probability of impurity contamination at a semiconductor device level during use in chambers. Thus, a highly pure, high density body of yttrium aluminum oxide, and in particular a body having the cubic garnet crystallographic phase (YAG, $Y_3Al_5O_{12}$) is desirable.

Films or coatings of yttrium aluminum oxides have been known to be deposited atop a base or substrate formed of a different material which is lower in price and higher in strength than yttrium aluminum oxides. Such yttrium aluminum oxide films have been made through several methods. However, these methods are limited in film thicknesses that may be produced, displaying poor adhesion between film and substrate, and high levels of volumetric porosity, resulting in the shedding of particles into the process chamber.

As semiconductor device geometries shrink to the nanometer scale, temperature control becomes increasingly important to minimize process yield loss. This variation in temperature within the processing chamber affects control over critical dimensions of nanometer scale features, adversely affecting device yields. Material selection for chamber components having low dielectric loss, such as for example less than $1\times10^{-4}$, may be desirable to prevent generation of heat, resulting in temperature nonuniformity within the chamber. Dielectric loss may be affected by grain size, purity and use of dopants and/or sintering aids in the material, among other factors. The use of sintering aids and extended sintering conditions may result in larger grain size, lower purity materials which may not provide the low loss tangents necessary for application to high frequency chamber processes common in the industry, minimal particle generation and the high mechanical strength for fabrication of large component sizes.

In particular, formation of the YAG phase of the family of yttrium aluminum oxide phases is preferable due to its cubic crystallographic structure and, as a result, isotropic material properties. As such, its material properties do not vary based upon crystallographic plane or direction thus the cubic, garnet form, YAG, is preferable for its consistent material properties and resultant predictable performance in a number of applications, in particular as applies to use as a corrosion resistant component in a semiconductor processing chamber. However, fabrication of polycrystalline YAG yttrium aluminum oxide ceramic bodies which are highly phase pure (>90% by volume) poses difficulty and often other crystalline phases may be present.

YAG according to the established yttria/alumina phase diagram may exist as a line compound in accordance with the stoichiometric composition, and thus YAG forms in a phase pure sintered body across a very narrow compositional range. Variations in composition during powder batching and processing from that required to form stoichiometric YAG often may result in other crystallographic phases present in the sintered body, making formation of highly phase pure YAG challenging.

YAG formed as a film or coating or sintered body may have low hardness values owing to low densities and often mixed phase composition. These low hardness values result in materials which are susceptible to erosion or spalling from ion bombardment of component surfaces through use of inert plasma gases such as argon used as a process gas during semiconductor processing.

Attempts to fabricate monolithic, phase pure ceramic bodies for corrosion resistant components of large dimension made from rare earth oxides such as YAG have been limited in success. Solid body, phase pure and high chemical purity components having diameters of about 100 mm and greater which may be handled and used as a part of a chamber without breakage or cracking are difficult to produce beyond a laboratory scale. This is owing to the typically low densities (for example of 95% and less of theoretical density of YAG) of YAG bodies at larger dimensions. Attempts thus far to prepare large, phase pure yttrium aluminum oxide components comprising YAG have resulted in high porosity and correspondingly low density, mixed crystalline phases, breakage and an inferior quality for their use in corrosion resistant applications. There are currently no economically feasible methods of making high purity, crystalline-phase pure YAG sintered bodies or components of diameter about 100 mm to 622 mm and greater for use in semiconductor etch and deposition applications.

As a result, there is a need for a sintered ceramic body having uniform and high density, low porosity and high purity comprising phase pure YAG, providing enhanced plasma resistance to corrosion and erosion under plasma etch and deposition conditions and a commercially suitable method of production, particularly suited to fabrication of components of large dimension.

SUMMARY

These and other needs are addressed by the various embodiments, aspects and configurations as disclosed herein:

Embodiment 1. A sintered ceramic body comprising from 90 to 99.9% by volume of polycrystalline yttrium aluminum garnet (YAG) as measured using XRD and image processing methods and a volumetric porosity of from 0.1 to 4% as calculated from density measurements performed in accordance with ASTM B962-17.

Embodiment 2. The sintered ceramic body of embodiment 1 wherein the volumetric porosity is from 0.1 to 3%.

Embodiment 3. The sintered ceramic body as in any one of the preceding embodiments, wherein the volumetric porosity is from 0.1 to 2%.

Embodiment 4. The sintered ceramic body as in any one of the preceding embodiments, wherein the volumetric porosity is from 0.1 to 1%.

Embodiment 5. The sintered ceramic body as in any one of the preceding embodiments, wherein the volumetric porosity is from 0.1 to 0.75%.

Embodiment 6. The sintered ceramic body as in any one of the preceding embodiments, wherein the volumetric porosity is from 0.1 to 0.5%.

Embodiment 7. The sintered ceramic body as in any one of the preceding embodiments, wherein the sintered ceramic body comprises pores having a size of from 0.1 to 5 um as measured using SEM and image processing methods.

Embodiment 8. The sintered ceramic body as in any one of the preceding embodiments, wherein the sintered ceramic body comprises pores having a size of from 0.1 to 4 um as measured using SEM and image processing methods.

Embodiment 9. The sintered ceramic body as in any one of the preceding embodiments, wherein the sintered ceramic body comprises pores having a size of from 0.1 to 3 um as measured using SEM and image processing methods.

Embodiment 10. The sintered ceramic body as in any one of the preceding embodiments, wherein the sintered ceramic body comprises pores having a size of from 0.1 to 2 um as measured using SEM and image processing methods.

Embodiment 11. The sintered ceramic body as in any one of the preceding embodiments, wherein the sintered ceramic body comprises pores having a size of from 0.1 to 1 um as measured using SEM and image processing methods.

Embodiment 12. The sintered ceramic body as in any one of the preceding embodiments, wherein the sintered ceramic body comprises pores having a size of from 0.1 to 0.7 um as measured using SEM and image processing methods.

Embodiment 13. The sintered ceramic body as in any one of the preceding embodiments, wherein the polycrystalline yttrium aluminum garnet is present in an amount of from 90 to 99.8% by volume.

Embodiment 14. The sintered ceramic body as in any one of the preceding embodiments, wherein the polycrystalline yttrium aluminum garnet is present in an amount of from 90 to 99.6% by volume.

Embodiment 15. The sintered ceramic body as in any one of the preceding embodiments, wherein the polycrystalline yttrium aluminum garnet is present in an amount of from 90 to 99.4% by volume.

Embodiment 16. The sintered ceramic body as in any one of the preceding embodiments, wherein the polycrystalline yttrium aluminum garnet is present in an amount of from 93 to 99.9% by volume.

Embodiment 17. The sintered ceramic body as in any one of the preceding embodiments, wherein the polycrystalline yttrium aluminum garnet is present in an amount of from 93 to 99.8% by volume.

Embodiment 18. The sintered ceramic body as in any one of the preceding embodiments, wherein the polycrystalline yttrium aluminum garnet is present in an amount of from 93 to 99.6% by volume.

Embodiment 19. The sintered ceramic body as in any one of the preceding embodiments, wherein the polycrystalline yttrium aluminum garnet is present in an amount of from 93 to 99.4% by volume.

Embodiment 20. The sintered ceramic body as in any one of the preceding embodiments, having a purity of 99.995% or higher as measured using ICPMS methods.

Embodiment 21. The sintered ceramic body as in any one of the preceding embodiments, wherein the purity is 99.999% or higher.

Embodiment 22. The sintered ceramic body as in any one of the preceding embodiments, having an impurity content of 50 ppm or less relative to the total sintered body mass as measured using ICPMS methods.

Embodiment 23. The sintered ceramic body as in any one of the preceding embodiments, wherein the total impurity content is 25 ppm or less relative to the total sintered body mass as measured using ICPMS methods.

Embodiment 24. The sintered ceramic body as in any one of the preceding embodiments, wherein the total impurity content is 10 ppm or less relative to the total sintered body mass as measured using ICPMS methods.

Embodiment 25. The sintered ceramic body as in any one of the preceding embodiments, wherein the total impurity content is 5 ppm or less relative to the total sintered body mass as measured using ICPMS methods.

Embodiment 26. The sintered ceramic body as in any one of the preceding embodiments, wherein the sintered ceramic body is free of sintering aids.

Embodiment 27. The sintered ceramic body as in any one of the preceding embodiments, wherein the sintered ceramic body is free of dopants.

Embodiment 28. The sintered ceramic body as in any one of the preceding embodiments, wherein the sintered ceramic body comprises silica in an amount of about 14 ppm relative to the total mass of the sintered ceramic body as measured using ICPMS methods as disclosed herein.

Embodiment 29. The sintered ceramic body as in any one of the preceding embodiments, wherein the sintered ceramic body further comprises at least one oxide selected from the group consisting of yttrium oxide and aluminum oxide and combinations thereof, wherein the at least one oxide is present in an amount of from 0.1 to 2% by volume.

Embodiment 30. The sintered ceramic body as in any one of the preceding embodiments, wherein the sintered ceramic body comprises at least one oxide selected from the group consisting of yttrium oxide and aluminum oxide and combinations thereof, wherein the at least one oxide is present in an amount of from 0.1 to 1% by volume.

Embodiment 31. The sintered ceramic body as in any one of the preceding embodiments, further comprising at least one crystalline phase selected from the group consisting of YAP and YAM and combinations thereof, wherein the at least one crystalline phase is present in an amount of from 0.1 to 2% by volume.

Embodiment 32. The sintered ceramic body as in any one of the preceding embodiments, further comprising at least one crystalline phase selected from the group consisting of YAP and YAM and combinations thereof, wherein the at least one crystalline phase is present in an amount of from 0.1 to 1% by volume.

Embodiment 33. The sintered ceramic body as in any one of the preceding embodiments, having an average hardness of from 13.0 to 15.0 GPa using an applied load of 0.2 kgf as measured in accordance with ASTM Standard C1327, wherein the average hardness is calculated from 8 measurements.

Embodiment 34. The sintered ceramic body as in any one of the preceding embodiments, having an average hardness of from 13.5 to 14.5 GPa using an applied load of 0.2 kgf as measured in accordance with ASTM Standard C1327 wherein the average hardness is calculated from 8 measurements.

Embodiment 35. The sintered ceramic body as in any one of the preceding embodiments, having a grain size of from 0.4 to 8 μm as measured according to ASTM E112-2010.

Embodiment 36. The sintered ceramic body as in any one of the preceding embodiments, having a d90 grain size of from 1.5 to 3.5 μm as measured according to ASTM E112-2010.

Embodiment 37. The sintered ceramic body as in any one of the preceding embodiments, having an average grain size of from 1 to 3 μm as measured according to ASTM E112-2010.

Embodiment 38. The sintered ceramic body as in any one of the preceding embodiments, having an average grain size of from 1 to 2.5 μm as measured according to ASTM E112-2010.

Embodiment 39. The sintered ceramic body as in any one of the preceding embodiments, having a 4-point flexural strength of from 335 to 440 MPa as measured in accordance with ASTM C1161-13.

Embodiment 40. The sintered ceramic body as in any one of the preceding embodiments, having an average 4-point flexural strength of 387 MPa as measured in accordance with ASTM C1161-13 wherein the 4-point flexural strength is calculated from 20 measurements.

Embodiment 41. The sintered ceramic body as in any one of the preceding embodiments, having a dielectric loss at ambient temperature of less than $1 \times 10^{-4}$ at a frequency of 1 MHz as measured in accordance with ASTM D150.

Embodiment 42. The sintered ceramic body as in any one of the preceding embodiments, having a dielectric loss at ambient temperature of less than $1 \times 10^{-4}$ at a frequency of 1 GHz as measured in accordance with ASTM D150.

Embodiment 43. The sintered ceramic body as in any one of the preceding embodiments, having a volume resistivity at ambient temperature of from 4 E+12 to 10 E+13 ohm-cm as measured in accordance with ASTM D257.

Embodiment 44. The sintered ceramic body as in any one of the preceding embodiments, having a volume resistivity of from 6 E+11 to 10 E+12 ohm-cm as measured at 300° C. in accordance with ASTM D257.

Embodiment 45. The sintered ceramic body as in any one of the preceding embodiments, having a volume resistivity of about 8 E+09 ohm-cm as measured at 500° C. in accordance with ASTM D257.

Embodiment 46. The sintered ceramic body as in any one of the preceding embodiments, having a dielectric strength at ambient temperature of from 11 to 14.5 MV/m as measured in accordance with ASTM D149-09.

Embodiment 47. The sintered ceramic body as in any one of the preceding embodiments, having a dielectric strength at ambient temperature of from 11.5 to 14.2 MV/m as measured in accordance with ASTM D149-09.

Embodiment 48. The sintered ceramic body as in any one of the preceding embodiments, having an arithmetical mean height (Sa) of about 12 nm and less on a surface as measured in accordance with ISO standard 25178-2-2012, section 4.3.2.

Embodiment 49. The sintered ceramic body of embodiment 48 wherein an arithmetical mean height (Sa) is about 20 nm and less on the surface when exposed to an etch method having a pressure of 10 millitorr, a bias of 600 volts, ICP powder of 2000 watts, the etch method further comprising a first etch step having a CF4 flow rate of 90 standard cubic centimetres per minute (sccm), an oxygen flow rate of 30 standard cubic centimetres per minute (sccm), an argon flow rate of 20 standard cubic centimetres per minute (sccm), and a second etch step having an oxygen flow rate of 100 standard cubic centimetres per minute (sccm) and an argon flow rate of 20 standard cubic centimetres per minute (sccm) wherein steps one and two are performed for 300 seconds each and repeated for a combined duration of 6 hours.

Embodiment 50. A method of making a sintered ceramic body, the method comprising the steps of: a. combining powders comprising yttrium oxide and aluminum oxide to make a powder mixture; b. calcining the powder mixture by applying heat to reach a calcination temperature and maintaining the calcination temperature to perform calcination and form a calcined powder mixture; c. disposing the calcined powder mixture inside a volume defined by a tool set of a sintering apparatus and creating vacuum conditions inside the volume; d. applying pressure to the calcined powder mixture while heating to a sintering temperature and performing sintering to form the sintered ceramic body; and e. lowering the temperature of the sintered ceramic body.

Embodiment 51. The method of embodiment 50, further comprising the steps of: f. optionally annealing the sintered ceramic body by applying heat to raise the temperature of the sintered ceramic body to reach an annealing temperature to form an annealed sintered ceramic body; and g. lowering the temperature of the annealed sintered ceramic body.

Embodiment 52. The method as in embodiments 50 or 51, further comprising the step of: h. machining the sintered ceramic body to create a sintered ceramic component such as a dielectric window or RF window, a focus ring, a nozzle or a gas injector, a shower head, a gas distribution plate, an etch chamber liner, a plasma source adapter, a gas inlet adapter, a diffuser, an electronic wafer chuck, a chuck, a puck, a mixing manifold, an ion suppressor element, a faceplate, an isolator, a spacer, a protective ring and a deposition ring in etch chambers.

Embodiment 53. The method as in one of embodiments 50-52, wherein the pressure is from 10 to 60 MPa.

Embodiment 54. The method as in one of embodiments 50-53, wherein the pressure is from 10 to 40 MPa.

Embodiment 55. The method as in one of embodiments 50-54, wherein the pressure is from 10 to 20 MPa.

Embodiment 56. The method as in one of embodiments 50-55, wherein the pressure is from 15 to 20 MPa.

Embodiment 57. The method as in one of embodiments 50-56, wherein the sintering temperature is from 1400 to 1650° C.

Embodiment 58. The method as in one of embodiments 50-57, wherein the calcined powder mixture comprises yttrium oxide and aluminum oxide as measured using x ray diffraction.

Embodiment 59. The method as in one of embodiments 50-58, wherein the calcined powder mixture comprises at least one crystalline phase selected from the group consisting of yttrium oxide, aluminum oxide, yttrium aluminum perovskite (YAP), yttrium aluminum monoclinic (YAM), and combinations thereof as measured using x ray diffraction.

Embodiment 60. The method as in one of embodiments 50-59, wherein the calcined powder mixture comprises about 10% or less of the yttrium aluminum garnet (YAG) phase as measured using x ray diffraction.

Embodiment 61. The method as in one of embodiments 50-60, wherein the powder mixture is crystalline.

Embodiment 62. The method as in one of embodiments 50-61, wherein the calcined powder mixture has a purity of from 99.995 and 99.9999% as measured using ICPMS methods.

Embodiment 63. The method as in one of embodiments 50-62, wherein the calcined powder mixture has a purity of from 99.999 to 99.9999% as measured using ICPMS methods.

Embodiment 64. The method as in one of embodiments 50-63, wherein the calcined powder mixture has an impurity content of from 2 to 100 ppm relative to the total mass of oxides calculated from the contents of all constituents as measured using ICPMS methods.

Embodiment 65. The method as in one of embodiments 50-64, wherein the calcined powder mixture has an impurity content of from 2 to 75 ppm relative to the total mass of oxides calculated from the contents of all constituents as measured using ICPMS methods.

Embodiment 66. The method as in one of embodiments 50-65, wherein the calcined powder mixture has an impurity content of from 2 to 50 ppm relative to the total mass of oxides calculated from the contents of all constituents as measured using ICPMS methods.

Embodiment 67. The method as in one of embodiments 50-66, wherein the calcined powder mixture has a specific surface area of from 2 to 12 $m^2$/g as measured using BET surface area analysis methods.

Embodiment 68. The method as in one of embodiments 50-67, wherein the calcined powder mixture has a specific surface area of from 2 to 10 $m^2$/g as measured using BET surface area analysis methods.

Embodiment 69. A sintered ceramic body made by the method as in one of embodiments 50-68.

Embodiment 70. The sintered ceramic body of embodiment 69 having a greatest dimension of from 100 mm to 622 mm.

Embodiment 71. The sintered ceramic body of embodiment 70 having a greatest dimension of from 200 to 622 mm.

Embodiment 72. The sintered ceramic body of embodiment 71 having a greatest dimension of from 400 to 622 mm.

Embodiment 73. The sintered ceramic body of embodiment 72 having a greatest dimension of from 100 to 575 mm.

Embodiment 74. The sintered ceramic body of embodiment 73 having a greatest dimension of from 200 to 575 mm.

Embodiment 75. The sintered ceramic body as in one of embodiments 69-74, wherein the sintered ceramic body has a density variance of from 0.2 to less than 5% as measured across the greatest dimension.

Embodiment 76. The sintered ceramic body according to embodiment 75 wherein the sintered ceramic body has a density variance of from 0.2 to 3% as measured across the greatest dimension.

BRIEF DESCRIPTION OF THE DRAWINGS

FIGS. 3A and 3B are top plan views of the SPS sintering apparatus of FIG. 1;

FIG. 4 is a graph depicting radial variance in average coefficient of thermal expansion (CTE) of graphite materials A and B at 1200° C.;

FIG. 5a) illustrates the standard deviation of coefficient of thermal expansion of graphite materials A and B in ppm and b) variance in coefficient of thermal expansion of graphite materials A and B each as measured over the operating temperatures of 200 to 1400° C.;

FIG. 16 illustrates SEM images of exemplary yttria/alumina powder mixtures as disclosed herein;

FIG. 19 depicts 1000× micrographs of 3 ceramic sintered bodies having YAG phase with YAP and/or YAM as disclosed in accordance with examples 2, 3 and 4;

FIGS. 24a) and b) depict exemplary SEM micrographs at 1000× and 5000× respectively of a highly dense sintered ceramic body sample 258 comprising YAG according to embodiments as disclosed herein;

FIG. 25a) illustrates an SEM micrograph at 5000× and b) illustrates % of theoretical density of YAG and density variation across a greatest dimension for a sintered ceramic body according to example 506 as disclosed herein;

FIG. 27a) depicts an SEM micrograph of the sample region of FIG. 20 using topographic imaging methods and b) a topographic SEM image from the same region after thresholding to reveal porosity and alumina phases corresponding to example 12 as disclosed herein;

FIGS. 28a) and b) depict porosity measurements performed across a surface of 7 images of a sintered ceramic body comprising YAG according to embodiments as disclosed herein;

FIG. 29a) depicts an SEM micrograph of a surface of a sintered ceramic body comprising YAG illustrating pores, and b) shows the total % of surface area comprising porosity within the 7 images of FIG. 28.

DETAILED DESCRIPTION

Figure 1:
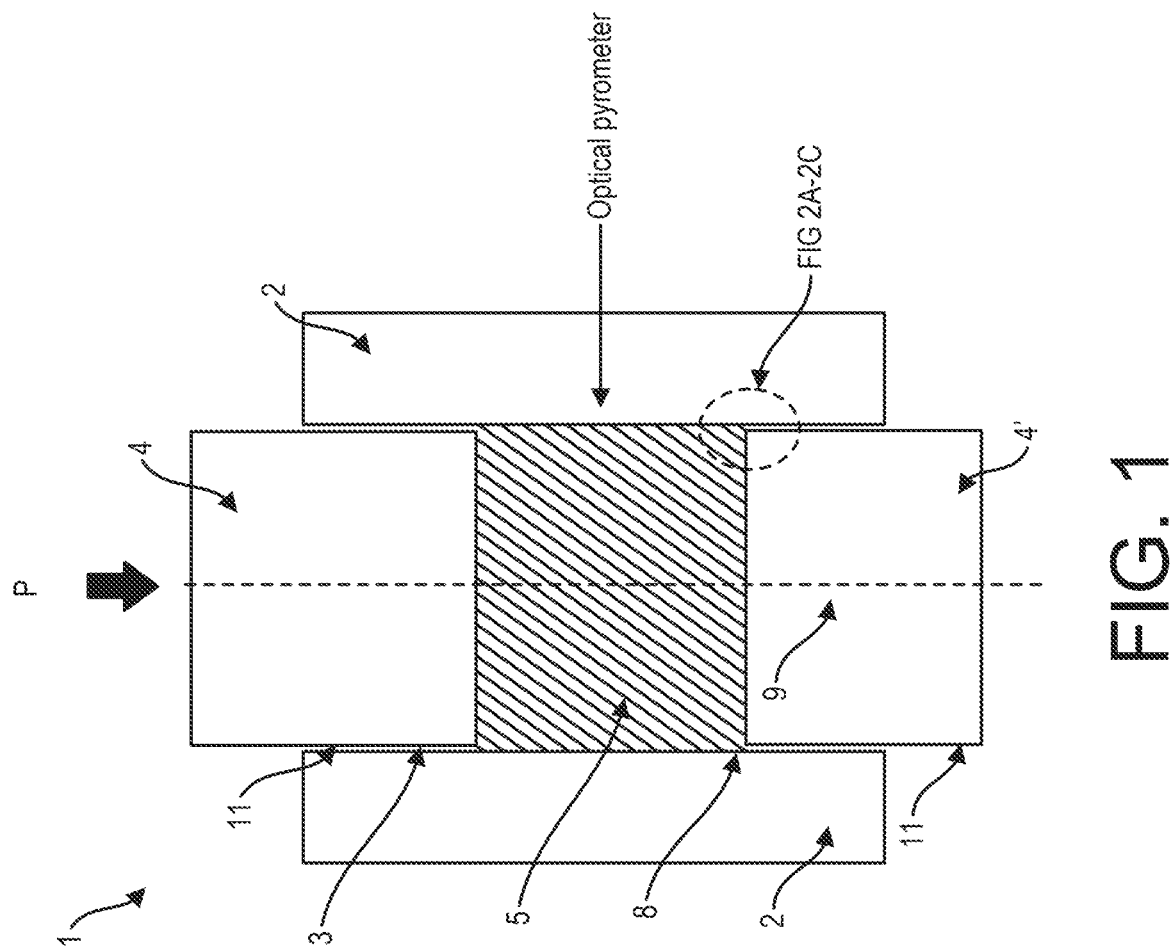
FIG. 1 is a cross-sectional view of a SPS sintering apparatus having a tool set located in a vacuum chamber (not shown) with a simple arrangement used for sintering ceramic materials.

Reference will now be made in detail to specific embodiments. Examples of the specific embodiments are illustrated in the accompanying drawings. While the disclosure will be described in conjunction with these specific implementations, it will be understood that it is not intended to limit the disclosure to such specific embodiments. On the contrary, it is intended to cover alternatives, modifications, and equivalents as may be included within the spirit and scope as defined by the appended claims. In the following description, numerous specific details are set forth in order to provide a thorough understanding of the disclosed embodiments. The present disclosure may be practiced without some or all of these specific details.

Definitions

In this application, the term "yttrium aluminum oxide" is understood to mean at least one of the forms of crystalline phases of yttrium aluminum oxides, including $Y_3Al_5O_{12}$ (YAG; yttrium aluminum garnet/cubic phase), $YAlO_3$ (YAP; yttrium aluminum perovskite phase), and $Y_4Al_2O_9$ (YAM; yttrium aluminum monoclinic phase) and combinations of these. The terms YAG and YAG phase are used interchangeably herein.

As used herein, the term "alumina" is understood to be aluminum oxide, comprising $Al_2O_3$, and the term "yttria" is understood to be yttrium oxide, comprising $Y_2O_3$.

As used herein, the terms "semiconductor wafer," "wafer," "substrate," and "wafer substrate," are used interchangeably. A wafer or substrate used in the semiconductor device industry typically has a diameter of 200 mm, or 300 mm, or 450 mm.

As used herein, the term "sintered ceramic body" is synonymous with "sinter", "body" or "sintered body" and refers to a solid ceramic article formed from a calcined powder mixture upon being subjected to a pressure and heat treatment process which creates a monolithic body therefrom.

As used herein, the term "nanopowder" is intended to encompass those powders having a specific surface area of 20 m²/g and greater.

As used herein, the term "ambient temperature" refers to a temperature range of from 22° C. to 25° C.

As used herein, the term "purity" refers to the absence of various contaminants and/or impurities in a) a starting material from which a powder mixture may be formed, b) a powder mixture after processing and calcination, and c) a sintered ceramic body as disclosed herein. Higher purity, approaching 100%, represents a material having essentially no contaminants or impurities, comprising only the intended material composition of Y, Al and O and optionally dopants and/or sintering aids.

As used herein, the term "impurity" refers to those compounds/contaminants present in a) the starting materials from which a powder mixture may be formed, b) a powder mixture and/or a calcined powder mixture after processing, and c) a sintered ceramic body, comprising impurities other than the starting material itself, which comprises Y, Al and O, and optionally dopants and/or sintering aids. Impurities may be present in the starting powder materials, powder mixtures and/or calcined powder mixtures after processing/combining, or during sintering and are reported as ppm where lower ppm levels correspond to lower impurity content. Impurities and/or total impurities as reported herein do not include Si in the form of $SiO_2$. Conversion from purity to impurity may be done using the conversion of 1% by weight is equal to 10,000 pm as known to those skilled in the art.

The term "dopants" as used herein do not include the starting materials of yttrium oxide and aluminum oxide to the extent they may remain in the sintered ceramic body. Impurities differ from dopants in that dopants as defined herein are those compounds intentionally added to the starting powders or to the powder mixture to achieve certain electrical, mechanical, optical or other properties such as grain size modification for example, in the sintered ceramic body.

The term "sintering aid" as used herein refers to additives, such as zirconia, calcia, silica or magnesia, that enhance densification, and thereby reduce porosity, during the sintering process.

All values when reported in ppm herein are relative to the total mass of the material to be measured, such as embodiments of the powders as disclosed herein, and/or the sintered ceramic bodies.

As used herein, the term "sintered ceramic component" refers to a sintered ceramic body after a machining step to form a shape of a specific component for use in a semiconductor processing chamber as disclosed herein.

As used herein, the term "powder mixture" means more than one starting powder mixed together to form the mixture which after a sintering step the mixture is thereby formed into the "sintered ceramic body." Calcination may be performed on the "powder mixture" to form the "calcined powder mixture" as disclosed herein.

As used herein, the term "tool set" is one that may comprise at least a die and at least two punches and optionally additional spacers. When fully assembled, the tool set defines a volume for disposition of the powder mixture or the calcined powder mixture as disclosed.

The term "phase" as used herein is understood to mean a crystalline region of the sintered ceramic body having a specific crystallographic structure.

The term "calcination" when used as relates to heat treatment processes is understood herein to mean heat treatment steps which may be conducted on a powder or a powder mixture in air to for example remove moisture and/or surface impurities, increase crystallinity and/or in some embodiments, decrease powder surface areas.

The term "annealing" when applied to heat treatment of ceramics is understood herein to mean a heat treatment conducted on the disclosed ceramic sintered bodies in air to relieve stress and/or normalize stoichiometry.

As used here, the term "about" as it is used in connection with numbers allows for a variance of plus or minus 10%. The terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Apparatus/Spark Plasma Sintering Tool

Disclosed herein is a spark plasma sintering (SPS) tool comprising: a die comprising a sidewall comprising an inner wall and an outer wall, wherein the inner wall has a diameter that defines an inner volume capable of receiving at least one ceramic powder; and an upper punch and a lower punch operably coupled with the die, wherein each of the upper punch and the lower punch have an outer wall defining a diameter that is less than the diameter of the inner wall of the die thereby creating a gap between each of the upper punch and the lower punch and the inner wall of the die when at least one of the upper punch and the lower punch are moved within the inner volume of the die, wherein the gap is from 10 μm to 100 μm wide and the at least one ceramic powder has a specific surface area (SSA) of from 1 to 18 m/g as measured according to ASTM C1274.

FIG. 1 depicts an SPS tool 1 with a simplified die/punch arrangement used for sintering ceramic powders to make large sintered ceramic bodies as disclosed herein. Typically, the die/punch arrangement is within a vacuum chamber (not shown) as will be recognized by one of ordinary skill in the art. Referring to FIG. 1, the spark plasma sintering tool 1 comprises a die system 2 comprising a sidewall comprising an inner wall 8 having a diameter that defines an inner volume capable of receiving at least one ceramic powder 5.

Still referring to FIG. 1, the spark plasma sintering tool 1 comprises an upper punch 4 and a lower punch 4' operably coupled with the die system 2, wherein each of the upper punch 4 and the lower punch 4' have an outer wall 11 defining a diameter that is less than the diameter of the inner wall 8 of the die system 2 thereby creating a gap 3 between each of the upper punch 4 and the lower punch 4' and the inner wall 8 of the die system 2 when at least one of the upper punch 4 and the lower punch 4' are moved within the inner volume of the die system 2.

The die system 2 and upper 4 and lower 4' punches may comprise at least one graphite material. In certain embodiments, the graphite material/s disclosed herein may comprise at least one isotropic graphite material. In other embodiments, the graphite material/s disclosed herein may comprise at least one reinforced graphite material such as for example a carbon-carbon composite, and graphite materials comprising fibers, particles or sheets or mesh or laminates of other electrically conductive materials such as carbon in a matrix of an isotropic graphite material. In other embodiments, the die and upper and lower punches may comprise combinations of these isotropic and reinforced graphite materials.

The graphite materials used for some or all of the parts of the tool such as, for example, die 6 and punches 4 and 4' may comprise porous graphite materials which exhibit a porosity of from about 5% to about 20%, from about 5% to about 17%, from about 5% to about 13%, from about 5% to about 10%, from 5% to about 8%, from about 8% to about 20%, from about 12% to 20%, from about 15% to about 20%, from about 11% to about 20%, from about 5% to 15%, from 6% to about 13%, and preferably from about 7% to about 12%.

Preferably, the graphite material has an average pore size (pore diameter) of from 0.4 to 5.0 μm, preferably from 1.0 to 4.0 μm and comprises pores with a surface pore diameter of up to 30 μm, preferably up to 20 μm, preferably up to 10 μm. More preferably, pores with a surface pore diameter of from 10 to 30 μm may be present.

The graphite materials used for the tool as disclosed herein may have an average grain size of <0.05 mm, preferably <0.04 mm, preferably <0.03 mm, preferably <0.028 mm, preferably <0.025 mm, preferably <0.02 mm, preferably <0.018 mm, preferably <0.015 mm, and preferably <0.010 mm.

The graphite materials used for the tool as disclosed herein may have an average grain size of >0.001 mm, preferably >0.003 mm, preferably >0.006 mm, preferably >0.008 mm, preferably >0.010 mm, preferably >0.012 mm, preferably >0.014 mm, preferably >0.020 mm preferably >0.025 mm and preferably >0.030 mm.

The graphite materials used for the tool as disclosed herein may have a density of ≥1.45 g/cm³, preferably ≥1.50 g/cm³, preferably ≥1.55 g/cm³, preferably ≥1.60 g/cm³, preferably ≥1.65 g/cm³, preferably ≥1.70 g/cm³, and preferably ≥1.75 g/cm³.

The graphite materials used for the tool as disclosed herein may have a density of ≤1.90 g/cm³, preferably ≤1.85 g/cm³ and preferably ≤1.80 g/cm³.

In embodiments, the graphite materials have a coefficient of thermal expansion (CTE) across a temperature range from about 400 to about 1400° C. of ≥3.3×10⁻⁶/° C., ≥3.5×10⁻⁶/° C., ≥3.7×10⁻⁶/° C., ≥4.0×10⁻⁶/° C., ≥4.2×10⁻⁶/° C., ≥4.4× 10⁻⁶/° C., ≥4.6×10⁻⁶/° C., ≥4.8×10⁻⁶/° C.

In embodiments, the graphite materials may have a coefficient of thermal expansion (CTE) across a temperature range from about 400 to 1400° C. of ≤7.0×10⁻⁶/° C., preferably ≤6.0×10⁻⁶/° C., preferably ≤5.0×10⁻⁶/° C., preferably ≤4.8×10⁻⁶/° C., preferably ≤4.6×10⁻⁶/° C.

Table 1 lists properties of exemplary graphite materials as disclosed herein.

TABLE 1

| Property | Range |
| --- | --- |
| Density (g/cc) | 1.45 to 1.9 |
| Average Grain Size (um) | 1 to <50 |
| Resistivity (Ohm- cm) | 0.001 to 0.003 |
| Flexural Strength (MPa) | 40-160 |
| Compressive Strength (MPa) | 80-260 |
| CTE (×10⁻⁶/C.) at 400° C. to 1400° C. | 3.3 to 7 |
| Porosity % | 5 to 20 |
| Average Pore Diameter (um) | 0.4 to 5 |
| Thermal K (W/m K) | 40-130 |
| Shore Hardness (HSD) | 55 to 59 |
| Tensile Strength (MPa) | 25 to 30 |
| Elastic Modulus (GPa) | 9 to 11 |
| Impurities/Ash (ppm) | 3 to 500 |

Figure 2A:
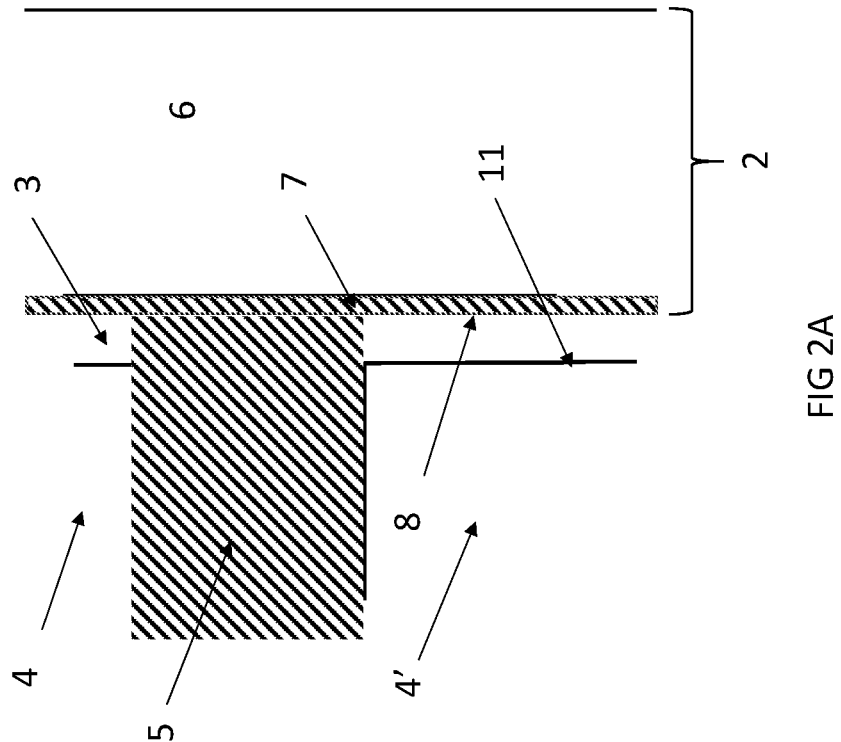
FIG. 2A illustrates an embodiment of FIG. 1 showing one foil layer.
Figure 2B:
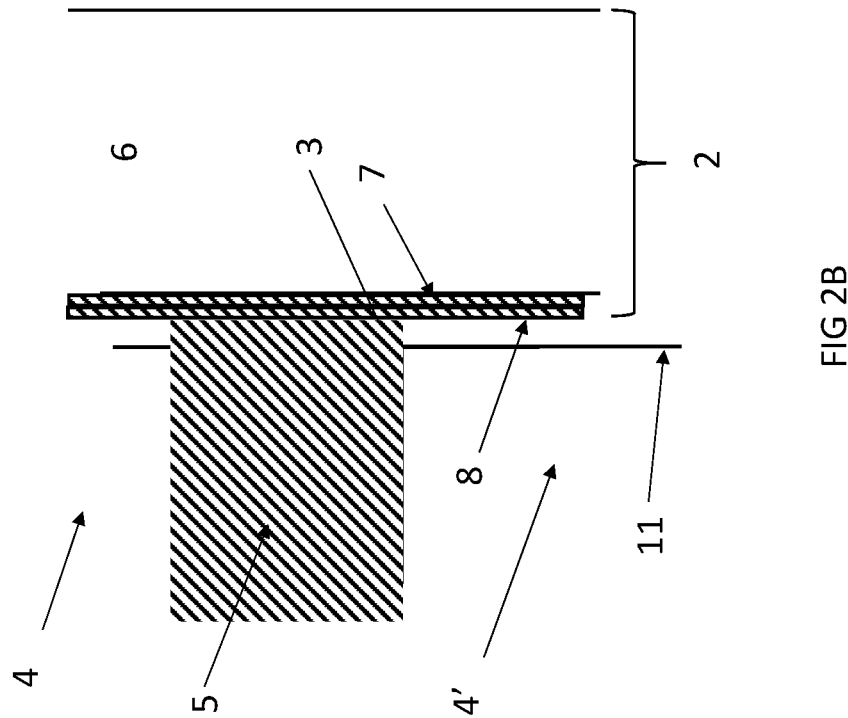
FIG. 2B illustrates an alternative embodiment of FIG. 1 showing two foil layers.
Figure 2C:
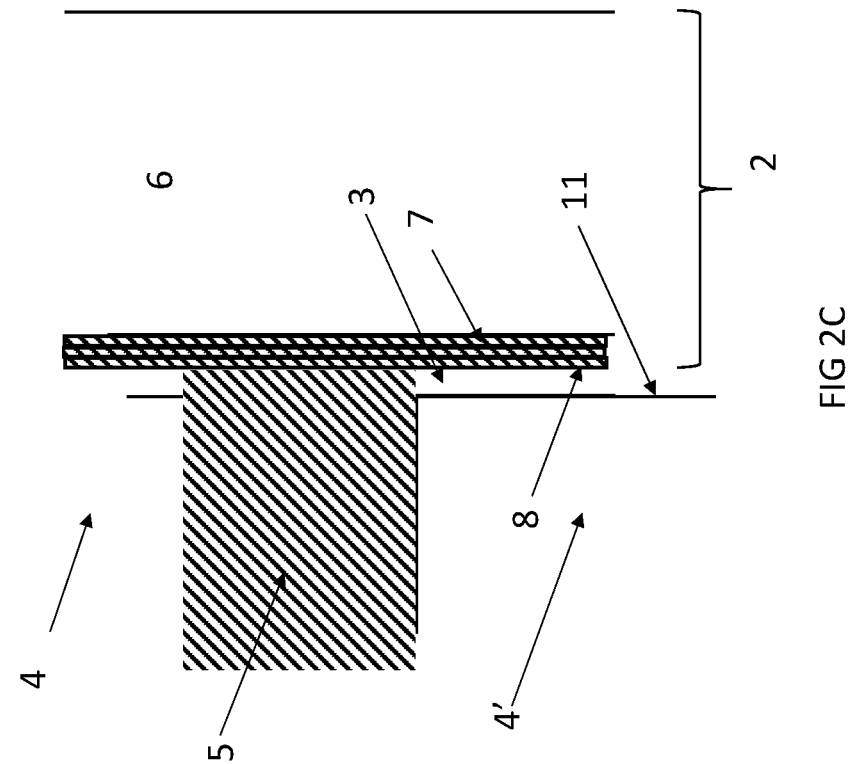
FIG. 2C illustrates another alternative embodiment of FIG. 1 showing three foil layers.

The die system 2 comprises a die 6 and optionally but preferably at least one conductive foil 7 located on the inner wall of the die as depicted in the embodiments of FIGS. 2A to 2C. The number of conductive foils on the inner wall of the die is not limited and 1, 2, 3, 4, 5, 6, 7, 8, 9, or 10 conductive foils may be provided as a circumferential liner between die 6 and each of upper 4 and lower 4' punches whereby the inner wall 8 of the die system 2 (including the at least one conductive foil, if present) and the outer wall 11 of each of the upper and lower punches defines the gap 3. The at least one conductive foil 7 may comprise graphite, niobium, nickel, molybdenum, platinum and other ductile, conductive materials and combinations thereof which are stable within the temperature range according to the method as disclosed herein.

In certain embodiments, the conductive foil may comprise a flexible and compressible graphite foil as disclosed herein having one or more of the following characteristics:
- carbon content of more than 99 wt %, preferably more than 99.2 wt %, more preferably more than 99.4 wt %, more preferably more than 99.6 wt %, more preferably more than 99.8 wt %, more preferably more than 99.9 wt %, more preferably more than 99.99 wt %, and more preferably more than 99.999 wt %;
- impurities of less than 500 ppm, preferably less than 400 ppm, more preferably less than 300 ppm, more preferably less than 200 ppm, more preferably less than 100 ppm, more preferably less than 50 ppm, more preferably less than 10 ppm, more preferably less than 5 ppm, and more preferably less than 3 ppm;
- tensile strength of the graphite foil in a range of from 4.0 to 6.0 MPa, preferably from 4.2 to 5.8 MPa, and more preferably from 4.4 or 5.6 MPa; and/or
- bulk density of the graphite foil preferably in a range of from 1.0 to 1.2 g/cc, preferably 1.02 to 1.18 g/cc, more preferably 1.04 to 1.16 g/cc, and more preferably 1.06 to 1.16 g/cc.

In embodiments, the at least one foil typically comprises graphite. In certain embodiments, the at least one foil as part of the die system may comprise a circumferential liner between a surface of the die and each of the upper and lower punches.

The graphite foils may improve the temperature distribution across the powder during sintering. Table 2 lists properties of exemplary graphite foils according to embodiments as disclosed herein such as Neograf Grafoil®, Sigraflex® graphite foils, and Toyo Tanso Perma-Foil®.

TABLE 2

| Thickness (mm) | 0.030 to 0.260 |
| --- | --- |
| Density (Mg/m3) | 0.5 to 2 |
| Tensile Strength (MPa) | 4.9-6.3 |
| Resistivity (μOhm-m; 25° C.) (parallel to surface) | 5 to 10 |
| Resistivity (μOhm-m; 25° C.) (perpendicular to surface) | 900 to 1100 |
| CTE (×10−6/C.; parallel to surface) at 350° C. to 500° C. | 5 to 5.5 |
| CTE (perpendicular to surface) at 350° C. to 500° C. | 2 × 10⁻⁴ |
| Compressibility (%) | 40-50 |
| Recovery (%) | 10 to 20 |
| thermal conductivity (W/mK at 25° C.; parallel to surface) | 175 to 225 |
| thermal conductivity (W/mK at 25° C.; perpendicular to surface) | ~5 |
| Impurities/Ash (wt %) | <0.5 |

Referring now to FIGS. 2A, 2B and 2C, an SPS tool set with embodiments of the graphite foil arrangement is shown. A ceramic powder 5 is disposed between at least one of upper and lower punches 4 and 4' and gap 3 is shown between the outer wall 11 of each of the upper and lower punches and the inner wall 8 of the die system 2. FIGS. 2A, 2B and 2C depict 1 to 3 layers of conductive foil 7 respectively and die 6 as part of the die system 2. Accordingly, the gap extends from the inner wall 8 of the die system 2 to the outer wall 11 of each of the upper and lower punches. The gap distance is arranged such that the powder may degas before and/or during heating and sintering, while also maintaining ohmic contact between punch and die to improve the temperature distribution across the ceramic powder during heating and sintering.

The graphite foils may have a thickness of, for example, from 0.025 to 0.260 mm, preferably from 0.025 to 0.200 mm, preferably from 0.025 to 0.175 mm, preferably from 0.025 to 0.150 mm, preferably from 0.025 to 0.125 mm, preferably from 0.035 to 0.200 mm, preferably from 0.045 to 0.200 mm, and preferably from 0.055 to 0.200 mm.

The distance of gap 3 is measured from an inwardly facing surface of the foil 7 closest to the upper and lower punches 4 and 4' to the outer wall 11 of each of the upper and lower punches. Preferred ranges for the distance of gap 3 are preferably from 10 to 100 μm, preferably from 10 to 80 μm, preferably from 10 to 70 μm, preferably from 10 to 60 μm, preferably from 10 to 50 μm, preferably from 30 to 70 μm, preferably from 20 to 60 μm, and preferably from 30 to 60 μm.

Moreover, the width of gap 3 between the inner wall 8 of the die system 2 and the outer wall 11 of each of the upper 4 and lower 4' punches may be determined by the person skilled in the art so that the powder degassing during the preheating, heating and sintering processes are sufficiently facilitated on one hand and that a sufficient electrical contact for Joule or resistive heating and, thereby, sintering is achieved on the other hand. If the distance of gap 3 is less than 10 μm, the force required to move at least one of the upper and lower punches within the inner volume of the die system, and thereby assemble the tool set, may cause damage to the tool set. Further, a gap 3 of less than 10 um may not allow for escape of adsorbed gases, organics, humidity and the like within the ceramic powder 5 which would extend processing time during manufacturing and may result in residual porosity, and thereby lowered density, in the sintered ceramic body. If the width of gap 3 is greater than 70 μm when sintering an insulating material such as the oxide ceramics comprising oxide and/or nitride ceramics and non-conducting mixed metal oxides as disclosed herein having a high resistivity (for example about $1 \times 10^{+10}$ ohm-cm and greater at room temperature), localized overheating may occur, resulting in thermal gradients within the tool set during sintering. As a result, in order to form a sintered ceramic body of a large dimension from non-conducting ceramic powders having a high resistivity (and thus low conductivity), a gap of from 10 to 70 um is preferable. Thus, in some embodiments, the distance of the gap 3 between the inner wall 8 of the die system 2 and the outer wall 11 of each of the upper and lower punches when sintering ceramic powders comprising oxide or nitride ceramics is preferably from 10 to 70 μm, preferably from 10 to 60 μm, preferably from 10 to 50 μm, preferably from 10 to 40 μm, preferably from 20 to 70 μm, preferably from 30 to 70 μm, preferably from 40 to 70 μm, preferably from 50 to 70 um, preferably from 30 to 60 μm. Without intending to be bound by a particular theory, it is believed that the gap distance between the inner wall 8 of the die system 2 and the outer wall 11 of each of the upper and lower punches during sintering functions to facilitate powder degassing of organics, moisture, adsorbed molecules, etc. during the pre-sintering and sintering processes. This leads to a sintered ceramic body of a large size having high density and low volumetric porosity, low density variation and improved mechanical properties such that the body may be easily handled without breakage. Sintered ceramic bodies comprising YAG made as disclosed herein may have dimensions of from 100 mm to 610 mm or greater with regard to the greatest dimension of the sintered ceramic body.

In practice, the upper and lower punches 4 and 4' are not always perfectly aligned about a central axis. FIG. 3A and FIG. 3B are plan views of the tool set 1, illustrating alignments of upper and lower punches 4 and 4', gap 3, any number of conductive foils 7, and die system 2 about central axis 9. In embodiments as depicted in FIG. 3A, the gap may be axisymmetric about central axis 9. In other embodiments as depicted in FIG. 3B, the gap may be asymmetric about central axis, 9. The gap 3 may extend between from 10 um to 70 um when sintering the oxide and/or nitride ceramics as disclosed herein, and may extend from 10 um to 100 um when sintering the non-oxide ceramics as disclosed herein in both axisymmetric and asymmetric embodiments as depicted.

Figure 6:
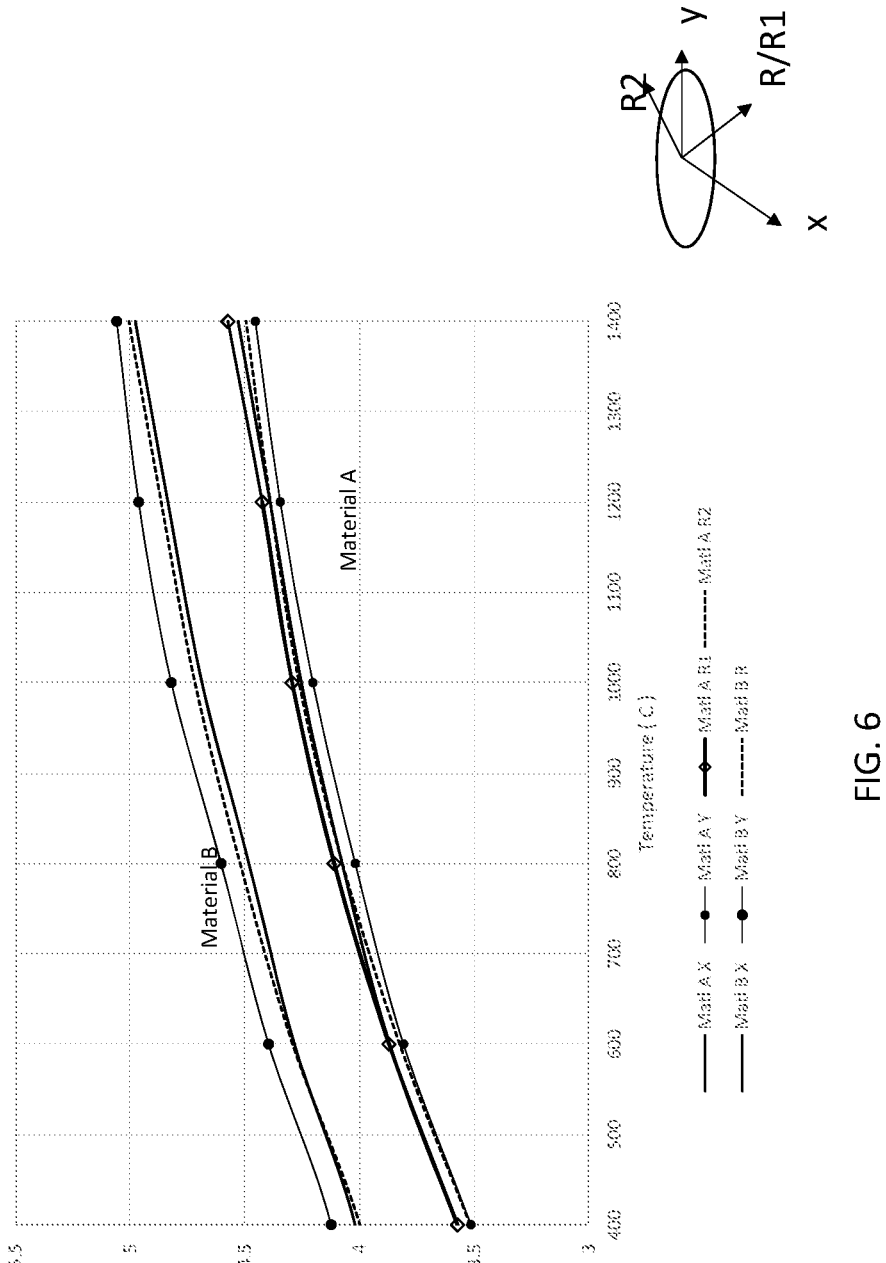
FIG. 6 is a graph illustrating a coefficient of thermal expansion of graphite materials A and B from 400 to 1400° C.

Gap asymmetry performance can be measured by performing an absolute radial CTE deviation analysis over a range of temperatures. For example, FIG. 4 shows the radial deviation from average CTE of two isotropic graphite materials (A and B) used as the punches and die of the apparatus disclosed herein at 1200° C. FIG. 4 shows that for a material to be successful at maintaining the desired gap over a large temperature range, the radial deviation cannot vary in the x-y plane by $>0.3 \times 10^{-6}$ at the maximum from, e.g., room temperature to 2000° C. Material B displays an unacceptable CTE expansion in the x-y plane whereas Material A exhibited an acceptable CTE expansion throughout the temperature range. FIG. 5a) shows the standard deviation in ppm of the graphite material CTE and b) the absolute variation (delta) in CTE (from lowest to highest) across the x-y plane of both materials of FIG. 4 across the range of temperatures. FIG. 6 depicts variance in coefficient of thermal expansion of graphite materials A and B from 400 to 1400° C.

The advantages of the specific tool set design used according to an embodiment may lead to the overall technical effect to provide a large ceramic body of very high purity and having a high and uniform density and low volumetric porosity and thereby a reduced tendency towards breakage in the sintering process, in particular in the SPS process, according to the present disclosure. Therefore, all features disclosed with respect to the tool set also apply to the product of a sintered ceramic body of dimension greater than 100 mm.

By using the tool set as disclosed herein it becomes possible to achieve a more homogeneous temperature distribution in the powder to be sintered, and make a sintered ceramic body, in particular one of large dimension, exceeding for example 100 mm and/or 200 mm in greatest dimension, having very high (>98% of theoretical density for a given material) and uniform density (<4% variation across a greatest dimension) and thereby a reduced tendency towards breakage.

The tool set as disclosed may further comprise spacer elements, shims, liners and other tool set components. Typically, such components are fabricated from at least one of the graphite materials having the properties as disclosed herein.

Compositions

The following detailed description assumes the disclosure is implemented within equipment such as etch or deposition chambers necessary as part of the making of a semiconductor wafer substrate. However, the invention is not so limited. The work piece may be of various shapes, sizes, and materials. In addition to semiconductor wafer processing, other work pieces that may take advantage of this invention include various articles such as fine feature size inorganic circuit boards, magnetic recording media, magnetic recording sensors, mirrors, optical elements, micro-mechanical devices and the like.

During processing of semiconductor devices, corrosion resistant parts or chamber components are used within etch and/or deposition chambers and exposed to harsh corrosive environments which cause the release of particles into the etch and/or deposition chamber, resulting in yield loss due to wafer-level contamination. The sintered ceramic body and components fabricated therefrom provide improved plasma etch resistance and enhanced ability to be cleaned within semiconductor processing chambers by way of specific material properties and features to be described following.

In an embodiment, disclosed herein is a sintered ceramic body comprising from 90% to 99.9% by volume of polycrystalline yttrium aluminum garnet (YAG) and a volumetric porosity of from 0.1 to 4% as calculated from density measurements performed in accordance with ASTM B962-17. In embodiments, the sintered ceramic body may comprise YAG in an amount of from 90 to 99.8% by volume, preferably from 90 to 99.6% by volume, preferably from 90 to 99.4% by volume, preferably from 93 to 99.9% by volume, preferably from 93 to 99.8% by volume, preferably from 93 to 99.6% by volume, preferably from 93 to 99.4% by volume of a cubic crystallographic structure through use of the materials and methods as disclosed herein. The sintered ceramic body may comprise volumetric porosity in amounts of from 0.1 to 3%, preferably from 0.1 to 2%, preferably from 0.1 to 1%, preferably from 0.1 to 0.75%, preferably from 0.1 to 0.5%.

In another embodiment, disclosed herein is a sintered ceramic body comprising from 90 to 99.9% by volume of polycrystalline yttrium aluminum garnet (YAG), a volumetric porosity of from 0.1 to 4% as calculated from density measurements performed in accordance with ASTM B962-17, further comprising at least one oxide selected from the group consisting of yttrium oxide and aluminum oxide and combinations thereof, wherein the at least one oxide is present in an amount of from 0.1 to 2% by volume, preferably from 0.1 to 1.5% by volume, preferably from 0.1 to 1% by volume, preferably from 0.1 to 0.8% by volume, preferably from 0.1 to 0.6% by volume, and preferably from 0.1 to 0.4% by volume.

In further embodiments, disclosed herein is a sintered ceramic body comprising at least one form of polycrystalline yttrium aluminum oxide in an amount by volume of from 90 to 99.8%, a volumetric porosity of from 0.1 to less than 5% as calculated from density measurements performed in accordance with ASTM B962-17, a purity of greater than 99.99% as measured by ICPMS methods, and a hardness of at least 1200 HV as measured in accordance with ASTM Standard C1327. The sintered ceramic body comprises at least one polycrystalline yttrium aluminum oxide phase or a combination of the phases of yttrium aluminum oxides, to include in specific embodiments yttrium aluminum garnet the $Y_3Al_5O_{12}$ (YAG) phase, yttrium aluminum perovskite $YAlO_3$ (YAP), and yttrium aluminum monoclinic $Y_4Al_2O_9$ (YAM) and combinations thereof.

Semiconductor processing reactors as relates to etch or deposition processes require chamber components fabricated from materials having high resistance to chemical corrosion by reactive plasmas necessary for semiconductor processing. These plasmas or process gases may be comprised of various halogen, oxygen and nitrogen-based chemistries such as $O_2$, F, $Cl_2$, HBr, $BCl_3$, $CCl_4$, $N_2$, $NF_3$, NO, $N_2O$, $C_2H_4$, $CF_4$, SF6, $C_4F_8$, $CHF_3$, $CH_2F_2$. Use of the corrosion resistant materials as disclosed herein provides for reduced chemical corrosion and degradation during use. Additionally, providing a chamber component material such as a sintered ceramic body having a very high purity provides a uniformly corrosion resistant body low in impurities, which may serve as a site for initiation of corrosion or erosion. High resistance to erosion or spalling is also required of materials for use as chamber components. Erosion or spalling may result from ion bombardment of component surfaces through use of inert plasma gases such as Ar. Those materials having a high value of hardness may be preferred for use as components due to their enhanced hardness values providing greater resistance to ion bombardment and thereby, erosion. Further, components fabricated from highly dense materials having minimal porosity distributed at a fine scale may provide greater resistance to corrosion and erosion during etch and deposition processes. As a result, preferred chamber components may be those fabricated from materials having high erosion and corrosion resistance during plasma etching, deposition and chamber cleaning processes. This resistance to corrosion and erosion prevents the release of particles from the component surfaces into the etch or deposition chambers during semiconductor processing. Such particle release or shedding into the process chamber contributes to wafer contamination, semiconductor process drift and semiconductor device level yield loss.

Additionally, chamber components must possess sufficient flexural strength and rigidity for handleability as required for component installation, removal, cleaning and during use within process chambers. High mechanical strength allows for machining intricate features of fine geometries into the sintered ceramic body without breakage, cracking or chipping. Flexural strength or rigidity becomes particularly important at large component sizes used in state-of-the-art process tools. In some component applications such as a chamber window of diameter about 200 to 622 mm and greater, significant stress is placed upon the window during use under vacuum conditions, necessitating selection of corrosion resistant materials of high strength and rigidity.

For use in semiconductor processing chamber applications where ion bombardment occurs as part of the plasma process, it is preferable that chamber components formed from ceramic sintered bodies have high hardness values in order to resist erosion during use. High hardness values also may allow for the ability to create fine features in the sintered ceramic body upon machining into a specific component form without chipping, flaking or damage to the surface of the sintered body.

Preferable for semiconductor chamber components are those materials which have as low dielectric loss as possible in order to improve plasma generation efficiency, in particular at the high frequencies of from 1 MHz to 20 GHz used in plasma processing chambers. Heat generated by absorption of microwave energy in those component materials having higher dielectric loss causes non-uniform heating and increased thermal stresses upon components, and the combination of thermal and mechanical stresses during use may result in limitations to product designs and complexity.

To meet the aforementioned requirements, the sintered ceramic body as disclosed herein may be made from a sintered ceramic body comprising at least one or a combination of the forms of yttrium aluminum oxide. These include the cubic garnet phase of composition $Y_3Al_5O_{12}$ (YAG), the perovskite phase of composition $YAlO_3$ (YAP), and the monoclinic phase having composition $Y_4Al_2O_9$ (YAM).

For use in semiconductor etch and deposition applications requiring high chemical corrosion and erosion resistance as disclosed herein, in embodiments it is preferable that the sintered ceramic body comprises the YAG crystalline phase in an amount of from 90% to 99.9% by volume, preferably from 90% to 99.8% by volume, preferably from 90% to 99.6% by volume, preferably from 90% to 99.4% by volume, preferably from 93 to 99.9% by volume, preferably from 93 to 99.8% by volume, preferably from 93 to 99.6% by volume, preferably from 93 to 99.4% by volume, as measured using a combination of x ray diffraction (XRD), scanning electron microscopy imaging techniques, and image processing software as disclosed herein. The sintered ceramic body as disclosed herein is preferably polycrystalline and as such the sintered ceramic body may comprise multiple crystals, without limitation.

In other embodiments for use in semiconductor etch and deposition applications requiring high chemical corrosion and erosion resistance as disclosed herein, it is preferable that the sintered ceramic body comprises the YAG phase in an amount of from 90% to 99.8% by volume, preferably from 90 to 99.6% by volume, preferably from 90 to 99.4% by volume, and at least one oxide selected from the group consisting of yttrium oxide and aluminum oxide and combinations thereof, wherein the at least one oxide is present in an amount of from 0.1 to 2% by volume, as measured using a combination of x ray diffraction, scanning electron microscopy imaging techniques and image processing software as disclosed herein. The sintered ceramic body as disclosed herein comprising YAG and aluminum oxide is preferably polycrystalline and as such the sintered ceramic body may comprise two or more crystals, without limitation.

In an embodiment, the sintered ceramic body as disclosed herein may comprise about 99.8% by volume of a single crystalline phase of any one of the yttrium aluminum oxides of YAG, YAP or YAM. In other embodiments, the sintered ceramic body may comprise a matrix or composite structure of two or more discrete or continuous phases of the yttrium aluminum oxides as disclosed herein. In further embodiments, the sintered ceramic body may comprise minority phases of aluminum oxide and/or yttrium oxide with a majority of any one or combination of the yttrium aluminum oxides YAG, YAP and YAM, preferably the YAG crystalline phase.

In some embodiments, the sintered ceramic body as disclosed herein may comprise from 90 to 99.6% by volume of the cubic crystalline phase, YAG. In certain embodiments, the sintered ceramic body as disclosed herein may comprise from 99 to 99.8% by volume of the cubic crystalline phase of YAG and from 0.2 to 1% of an aluminum oxide phase. All embodiments of the sintered ceramic body as disclosed herein are preferably polycrystalline and as such the sintered ceramic body may comprise two or more crystals, without limitation.

Figure 7:
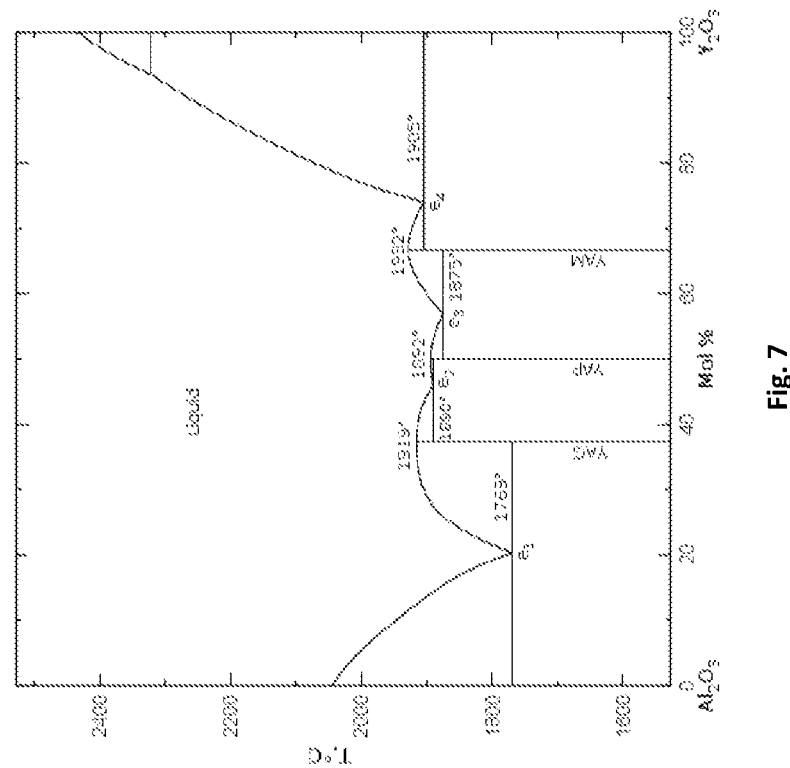
FIG. 7 depicts the phase diagram of the two-component yttrium oxide/aluminum oxide phase diagram, illustrating the yttrium aluminum oxide phases of YAG ($Y_3Al_5O_{12}$), YAP ($YAlO_3$) and YAM ($Y_4Al_2O_9$) and the molar proportions and temperatures necessary to form them.

As a guide, FIG. 7 depicts the yttrium oxide/aluminum oxide two-component phase diagram. The horizontal axis corresponds to mixture proportions in mole percent of yttria and alumina, while the vertical axis is temperature in Celsius. The left of the horizontal axis corresponds to 100% alumina while the right corresponds to 100% yttria. The phase diagram of FIG. 7 illustrates regions where the yttrium aluminum oxide phases of YAG, YAP, and YAM are formed and the conditions of molar composition and temperature necessary to produce the forms. The formation of YAG may require careful compositional control in order to maintain stoichiometry and thus form a sintered ceramic body comprising phase pure YAG of 37.5 mol % yttrium oxide and 62.5 mol % aluminum oxide.

The sintered ceramic bodies prepared in accordance with the method as disclosed herein, and sintered ceramic components made from the sintered body preferably have high densities. Density measurements were performed using the Archimedes buoyancy method according to ASTM B962-17. The density measurements were performed using the aid of a liquid having a known density, such as water, and also weighing the sample in air, according to the following equation:

$$\text{Density} = \frac{A}{A - B}(D_1 - D_a) + D_a$$

Where A=sample weight in air, B=sample weight in liquid, $D_a$=density of air (0.0012 g/cc), and $D_1$=density of the liquid. Using this calculation, densities may be determined with a high degree of accuracy as disclosed herein.

Density values and standard deviations reported are for an average across 5 measurements. A commercially available, single crystal sample of YAG was measured for density using the methods as disclosed herein. An Archimedes density of 4.556 g/cc across 5 measurements was obtained and this value is taken as the theoretical density of YAG as used herein. The ceramic sintered bodies comprising phase-pure YAG in amounts up to and including 99.8% of the YAG phase by volume, and ceramic sintered bodies comprising YAG including up to and including 1% by volume excess alumina as disclosed in embodiments herein may have density of for example from 4.374 to 4.556 g/cc, from 4.419 to 4.556 g/cc, from 4.465 to 4.556 g/cc, from 4.510 to 4.556 g/cc, from 4.533 to 4.556 g/cc, or by percentage of from 96 to 99.999%, from 97 to 99.999%, 98 to 99.999%, from 99 to 99.999%, from 99.5 to 99.999% of theoretical density of YAG. Corresponding volumetric porosities (Vp) may be from 0.010 to less than 5%, from 0.010 to 4%, from 0.010 to 3%, from 0.010 to 3%, from 0.010 to 2%, from 0.010 to 1%, preferably less than 1%, preferably less than 0.5% as calculated from the density measurements performed in accordance with the specifications as disclosed herein. The relative density (RD) for a given material is defined as the ratio of the measured density of the sample to the reported theoretical density for the same material, as shown in the following equation. Volumetric porosity (Vp) is calculated from density measurements as follows:

$$RD = \frac{\rho\ \text{sample}}{\rho\ \text{theoretical}} = 1 - V_p$$

where $\rho$ sample is the measured (Archimedes) density according to ASTM B962-17, $\rho$ theoretical is the measured theoretical density as disclosed herein, and RD is the relative fractional density. Using this calculation, porosity levels by percent of from 0.1 to 5% and less were calculated from measured density values for the ceramic sintered bodies as disclosed herein. Thus, in embodiments, the sintered ceramic body comprising the yttrium aluminum oxide YAG phase as disclosed herein comprises volumetric porosity in amounts of from 0.1 to 5%, preferably from 0.1 to 4%, preferably from 0.1 to 3%, preferably from 0.1 to 2%, preferably from 0.1 to 1% in the sintered ceramic body as listed in Table 3.

Measurements of crystalline phases and image-based porosity of the ceramic sintered bodies as disclosed herein were performed using a combination of XRD, SEM imaging and use of image processing software. XRD was performed using a PANanlytical Aeris model XRD capable of crystalline phase identification to about +/−5% by volume. Thus, XRD of the ceramic sintered bodies as disclosed herein may measure phase purity up to and including about 95% by volume. In order to determine the phase purity to greater accuracy, for example up to and including about 99.8% by volume, SEM images were taken using backscatter detection (BSD) methods as known to those skilled in the art. Using BSD, the YAG phase appears gray, varying somewhat dependent upon grain orientation, the aluminum oxide phase appears black, the yttrium oxide phase appears white, and porosity, if present, also appears black. Images were taken at 5000× using BSD methods to identify the YAG, alumina and yttria phases, and any porosity present as depicted in FIG. 26a) for sample 512.

In order to differentiate between black regions comprising alumina and those comprising porosity, the BSD image was black and white threshold using ImageJ processing software to highlight black regions in the BSD image which may comprise either porosity or alumina, as depicted for the same region in FIG. 26b). ImageJ has been developed at the National Institute of Health (NIH), USA, and is a Java-based public domain image processing and analysis program for image processing of scientific multi-dimensional images. The BSD detector as used for measurements disclosed herein has further capability to measure topographic features, thereby highlighting any deviations in the surface topography, such as surface porosity. Using the topographic mode of the BSD detector, topographic images were taken at 5000× across a surface of the same region of the ceramic sintered body as depicted in FIG. 26a) and the topographic images are shown in FIG. 27a). Regions comprising surface porosity were highlighted as illustrated in FIG. 27b) after thresholding the topographic image in ImageJ. The area comprising surface porosity within the topographic image of FIG. 27b) was thereafter subtracted from the area comprising alumina and/or porosity in the BSD images of FIG. 26b), providing the % area, and thereby % by volume, comprising alumina phase in the sintered ceramic body corresponding to sample 512. The combination of these analytical tools of multiple SEM imaging modes and ImageJ analysis may provide for the determination of phase purity with confidence of about +/−0.10% by volume. Using the disclosed methods, sample 512 was measured to comprise from about 0.1 to about 0.2% by volume of alumina phase, from about 0.1 to about 0.2% by volume of porosity, and from about 99.6 to about 99.8% by volume of the YAG phase. The yttria phase was present in an area-based amount of 0.010% and less, below the confidence limits using the methods as disclosed herein for phase determination, thus the yttrium oxide phase was not included in the relative phase amounts. Table 3 lists crystalline phase purity and volumetric porosities of the sintered ceramic bodies as disclosed herein. Thus, sintered ceramic bodies comprising the YAG phase in amounts from 90 to 99.9%, preferably from 90 to 99.8%, preferably from 90 to 99.7%, preferably from 90 to 99.6%, preferably from 93 to 99.8% by volume, preferably from 93 to 99.7%, preferably from 93 to 99.6%, each by volume, may be formed using the materials and methods as disclosed herein. ImageJ analysis methods were also used to assess pore sizes and relative amounts of pore area in the sintered ceramic body. FIGS. 28a) and b) illustrate area-based pore/porosity measurements for a surface of the sintered ceramic body comprising YAG. FIG. 28a) depicts the percent of surface area comprising pores or porosity (pore area) for each of 7 SEM images on the vertical axis and a horizontal axis representing the corresponding pore size for a given % pore area in microns. Pore size and total pore area were measured across 7 SEM images using ImageJ software methods as disclosed herein. Images were taken at 5000×, each of total area about 53.7 um×53.7 um corresponding to a single image measurement area of about 2885 um$^2$. The total pore area was used with the single image measurement area to arrive at the % pore area. An area within any one of the 7 images comprised porosity in a percent of total surface area of from about 0.0005 to about 0.012%, preferably from about 0.0005 to about 0.011%, preferably from about 0.0005 to about 0.0105%.

FIG. 28b) illustrates the cumulative fractional area comprising porosity (cumulative pore area) in um$^2$ as normalized across each of the 7 total image areas of FIG. 28a) measured in mm$^2$ on a logarithmic scale with the respective pore size on the horizontal axis. The sintered ceramic body comprising YAG may comprise a cumulative pore area fraction of from about 2 to about 800 um$^2$/mm$^2$, preferably from about 2 to about 600 um$^2$/mm$^2$, preferably from about 2 to about 400 um$^2$/mm$^2$, preferably from about 2 to about 300 um$^2$/mm$^2$. FIG. 28b) depicts the total fractional area comprising porosity for a respective pore size. No pores of pore size larger than 0.6 um were measured across the 7 images analyzed within the YAG sintered ceramic body. Thus, across 7 images, each of area about 54 um×54 um, the sintered ceramic bodies as disclosed herein have a surface comprising porosity corresponding to pore sizes of less than 1 um in very low (<0.1% by area) percentages, thus providing a corrosion and erosion resistant surface, and thereby volume, of the sintered ceramic body for use in plasma processing chambers.

FIG. 29a) illustrates an SEM micrograph of a sintered ceramic body comprising YAG after a thermal etching process illustrating few pores of small dimension. The YAG sintered ceramic body as disclosed herein may comprise pores wherein the pores may have a size of 5 um and less, down to sub-micron scale pore sizes of as low as from 0.1 um to 5 um. According to embodiments as disclosed herein, the sintered ceramic body comprising YAG may comprise pores wherein the pores may have a maximum size of from 0.1 to 5 um, preferably from 0.1 to 4 um, preferably from 0.1 to 3 um, preferably from 0.1 to 2 um, preferably from 0.1 to 1 um, preferably from 0.1 to 0.6 um.

FIG. 29b) depicts a summation of total % area comprising porosity across the total image area for each of the 7 SEM micrographs of FIG. 28. Across all images, the % of porosity was from 0.001 to 0.03%, preferably from 0.001 to 0.025%, preferably from 0.001 to 0.02%, preferably from 0.001 to 0.015%, preferably from 0.001 to 0.010%. Thus, across an image of area about 54 um×54 um, the sintered ceramic bodies as disclosed herein have a surface comprising porosity in very low (<1% by area) percentages, thus providing a corrosion and erosion resistant surface, and thereby volume, of the sintered ceramic body for use in plasma processing chambers.

These density, phase purity and porosity levels may provide a synergistic effect of enhanced resistance to the effects of erosion and corrosion resulting from plasma etch and deposition processing. The method and materials as disclosed are particularly useful in the preparation of ceramic sintered bodies of large dimension, for example from a greatest dimension of from 200 to 622 mm. The high densities, and thereby high mechanical strength, of the sintered ceramic body also provide increased handleability, in particular at large dimensions. Successful fabrication of sintered yttrium aluminum oxide bodies, and in particular bodies formed of phase pure YAG in ranges as disclosed herein, across a longest (from about 200 to 622 mm) dimension may be enabled by controlling variation in density across at least one, longest dimension. An average density of 96% and greater is desirable, with a variation in density of 5% and less, preferably 4% and less, preferably 3% and less, preferably 2% and less, preferably 1% and less across the greatest dimension, whereby the greatest dimension may be for example about 622 mm and less, preferably 575 mm and less, preferably 525 mm and less, preferably from 100 and 622 mm, preferably from 100 and 575 mm, preferably from 200 and 622 mm, preferably from 200 and 510 mm, preferably from 400 and 622 mm, preferably from 500 and 622 mm. Low densities of less than 95% of theoretical density for YAG may have lower strengths and thereby higher porosities, in excess of 5%, which results in breakage and inferior handleability. Table 3 lists density, % theoretical density, crystalline phase, and percent of volumetric porosity for embodiments of the ceramic sintered bodies as disclosed herein. The crystalline phase according to Table 3 were determined by XRD, SEM imaging, and ImageJ processing software, and combinations thereof using methods as disclosed herein. Densities of the ceramic sintered bodies as disclosed herein range from 4.378 g/cc to 4.550 g/cc. Samples comprised the YAG phase present in amounts of from 93% to 99.8% by volume.

TABLE 3

| Sample | Average Density (g/cc) | % Theoretical Density (YAG/ YAG/YAP) | Crystalline Phase % | Average Volumetric Porosity (%) |
|---|---|---|---|---|
| 519/ex. 1 | 4.534 | 99.517 | ≥99% YAG | 0.48 |
| 529/ex. 2 | 4.564 | 98.968 | 93 YAG/7 YAP | 1.03 |
| 531/ex. 3 | 4.552 | 99.049 | 95 YAG/5 YAP | 0.95 |
| 514/ex. 4 | 4.549 | 99.846 | ≥99% YAG | 0.15 |
| 196 | 4.452 | 97.717 | N/A | 2.28 |
| 535 | 4.524 | 99.298 | ≥99% YAG | 0.70 |
| 162 | 4.546 | 99.782 | ≥99% YAG | 0.22 |
| 162-1 | 4.537 | 99.585 | ≥99% YAG | 0.41 |
| 158 | 4.536 | 99.563 | ≥99% YAG | 0.44 |
| 158-1 | 4.523 | 99.271 | ≥99% YAG | 0.73 |
| 153 | 4.541 | 99.674 | ≥99% YAG | 0.33 |
| 153-1 | 4.524 | 99.304 | ≥99% YAG | 0.70 |
| 165 | 4.515 | 99.095 | ≥99% YAG | 0.90 |
| 6 | 4.545 | 99.766 | N/A | 0.23 |
| 134 | 4.521 | 99.232 | ≥99% YAG | 0.77 |
| 135 | 4.525 | 99.320 | ≥99% YAG | 0.68 |
| 402 | 4.546 | 99.784 | N/A | 0.22 |
| 402-1 | 4.537 | 99.573 | N/A | 0.43 |
| 401 | 4.550 | 99.867 | ≥99% YAG | 0.13 |
| 401-1 | 4.516 | 99.122 | ≥99% YAG | 0.88 |
| 401-2 | 4.525 | 99.320 | ≥99% YAG | 0.68 |
| 377 | 4.513 | 99.056 | N/A | 0.94 |
| 423 | 4.528 | 99.385 | ≥99% YAG | 0.61 |
| 191 | 4.464 | 97.971 | N/A | 2.03 |
| 258 | 4.542 | 99.696 | ≥99% YAG | 0.30 |
| 355 | 4.429 | 97.220 | N/A | 2.78 |
| 408 | 4.378 | 96.093 | N/A | 3.91 |
| 395 | 4.389 | 96.335 | N/A | 3.67 |
| 399 | 4.458 | 97.849 | N/A | 2.15 |
| 195 | 4.492 | 98.604 | N/A | 1.396 |
| 93 | 4.544 | 99.730 | N/A | 0.270 |
| 322 | 4.544 | 99.728 | N/A | 0.272 |
| 322-1 | 4.531 | 99.451 | N/A | 0.549 |
| 272 | 4.549 | 99.854 | 99.55% YAG, 0.3 Alumina | 0.15 |
| 272-5 | 4.433 | 97.300 | N/A | 2.700 |

TABLE 3-continued

| Sample | Average Density (g/cc) | % Theoretical Density (YAG/ YAG/YAP) | Crystalline Phase % | Average Volumetric Porosity (%) |
|---|---|---|---|---|
| 298 | 4.540 | 99.649 | ≥99% YAG | 0.351 |
| 298-1 | 4.525 | 99.33 | ≥99% YAG | 0.67 |
| 298-2 | 4.379 | 96.15 | ≥99% YAG | 3.85 |
| 487 | 4.489 | 98.54 | N/A | 1.46 |
| 495 | 4.508 | 98.94 | N/A | 1.06 |
| 512 | 4.547 | 99.80 | 99.8 | 0.19 |
| 512-1 | 4.542 | 99.69 | N/A | 0.30 |
| 506 | 4.546 | 99.783 | 99.5% YAG | ≥0.217 |
| 521 | 4.537 | 99.59 | N/A | 0.41 |
| 377 | 4.513 | 99.01 | ≥99% YAG | 0.940 |
| 151 | 4.579 | 99.64 | 95 YAG/5 YAP | 0.37 |
| 151-1 | 4.565 | 99.33 | 95 YAG/5 YAP | 0.67 |

Along with high density, the variation in density across a greatest dimension of the sintered ceramic body as disclosed may impact the ability to be handled in particular at large (>100 mm) dimension, machined and use as a sintered ceramic component. The density was measured across a greatest dimension of several examples of ceramic sintered bodies as disclosed herein. Table 3 lists results of density and density variations and volumetric porosity as measured.

In addition to high density, high hardness values may further provide enhanced resistance to erosion during use as a plasma chamber component. As such, Vickers hardness measurements were performed in accordance with ASTM Standard C1327 "Standard Test Method for Vickers Indentation Hardness of Advanced Ceramics." The test equipment used for all hardness measurements was a Wilson Micro Hardness Tester Model VH1202. Hardness values of at least 1200 HV, preferably at least 1400 HV, preferably at least 1800 HV, preferably at least 2000 HV, from 1300 to 1600 HV, from 1300 to 1500 HV, from 1300 to 1450 HV, from 1300 to 1400 HV, from 1400 to 1600 HV, from 1450 and 1600 HV, from 1450 and 1550 HV may be obtained for the sintered ceramic body as disclosed herein. Measurements performed using Vickers hardness methods as known in the art were converted to SI units of GPa. Hardness values of from 12.75 to 15.69 GPa, from 12.75 to 14.71 GPa, from 12.75 to 14.22 GPa, from 12.75 to 13.73 GPa, from 13.73 and 15.69 GPa, from 14.22 and 15.69 GPa, preferably from 14.22 and 15.20 GPa may be obtained for the sintered ceramic body as disclosed herein. These high hardness values may contribute to enhanced resistance to ion bombardment during semiconductor etch processes and reduced erosion during use, providing extended lifetimes when the sintered ceramic body is machined into sintered ceramic components having fine scale features. Table 4 lists hardness values for the ceramic sintered bodies as disclosed herein. Averages are reported across eight test repetitions using a 2 kgf load cell/applied load for samples 514, 519 and 531, and a 0.025 kgf load for sample 506.

TABLE 4

| Sample | Average (GPa) | St Dev | Max (GPa) | Min (GPa) |
|---|---|---|---|---|
| 514 | 13.47 | 0.69 | 14.7 | 12.4 |
| 531 | 14.14 | 0.58 | 15.0 | 13.2 |
| 519 | 14.5 | 0.4 | 16.1 | 14.5 |
| 506 | 14.8 | 1.0 | 16.0 | 12.7 |

In one embodiment, the sintered ceramic body disclosed herein has an average hardness of from 13.0 to 15.0 GPa as calculated from eight test repetitions using an applied load of 0.2 kgf as measured in accordance with ASTM Standard C1327. In another embodiment, the sintered ceramic body disclosed herein has an average hardness of about 13.5 to 14.5 GPa as calculated from eight test repetitions using an applied load of 0.2 kgf as measured in accordance with ASTM Standard C1327. In other embodiments, the sintered ceramic body may have an average hardness of about 14.8 GPa as calculated from eight test repetitions using an applied load of 0.025 kgf.

Figure 20:
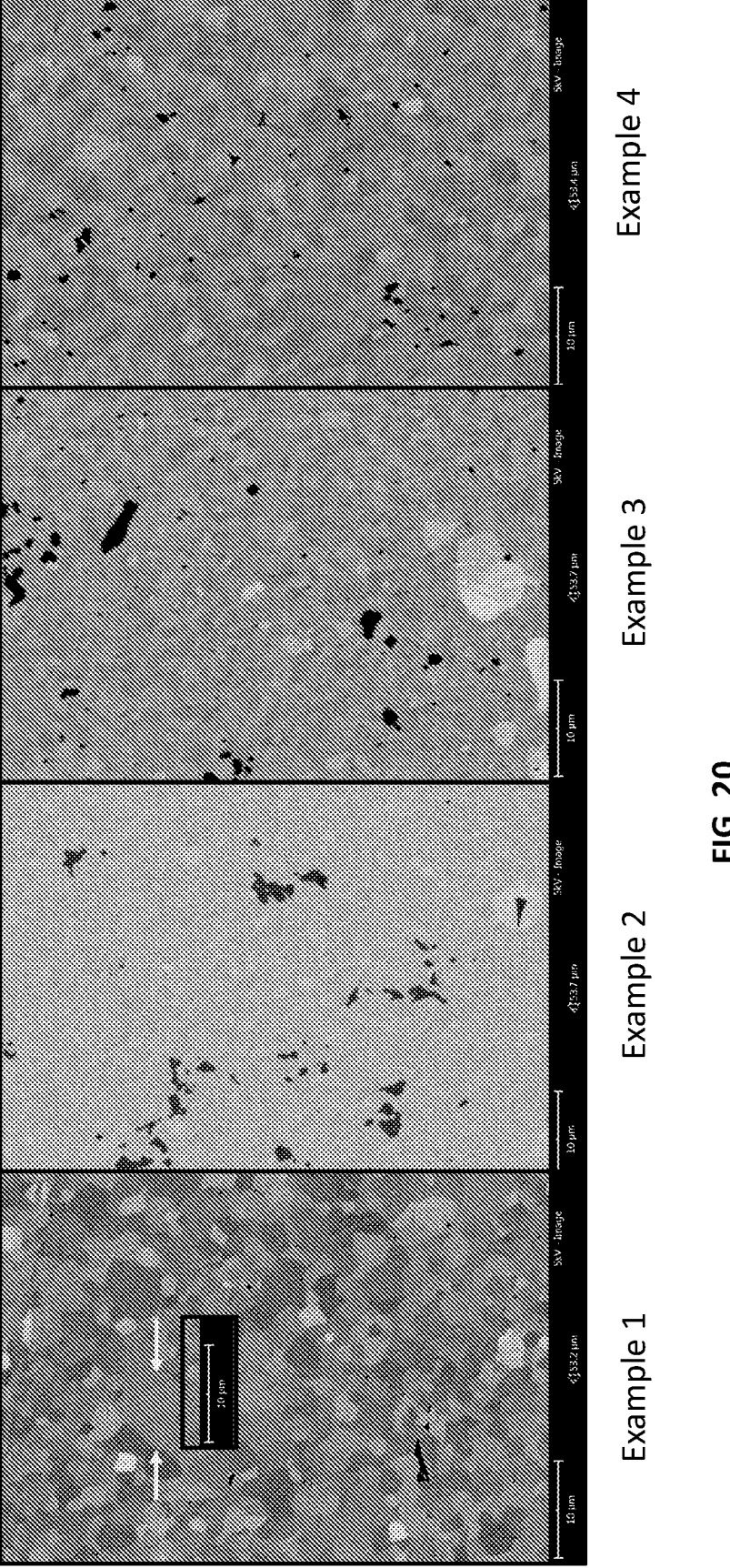
FIG. 20 depicts 5000× micrographs of exemplary sintered ceramic bodies comprising at least one yttrium aluminum oxide as disclosed herein in accordance with Examples 1, 2, 3 and 4.

Mechanical strength properties are known to improve with decreasing grain size. In order to assess grain size, linear intercept grain size measurements were performed in accordance with the Heyn Linear Intercept Procedure described in ASTM standard E112-2010 "Standard Test Method for Determining Average Grain Size." Grain size may also be measured by SEM, as depicted in Example 1 of FIG. 20, showing a maximum grain size of about 8 um and less. To meet the requirements of high flexural strength and rigidity for use in reactor chambers as large components of from 200 to 622 mm, the sintered ceramic body may have a grain size of, for example, a maximum grain size of about 8 um and less, preferably a maximum grain size of 6 um and less, preferably a grain size of from 0.4 to 8 um, preferably from 0.4 to 6 um, preferably from 0.4 to 3 um, preferably from 0.8 to 8 um, preferably from 1 to 8 um, preferably from 3 to 8 um, preferably from 5 to 8 um, preferably from 0.8 to 3 um, preferably from 1 to 2.5 um. Table 5 lists results of grain size measurements on the sintered ceramic body as disclosed in embodiments herein.

TABLE 5

| Sample | Average Grain Size (μm) | Std Dev | d10 (μm) | Median (d50) (μm) | d90 (μm) | Min (um) | Max (um) |
|---|---|---|---|---|---|---|---|
| 519 | 2.1 | 1 | 1.1 | 1.8 | 3.1 | 0.5 | 8 |
| 531 | 1.1 | 0.4 | 0.6 | 1.0 | 1.5 | 0.4 | 2 |
| 506 | 6.3 | 0.7 | N/A | N/A | N/A | 5 | 7.7 |

These grain sizes may result in a sintered ceramic body having a 4 point bend flexural strength as measured in accordance with ASTM C1161-18 of 300 MPa and less, preferably 350 MPa and less, preferably 400 MPa and less, preferably from 300 to 450 MPa, preferably from 300 to 400 MPa, preferably from 350 to 450 MPa, preferably from 375 to 425 MPa. Table 6 lists four-point flexural strength measurements using type B machined test bars for the sintered ceramic body of sample 006 as disclosed. Grain sizes too large in size, of about 20 um and greater, may result in ceramic sintered bodies having low flexural strength values, such as for example less than 200 MPa, which may make them unsuitable for use as etch and deposition chamber components in particular of large dimension, thus it is preferable for the sintered ceramic body to have an average grain size of less than about 10 um.

TABLE 6

| | 4 pt flexural strength, N = 20 | | | |
|---|---|---|---|---|
| Sample | Average (MPa) | St Dev | Max (Mpa) | Min (Mpa) |
| 006 | 386 | 27 | 440 | 336 |

Providing materials low in dielectric loss also becomes important at increasing frequencies. The ceramic sintered bodies disclosed herein may be tailored within a certain application-specific range of from about $5 \times 10^{-3}$ to $1 \times 10^{-4}$ and less across a frequency range of from 1 MHz to 1 GHz. Material properties such as purity of the starting powders, and for example, the silica content in the sintered ceramic body may affect dielectric loss. In embodiments, low silica content may provide a sintered ceramic body to meet the corrosion resistance and dielectric loss requirements as stated. Embodiments of the sintered ceramic body as disclosed herein are low in Si in the form of silica as detected using the ICPMS methods as disclosed herein. The sintered ceramic bodies as listed in Table 7 comprise silica in amounts at, and possibly below, the detection limit of 14 ppm for Si using the ICPMS methods as disclosed herein. Silica was not detected using ICPMS in the sintered ceramic bodies of Table 7, thus the sintered ceramic bodies may comprise silica in amounts at the detection limit, of about 14 ppm and greater relative to a total mass of the sintered body as calculated from the contents of all constituents. In addition, dielectric loss may be affected by grain size and grain size distribution. Fine grain size also may provide reduced dielectric loss, and thereby reduced heating upon use at higher frequencies. These material properties may be adjusted through material synthesis to meet specific loss values dependent upon the specific component application within semiconductor processing chambers. Table 7 discloses dielectric properties of constant and loss at 1 MHz and 1 GHz as measured in accordance with ASTM D150M, and dielectric strength as measured in accordance with ASTM D149-09 of the sintered ceramic body as disclosed herein.

TABLE 7

| sample | Frequency | dielectric constant | loss tangent | sample | Dielectric Strength (MV/m) |
|---|---|---|---|---|---|
| 134 | 1 MHz | 11.56 | <0.0001 | 165 | 14.2 |
| 135 | 1 MHz | 11.65 | 0.0055 | 166 | 13.0 |
| 134 | 1 GHz | 11.03 | <0.0001 | 167 | 11.5 |
| 135 | 1 GHz | 11.06 | <0.0001 | | |

In one embodiment, the sintered ceramic body disclosed herein has a dielectric loss at ambient temperature of $5.5 \times 10^{-3}$, preferably less than $1 \times 10^{-4}$ at a frequency of 1 MHz as measured in accordance with ASTM D150. In another embodiment, the sintered ceramic body disclosed herein has a dielectric loss at ambient temperature of less than $1 \times 10^{-4}$ at a frequency of 1 GHz as measured in accordance with ASTM D150.

Dielectric strengths as listed in Table 7 become important for those applications where high voltage may be applied across the sintered ceramic body or at least a portion of the sintered ceramic body. For example, use as a sintered ceramic body in an electrostatic chucking application, where very high voltages are required to maintain the precise location of a semiconducting substrate during fabrication may require the sintered ceramic body to have high dielectric strengths to prevent dielectric breakdown, and related conductance, through the sintered ceramic body. In embodiments, the polycrystalline sintered ceramic body as disclosed herein may provide dielectric strengths of greater than 11 MV/m, greater than 12 MV/m, greater than 12.5 MV/m. In alternate embodiments, the polycrystalline sintered ceramic body as disclosed herein may provide dielectric strengths of less than 15 MV/m, less than 14.5 MV/m, less than 14 MV/m. In further embodiments, the sintered ceramic body as disclosed herein may provide dielectric strengths of from 10 to 15 MV/m, from 11 to 15 MV/m, from 12 to 15 MV/m, and from 11 to 14.5 MV/m.

The volume resistivity as measured in accordance with ASTM D257 is listed in Table 8. Those ceramic sintered bodies having high volume resistivities, from about $1 \times 10^{12}$ to about $10 \times 10^{+13}$ at ambient temperature may be preferable when used to form sintered ceramic components therefrom useful as wafer chucks, RF or dielectric windows, showerheads and other components where high volume resistivity are required. The polycrystalline sintered ceramic body as disclosed herein may have a volume resistivity of from $1 \times 10^{+11}$ to $5 \times 10^{+12}$ at 300° C., and a volume resistivity of from $1 \times 10^{+9}$ to $5 \times 10^{+9}$ at 500° C.

TABLE 8

| sample | Temp (° C.) | ρ (ohm-cm) |
|---|---|---|
| 112 | 23 | 4.27E+12 |
| 113 | 23 | 4.24E+12 |
| 114 | 23 | 9.92E+13 |
| 112 | 300 | 6.52E+11 |
| 113 | 300 | 1.11E+12 |
| 114 | 300 | 9.44E+12 |
| 114 | 500 | 8.30E+09 |

Rare earth oxide corrosion resistant materials such as the family of yttrium aluminum oxides, when applied as a film or coating by known aerosol or plasma spray techniques, typically exhibit high (on the order of greater than 5% to 50%) levels of porosity, and thereby low density. Further, these film or spray coatings may exhibit poor interfacial adhesion between the substrate material and the rare earth oxide coating. The monolithic sintered ceramic body comprising at least one of the yttrium aluminum oxide family, and preferably comprising ≥99% by volume of the cubic YAG phase, having low levels of porosity may provide improved performance in plasma etch and deposition applications and facilitate extensive cleaning to levels required of semiconductor processing systems. This may result in extended component lifetimes, greater process stability and reduced chamber downtime for cleaning and maintenance. Disclosed herein is a nearly dense or fully dense solid body sintered ceramic body having minimal porosity. This minimal porosity may enable reductions in particle generation by preventing entrapment of contaminants in the surface of the sintered ceramic body during etch and deposition processes. Correspondingly, it may be advantageous for the sintered ceramic body to have a small percentage of a surface area comprising porosity, in combination with porosity of small diameters and controlled pore size distribution. The corrosion resistant sintered ceramic body as disclosed herein may have a very high density, for example greater than 97%, greater than 98%, preferably greater than 99%, preferably greater than 99.5%, and correspondingly low volumetric porosity below 3%, below 2%, preferably below 1%, preferably below 0.5% in the sintered ceramic body, providing improved etch resistance by way of controlled area of porosity of the surface, frequency of pores, and fine dimensions/small size of porosity, as illustrated in FIGS. 28a) and b), and FIGS. 29a) and b). FIGS. 28a) and b) illustrate % porosity and cumulative fractional area of porosity, respectively, of the sintered ceramic bodies as disclosed herein. No pores greater than 1 um were measured across all images. FIG. 29a) illustrates a surface of a YAG sintered ceramic body comprising very few pores of small (about 1 um and less) dimension. About 22 pores were counted across the 54 um×54 um surface area.

The crystalline phases of the family of yttrium aluminum oxides may be among the most etch resistant materials known, and the use of high purity starting materials to fabricate a sintered ceramic body of very high purity, low volumetric porosity and high density as a starting material provides etch resistant properties in a sintered ceramic component. However, highly pure yttrium aluminum oxides pose challenges to sinter to the high densities required for application to semiconductor etch chambers. The material properties of the forms of yttrium aluminum oxides of a high sintering temperature and plasma etch resistance present challenges in sintering to high density/low porosity while maintaining the necessary high purity as sintering aids are often required to achieve high (greater than 98%, 99% or 99.5%) density. This high purity may prevent roughening of the surface of the sintered ceramic body by halogen based gaseous species which may otherwise chemically attack, surface-roughen and etch those components made from powders lower in purity.

For improved corrosion and erosion resistance and chemical inertness, the starting oxide powders may have very high purity which may be preserved by the disclosed method herein, and thereby provided in the sintered yttrium aluminum oxide bodies and related components formed therefrom.

The yttrium oxide starting powder may have a total purity of greater than 99.99%, preferably greater than 99.999%, preferably greater than 99.9995%, preferably greater than 99.9999% relative to a powder comprising 100% of yttrium oxide.

Total purity of the aluminum oxide starting powder may be higher than 99.99%, preferably higher than 99.995%, preferably higher than 99.999%, preferably higher than 99.9995% relative to a powder comprising 100% of aluminum oxide.

Total purity of the powder mixture and/or the calcined powder mixture as disclosed herein may be higher than 99.99%, preferably higher than 99.995%, preferably higher than 99.999%, preferably higher than 99.9995%, preferably about 99.9999% relative to a powder mixture comprising yttria and alumina, each at 100% purity.

Total purity of the polycrystalline sintered ceramic body as disclosed herein may be higher than 99.99%, preferably higher than 99.995%, preferably higher than 99.9995% as formed from the powder mixtures as disclosed herein. In embodiments where zirconia media is used for mixing, zirconia may be present in the sintered ceramic body; zirconia present in the sintered body may also result from use as a sintering aid.

The sintered yttrium aluminum oxide bodies, and in particular those comprising the YAG crystalline phase and components fabricated therefrom may exhibit a combination of preferred material properties which may arise from the combined effects of the properties of the starting materials, the powder processing, as well as a method of preparation as is disclosed following.

Method of Preparing

Preparation of the sintered ceramic body may be achieved by use of pressure assisted sintering combined with direct current sintering and related techniques, which employ a direct current to heat up an electrically conductive die configuration or tool set, and thereby a material to be sintered. This manner of heating allows the application of very high heating and cooling rates, enhancing densification mechanisms over grain growth promoting diffusion mechanisms, which may facilitate preparation of ceramic sintered bodies of very fine grain size, and transferring the intrinsic properties of the original powders into their near or fully dense products. Direct current sintering techniques as used herein comprised an unpulsed, DC current to facilitate powder consolidation and densification.

A sintered ceramic body may be prepared by a method comprising the steps of: a) combining powders comprising yttrium oxide and aluminum oxide to make a powder mixture; b) calcining the powder mixture by applying heat to a calcination temperature and maintaining the calcination temperature to perform calcination to form a calcined powder mixture; c) disposing the calcined powder mixture inside a volume defined by a tool set of a sintering apparatus and creating vacuum conditions inside the volume; d) applying pressure to the calcined powder mixture while heating to a sintering temperature and performing sintering to form the sintered ceramic body; and e) lowering the temperature of the sintered ceramic body. The following additional steps are optional; f) annealing the sintered ceramic body by applying heat to raise the temperature of the sintered ceramic body to reach an annealing temperature to form an annealed sintered ceramic body; g) lowering the temperature of the annealed sintered ceramic body; and h) machining the sintered ceramic body or the annealed sintered ceramic body to create a sintered ceramic component such as a dielectric window or RF window, a focus ring, a nozzle or a gas injector, a shower head, a gas distribution plate, an etch chamber liner, a plasma source adapter, a gas inlet adapter, a diffuser, an electronic wafer chuck, a chuck, a puck, a mixing manifold, an ion suppressor element, a faceplate, an isolator, a spacer, and/or a protective ring in etch chambers.

The above-mentioned characteristics of the corrosion resistant sintered component formed from the sintered ceramic body are achieved by adapting the purity of the powders of yttrium oxide and aluminum oxide, the combining of the powders, the calcination of the powders, the pressure applied to the powders of yttrium oxide and aluminium oxide, the temperature of the powders of yttrium oxide and aluminium oxide, the duration of sintering the powders, the temperature of the sintered ceramic body/sintered ceramic component during the optional annealing step, and the duration of the optional annealing step. The method as disclosed herein is suitable for the production of ceramic sintered bodies, in particular those of large dimension, using a scalable manufacturing process.

The method disclosed herein provides for the preparation of sintered ceramic bodies and sintered components to include preferably 90 to 99.9% by volume of yttrium aluminum garnet of composition $Y_3Al_5O_{12}$ (YAG), and in alternate embodiments comprising YAG from 90 to 99.8% by volume and at least one crystalline phase of yttria and alumina in an amount from about 0.2 to 3% by volume, and in some embodiments the ceramic sintered bodies and sintered components may further comprise yttrium aluminum perovskite of composition $YAlO_3$ (YAP) and/or yttrium aluminum monoclinic of composition $Y_4Al_2O_9$ (YAM), and combinations thereof.

In embodiments, the aforementioned ceramic sintered bodies may be made with optional dopants of a rare earth oxide selected from the group consisting of Sc, La, Er, Ce, Cr, Pr, Nd, Pm, Sm, Eu, Gd, Tb, Dy, Ho, Tm, Yb, and Lu and oxides and combinations thereof in amounts of ≥0.0001%, preferably ≥0.0005%, preferably ≥0.0010%, preferably ≥0.0025%, each by weight relative to the total mass of the starting oxide powders, whereby the optional dopant may be added into the starting powders, powder mixture or calcined powder mixture. In further embodiments, the aforementioned ceramic sintered bodies may be made with an optional dopant of Li in the form of LiF in amounts of ≥0.0001%, preferably ≥0.0005%, preferably ≥0.0010%, preferably ≥0.0025% by weight relative to the total mass of the starting oxide powders, whereby the Li in the form of LiF may be added into the starting powders, powder mixture or calcined powder mixture.

In embodiments, the aforementioned ceramic sintered bodies may be made with optional dopants of a rare earth oxide selected from the group consisting of Sc, La, Er, Ce, Cr, Pr, Nd, Pm, Sm, Eu, Gd, Tb, Dy, Ho, Tm, Yb, and Lu and oxides and combinations thereof in amounts of ≤0.05%, preferably ≤0.03%, preferably ≤0.01%, preferably ≤0.0075%, preferably ≤0.0050%, preferably ≤0.0025%, each by weight relative to the total mass of the starting oxide powders, whereby the optional dopant may be added into the starting powders, powder mixture or calcined powder mixture. In further embodiments, the aforementioned ceramic sintered bodies may be made with an optional dopant of LiF in amounts of ≤0.05%, preferably ≤0.03%, preferably ≤0.01%, preferably ≤0.0075%, preferably ≤0.0050%, preferably ≤0.0025% each by weight relative to the total mass of the starting oxide powders, whereby the Li in the form of LiF may be added into the starting powders, powder mixture or calcined powder mixture.

In some embodiments, a starting powder comprising yttrium aluminium garnet (YAG) may be used in step a in combination with the optional dopants and/or sintering aids in the ranges as disclosed.

In alternate embodiments as disclosed herein, the aforementioned ceramic sintered bodies may be made without at least one of, or all of, the aforementioned dopants. In particular, for semiconductor chamber applications requiring chemical inertness and resistance to corrosion and erosion, it may be preferable that the sintered ceramic body is free of dopants. Thus, in certain embodiments, the sintered ceramic body is substantially free of, or free of, at least one of, or all of, the aforementioned dopants.

Sintering aids may be used as needed in the preparation of the polycrystalline sintered ceramic bodies as disclosed herein, however they are not required and are optional. In specific embodiments, the aforementioned YAG sintered ceramic body may comprise a sintering aid selected from the group consisting of zirconia, calcia, magnesia and combinations thereof. These sintering aids may be added in amounts of ≥0.0002%, preferably ≥0.0005%, preferably ≥0.0010%, preferably ≥0.0025%, each by weight relative to the total mass of the starting oxide powders. In certain embodiments, Si in the form of silica may also be optionally used as a sintering aid and may be added in the form of tetraethyl orthosilicate (TEOS). Using the ICPMS methods as disclosed herein, Si in the form of $SiO_2$ may be detected at levels of about 14 ppm and greater, thus silica as a sintering aid may be present in amounts of ≥0.0014%, preferably ≥0.0025%, preferably ≥0.0050%, preferably ≥0.0075% each relative to the total mass of the starting oxide powders.

In specific embodiments, the aforementioned YAG sintered ceramic body may comprise an optional sintering aid selected from the group consisting of zirconia, calcia, magnesia and combinations thereof. The optional sintering aids may be present in amounts of ≤0.05%, preferably ≤0.03%, preferably ≤0.01%, preferably ≤0.0075%, preferably ≤0.0050%, preferably ≤0.0025%, each by weight relative to the total mass of the starting oxide powders, whereby the optional dopant may be added into the starting powders, powder mixture or calcined powder mixture.

In the case of silica, it may be optionally added in the form of tetraethyl orthosilicate (TEOS). The silica may be added in amounts of ≤0.05% by weight, preferably ≤0.03% by weight, preferably ≤0.02% by weight, preferably ≤0.01% by weight, preferably ≤0.050% by weight, preferably ≤0.025%, each by weight relative to the total mass of the starting oxide powders, whereby silica may be added into the starting powders, powder mixture or calcined powder mixture.

Using the materials and methods as disclosed herein, high densities, for example 96% and greater of theoretical density for phase pure YAG may be achieved for the sintered ceramic body as disclosed without the use of sintering aids. For certain applications requiring chemical inertness and resistance to corrosion and erosion, it may be preferable that the sintered ceramic body is free of at least one of, or all of, sintering aids. Thus, in embodiments, the sintered ceramic body is substantially free of, or free of, at least one of, or all of, the aforementioned sintering aids. In further embodiments, the sintered ceramic body may comprise Si in the form of $SiO_2$ in amounts of about 14 ppm relative to the total mass of the sintered ceramic body as measured using ICPMS methods.

In embodiments, the sintered ceramic body comprising from 90% to 99.8% by volume of polycrystalline YAG may comprise excess yttria and/or alumina beyond that of stoichiometric YAG, whereby the excess yttria and/or alumina may remain from the process or may be intentionally added during powder batching and preparation. The excess yttria and/or alumina are therefore not considered dopants or sintering aids to the extent they may remain in the sintered ceramic body.

The characteristics of the sintered ceramic body and sintered ceramic components according to an embodiment are achieved in particular by adapting step a) combining powders and b) calcining the powder mixture before sintering, the purity, the particle size and surface area of the starting powders of yttrium oxide, aluminium oxide and where applicable the yttrium aluminium garnet (YAG) powder used in step a), the surface area and uniformity of the starting materials used in step a), the pressure to the powder mixture in step d), the sintering temperature of the powder mixture in step d), the duration of sintering of the powder mixture in step d), the temperature of the sintered ceramic body or component during the optional annealing step in step f), and the duration of the optional annealing step f). In embodiments, the process as disclosed provides for preparation of highly phase pure YAG of greater than 99% by volume cubic crystallographic structure having high (>98%) density, high purity and low porosity. In alternate embodiments, the process as disclosed provides for preparation of highly phase pure YAG of 95% and greater by volume cubic crystallographic structure with a second crystallographic phase of alumina of 5% and less by volume, the sintered body also having high density, high purity and low porosity. In further embodiments, the process as disclosed provides for preparation of mixed phase and/or phase-pure ceramic sintered bodies of preferably yttrium aluminium garnet, $Y_3Al_5O_{12}$ (YAG), yttrium aluminum perovskite $YAlO_3$ (YAP) and/or yttrium aluminum monoclinic $Y_4Al_2O_9$ (YAM) and combinations thereof, having high purity, high density and low porosity. The sintered ceramic body as disclosed is particularly suitable for use in a plasma processing apparatus such as a semiconductor manufacturing apparatus. Such parts or members may include windows, nozzles, gas injectors, shower heads, (etch) chamber liners, mixing manifolds, wafer supports, electronic wafer chucks, and various rings such as focus rings and protective rings, among other components.

Step a) of the method disclosed herein comprises combining powders comprising yttrium oxide and aluminum oxide to make a powder mixture. The starting powder materials of aluminium oxide and yttrium oxide (or in certain embodiments yttrium aluminum garnet (YAG) powder) for forming a corrosion resistant sintered ceramic body and subsequent component are preferably high purity commercially available powders. However, other oxide powders may be used, for example those produced from chemical synthesis processes and related methods. Powder features such as the specific surface area (SSA), and particle sizes were measured for the starting powders. As disclosed following, the d50 is defined as the median and represents the value where half of the population resides above this point, and half resides below this point. Similarly, 90 percent of the distribution lies below the d90, and 10 percent of the population lies below the d10.

The d10 particle size of the yttrium oxide powder used as a starting material according to one embodiment of the present invention is preferably from 1 to 7 μm, preferably from 1 to 6 μm, preferably from 1 to 5 μm, preferably from 2 to 7 μm, preferably from 3 to 7 μm, preferably from 4 to 7 μm, preferably from 5 to 7 μm.

The d50 particle size of the yttrium oxide powder used as a starting material according to one embodiment of the present invention is preferably from 3 to 11 μm, preferably from 3 to 9.5 μm, preferably from 3 to 8.5 μm, preferably from 3 to 7.5 μm, preferably from 4 to 11 μm, preferably from 5 to 11 μm, preferably from 6 to 11 μm, preferably from 7 to 11 μm.

The d90 particle size of the yttrium oxide powder used as a starting material according to one embodiment of the present invention is preferably from 6 to 20 μm, preferably from 6 to 18 μm, preferably from 6 to 16 μm, preferably from 8 to 20 μm, preferably from 10 to 20 μm, preferably from 15 to 20 μm, preferably from 8 to 18 μm, preferably from 10 to 18 μm.

The yttrium oxide powder usually has a specific surface area (SSA) of from 0.75 to 12 $m^2/g$, preferably from 0.75 to 10 $m^2/g$, preferably from 0.75 to 8 $m^2/g$, preferably from 0.75 to 6 $m^2/g$, preferably from 0.75 to 4 $m^2/g$, preferably from 0.75 to 2 $m^2/g$, preferably from 1 to 6 $m^2/g$, preferably from 1 to 4 $m^2/g$, preferably from 2 to 10 $m^2/g$, preferably from 4 to 10 $m^2/g$, preferably from 6 to 10 $m^2/g$, preferably from 1 to 4 $m^2/g$.

The purity of the yttrium oxide starting material is preferably higher than 99.99%, preferably higher than 99.995%, preferably higher than 99.999%, more preferably higher than 99.9995%, and more preferably higher than 99.9999%. This corresponds to impurity levels of 100 ppm and less, preferably 50 ppm and less, preferably 25 ppm and less, preferably 10 ppm and less, more preferably about 1 ppm, preferably from 1 to 100 ppm, preferably from 1 to 50 ppm, preferably from 1 to 25 ppm, preferably from 1 to 10 ppm, preferably from 1 to 5 ppm, each relative to a total mass of the yttrium oxide starting material.

The d10 particle size of the aluminum oxide powder used as a starting material according to one embodiment of the present invention is preferably from 0.05 to 4 μm, preferably from 0.05 to 3 μm, preferably from 0.05 to 2 μm, preferably from 0.05 to 1 μm, preferably from 0.05 to 0.75 μm, preferably from 0.05 to 0.5 μm, preferably from 0.2 to 4 μm, preferably from 0.2 to 3 μm, preferably from 0.2 to 2 μm, preferably from 0.2 to 1 μm, preferably from 0.4 to 4 μm, preferably from 0.4 to 3 μm, preferably from 0.4 to 2 μm, preferably from 0.4 to 1 μm, preferably from 0.75 to 2 μm, preferably from 0.75 to 3 μm, preferably from 1 to 3 μm, preferably from 2 to 3 μm.

The d50 particle size of the aluminum oxide powder used as a starting material according to one embodiment is usually from 0.15 to 8 μm, preferably from 0.15 to 5 μm, preferably from 0.15 to 3 μm, preferably from 0.15 to 1 μm, preferably from 0.15 to 0.5 μm, preferably from 1 to 8 μm, preferably from 1 to 6 μm, preferably from 1 to 4 μm, preferably from 2 to 6 μm, preferably from 3 to 8 μm, preferably from 4 to 8 μm, preferably from 5 to 8 μm, preferably from 3.5 to 6.5 μm.

The d90 particle size of the aluminum oxide powder used as a starting material according to one embodiment of the present invention is from 0.35 to 60 um, preferably from 0.35 to 10 um, preferably from 0.35 to 5 μm, preferably from 0.35 to 3 μm, preferably from 0.35 to 1 μm, preferably from 0.35 to 0.75 μm, preferably from 3 to 80 um, preferably from 3 to 60 μm, preferably from 3 to 40 μm, preferably from 3 to 20 μm, preferably from 10 to 60 μm, preferably from 10 to 40 μm, preferably from 10 to 30 μm, preferably from 10 to 20 μm, preferably from 30 to 60 μm, preferably from 15 to 60 μm, preferably from 40 to 60 μm, preferably from 6 to 15 μm.

The aluminum oxide powder usually has a specific surface area of from 3 to 18 $m^2/g$, preferably from 3 to 16 $m^2/g$, preferably from 3 to 14 $m^2/g$, preferably from 3 to 12 $m^2/g$, preferably from 3 to 10 $m^2/g$, preferably from 3 to 6 $m^2/g$, preferably from 6 to 18 $m^2/g$, preferably from 6 to 14 $m^2/g$, preferably from 8 to 18 $m^2/g$, preferably from 10 to 18 $m^2/g$, preferably from 8 to 10 $m^2/g$, preferably from 4 to 9 $m^2/g$, preferably from 5 to 10 $m^2/g$, preferably from 6 to 8 $m^2/g$.

The purity of the aluminum oxide starting material is typically higher than 99.99%, preferably higher than 99.995%, preferably higher than 99.999%, preferably higher than 99.9995%, as measured using ICPMS methods. Correspondingly, the impurity content of the alumina powder may be 100 ppm and less, preferably 50 ppm and less, preferably 25 ppm and less preferably 10 ppm and less, more preferably 5 ppm and less, each relative to a total mass of the aluminum oxide starting material.

Figure 15:
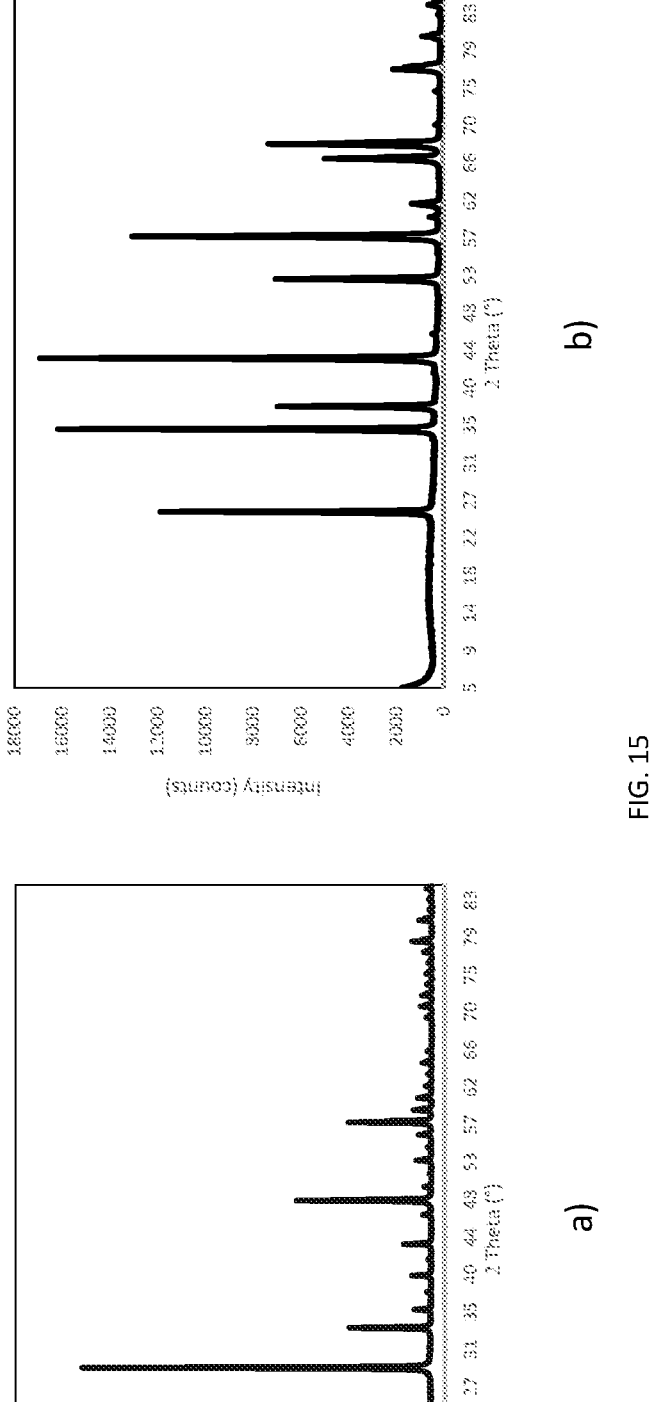
FIG. 15 depicts exemplary x ray diffraction patterns for representative starting crystalline powders of a) yttria and b) alumina as disclosed herein.

The starting powders as disclosed herein of yttria and alumina are preferably crystalline, and thereby have a long-range crystallographic order. X ray diffraction patterns for exemplary crystalline yttrium oxide and aluminum oxide starting powders as disclosed herein are depicted in FIGS. 15a) and b) respectively. In embodiments, the aluminum oxide powder as depicted in FIG. 15b) may preferably comprise from 80 to at least 95% by volume of the alpha alumina crystallographic phase, preferably from 90 to at least 95% by volume of the alpha alumina crystallographic phase, preferably about 95% by volume of the alpha alumina crystallographic phase.

Either or both of the starting powders of yttria and alumina may be sieved, tumbled, blended, milled, etc. according to methods known to those skilled in the art. In some embodiments, the starting powders of yttria and/or alumina may be optionally calcined according to methods as known to those skilled in the art to achieve the powder characteristics as disclosed herein.

Starting powders, powder mixtures and calcined powder mixtures having high specific surface areas (SSAs) such as those nanopowders exceeding 20 $m^2/g$ pose issues in handleability when loading the tool set with powder, achieving uniform particle dispersion and mixing during the powder combination/mixing step, and formation of the YAG phase during the in-situ, reactive sintering method as disclosed herein. The starting powders in accordance with the method as disclosed herein comprise yttria and alumina and preferably have specific surface areas which are less than those of nanopowders as defined herein. Using the volumetric mixing rule as known to those skilled in the art and the ranges for yttria and alumina starting powders disclosed herein, the powder mixture (before calcination) preferably has a SSA of from about 1 $m^2/g$ to about 13 $m^2/g$, preferably from about 2 $m^2/g$ to about 10 $m^2/g$, preferably from about 3 $m^2/g$ to about 8 $m^2/g$. Surface areas of the starting powders of yttria and alumina within the ranges as disclosed herein facilitate the subsequent formation of a calcined powder mixture having a specific surface area within a range which may provide sufficient driving for in-situ reaction during sintering to preferentially form the YAG phase. The starting powders of yttria and alumina preferably have SSAs from 0.75 to 18 $m^2/g$. In embodiments, the starting powders, the powder mixture and calcined powder mixture according to the method as disclosed herein comprise specific surface areas (SSAs) less than that of nanopowders as defined herein, and as such, the starting powders, the powder mixtures and calcined powder mixtures are substantially free of, or free of, nanopowders as defined herein.

Starting powders having specific surface areas of less than about 0.5 $m^2/g$ may suffer from agglomeration and require higher energy for mixing and longer mixing times to combine to form the powder mixtures as disclosed herein. The particle size distributions and specific surface areas disclosed herein for the yttrium oxide and aluminium oxide starting powders provide sufficient handleability and thorough mixing during step a) powder combining of the method as disclosed herein.

In embodiments, the d50 particle size of the yttrium aluminium garnet (YAG) powder used as a starting material/powder is typically from 3 to 10 μm, preferably from 4 to 9 μm, and more preferably from 5 to 8 μm. The yttrium aluminium garnet (YAG) powder typically has a specific surface area of from 3 to 10 $m^2/g$, preferably from 3 to 8 $m^2/g$, and more preferably from 4 to 6 $m^2/g$. The purity of the yttrium aluminium garnet (YAG) powder starting material is typically higher than 99.99%, preferably higher than 99.999%.

In certain embodiments, formation of greater than 99 volume % phase pure YAG sintered bodies may be affected by the yttria and alumina particle size distribution, purity, surface area of the starting powders, mixing and calcination steps.

Table 9 lists characteristics of the starting powders as disclosed to form a sintered body comprising YAG. Particle sizes for the starting powders, powder mixtures and calcined powder mixtures were measured using a Horiba model LA-960 Laser Scattering Particle Size Distribution Analyzer capable of measuring particle size from 10 nm to 5 mm. Specific surface area for the starting powders, powder mixtures and calcined powder mixtures was measured using a Horiba BET Surface Area Analyzer model SA-9601 capable of measuring across a specific surface area of 0.01 to 2000 $m^2/g$ with an accuracy of 10% and less for most samples.

TABLE 9

|  | d10 (um) | d50 (um) | d90 (um) | SSA ($m^2/g$) |
|---|---|---|---|---|
| yttrium oxide | 1 to 7 | 3 to 11 | 6 to 20 | 0.75 to 12 |
| aluminum oxide | 0.05 to 4 | 0.15 to 8 | 0.35 to 60 | 3 to 18 |

In embodiments, the sintered ceramic body comprising from 90% to 99.8% by volume of polycrystalline yttrium aluminium garnet (YAG) garnet cubic phase $(Y_3Al_5O_{12})$ may be formed from a stoichiometric powder mixture of 37.5 mol % yttrium oxide and 62.5 mol % aluminum oxide. Studies reported in "Mechanisms of nonstoichiometry in $Y_3Al_5O_{12}$" Patel et al, 2008, Appl. Phys. Lett. 93, 191902 (2008) indicated that the width of the phase domain for formation of the YAG phase may have a variance of 0.1 mol % and less. Thus, deviations of 0.1 mol % and less from that of stoichiometric YAG (37.5% alumina/62.5% yttria) may result in formation of phase pure yttrium aluminum oxide garnet. Accordingly, in embodiments a sintered ceramic body comprising yttrium aluminium garnet (YAG) garnet cubic phase $(Y_3Al_5O_{12})$ in an amount of greater than 99% by volume may be formed from starting powders combined into a powder mixture in a ratio of from 37.4 to 37.6 mol % yttrium oxide and 62.6 and 62.4% mol aluminum oxide. By weight, a powder mixture may be formed from about 42.9 to 43.4% alumina and 57.1 to 56.6% yttria to form up to and including 99.9% by volume of YAG. In embodiments, excess starting materials of yttria and/or alumina may be included as desired to the powder mixture. Optionally, dopants and/or sintering aids may be added to the powder mixture.

Combining the aforementioned starting powders comprising yttrium oxide and aluminum oxide to make a powder mixture may be performed using the powder preparation techniques of wet or dry ball (axially rotating) milling, wet or dry tumble (end over end or vertical) mixing, jet milling, and combinations of these.

Using dry conditions, the starting powders, which may in preferred embodiments be weighed in relative amounts to form the YAG phase, may be ball milling or end-over-end/tumble mixed using high purity (>99.9%) alumina media in order to preserve the purity of the starting powders during mixing. In other embodiments, zirconia media may be used to break up hard agglomerates. The high purity alumina media was tested using ICPMS methods as disclosed herein and found to have a purity of from 99.9 to about 99.99%. Use of zirconia media may result in trace amounts, such as less than 100 ppm, of zirconia in the sintered ceramic body. Thus, in certain embodiments, disclosed herein is a sintered ceramic body comprising phase pure YAG having zirconia in amounts of from 1 to 100 ppm, preferably from 1 to 50 ppm, preferably from 10 to 100 ppm, preferably from 10 to 50 ppm, more preferably from 20 to 40 ppm, relative to a total mass of the oxides calculated from the contents of all constituents. Media used to perform dry ball milling may have a range of dimensions, from for example 5 to 15 mm in diameter, added at a loading of from about 50 to about 100% by powder weight. Media used to perform dry tumble mixing may comprise at least one media element of large dimension (from about 20 to 40 mm diameter). Dry ball milling and/or dry tumble mixing may be performed for durations of from 12 to 48 hours, preferably from 16 to 48 hours, preferably from 16 to 24 hours, preferably from 18 to 22 hours. Dry ball milling or tumble milling processes may use an RPM of from 50 to 250 RPM, preferably from 75 to 200 RPM, preferably from 75 to 150 RPM, preferably from 100 to 125 RPM, each for containers having about 200 mm diameter. RPMs may vary dependent upon the dimensions of containers selected for use, and as such, those containers greater than 200 mm in diameter may have correspondingly lower RPMs as known to those skilled in the art. Dry end-over-end/tumble mixing may be performed at an RPM of from 10 to 30 rpm, preferably about 20 RPM. After dry ball milling and/or end-over-end/tumble milling/mixing, the powder mixture may be optionally sieved using any number of meshes which may have openings of for example from 45 to 400 um, and blended, without limitation as to repetition or order.

Wet ball milling or wet end-over-end/tumble mixing may be performed by suspending the starting powders, which may in preferred embodiments weighed in relative amounts to form the YAG phase, in various solvents such as ethanol, methanol, and other alcohols, to form a slurry. The slurries in either process may be formed having a powder loading during milling or mixing of from 25 to 75% by powder weight, preferably from 40 to 75% by powder weight, preferably from 50 to 75% by powder weight. Wet ball milling or wet end-over-end/tumble mixing may provide for improved dispersion of the powders through increased mobility, resulting in fine scale, uniform mixing before heat treatment or calcination. In embodiments, a dispersant may optionally be added to the slurry using any number of commercially available dispersants such as for example poly methyl methacrylate (PMMA) and polyvinyl pyrrolidone (PVP) and other dispersants as known to those skilled in the art. The dispersant may optionally be added in amounts from 0.05 to 0.2% by powder weight, preferably from 0.05 to 0.1% by powder weight. Media loadings for either wet ball or wet tumble/end-over-end mixing may be varied from a loading of 30 to 100% by powder weight, preferably from 30 to 75% by powder weight, preferably from 30 to 60% by powder weight. Wet ball milling or tumble mixing may be performed for durations of from 8 to 48 hours, preferably from 12 to 48 hours, preferably from 16 to 48 hours, preferably from 8 to 36 hours, preferably from 8 to 24 hours, preferably from 16 to 24 hours preferably from 12 to 24 hours. Ball milling may use an RPM of from 50 to 250 RPM, preferably from 75 to 200 RPM, preferably from 75 to 150 RPM, preferably between 100 and 125 RPM, each for containers having about 200 mm diameter. RPMs may vary dependent upon the dimensions of containers selected for use, and those greater than for example 200 mm in diameter may have correspondingly lower RPM as known to those skilled in the art. Wet end over end/tumble mixing may be performed at an RPM of from 10 to 30 rpm, preferably about 20. After wet ball milling and/or wet end-over-end/tumble mixing, the powder mixture may be optionally sieved using any number of meshes which may have openings of for example from 45 to 400 um, and blended, without limitation as to repetition or order.

Jet milling processes as known to those skilled in the art may also be used to thoroughly mix the powders to form a powder, powder mixture or calcined powder mixture having a narrow particle size distribution. Jet milling uses high velocity jets of either inert gases or air to collide particles of the starting powders and/or powder mixtures and/or calcined powder mixtures without the use of milling or mixing media, thus preserving initial purity of the powder to be milled. The chamber may be designed such that larger particles may be preferentially reduced in size, which may provide a narrow particle size distribution in the final powders, powder mixture or calcined powder mixture. Powders exit the jet milling chamber upon reaching a desired particle size as determined at setup of the machine prior to processing. Starting powders, powder mixtures and/or calcined powder mixtures as disclosed herein may be subjected to jet milling at pressures of about 100 psi, whether separately, or in combination with any, or all of, the as disclosed powder milling/mixing processes as disclosed herein. After jet milling, the powders or powder mixtures may be optionally sieved using any number of meshes which may have openings of for example from 45 to 400 um, and blended, without limitation as to repetition or order.

Use of wet or dry ball milling, wet or dry tumble/end-over-end mixing and/or jet milling are high energy processes which break down particulates and agglomerates, improve dispersion through increased particle mobility and provide for fine scale mixing, which may provide a homogeneous powder mixture prior to and after calcination. The aforementioned powder preparation methods may be used separately or in combination with one another. The additional powder preparation procedures of attrition milling, high shear mixing, planetary milling, and other procedures as known to those skilled in the art may also be applied whether separately or in combination with the aforementioned powder mixing/milling methods as disclosed herein.

Where wet mixing or milling processes are used, the slurry may be dried by rotary evaporation methods for example at a temperature of from about 40° C. to 90° C. for a duration of from 1 to 4 hours, dependent upon the volume of slurry to be dried, as known to those skilled in the art. In other embodiments, the slurry may be dried using spray drying techniques as known to those skilled in the art. After drying, the powder mixture may be optionally sieved using a mesh having openings of for example from 45 to 400 um, and blended, without limitation as to repetition or order. The aforementioned powder preparation techniques may be used alone or in any combination thereof.

After drying, the surface area of the powder mixture of step a. may be from 2 to 17 $m^2$/g, from 2 to 14 $m^2$/g, from 2 to 12 $m^2$/g, from 2 to 10 $m^2$/g, from 4 to 17 $m^2$/g, from 6 to 17 $m^2$/g, from 8 to 17 $m^2$/g, from 10 to 17 $m^2$/g, from 4 to 12 $m^2$/g, from 4 to 10 $m^2$/g, from 5 to 8 $m^2$/g.

The purity of the powder mixture may be maintained after mixing/milling from that of the starting materials through the use of milling media of high purity, for example aluminum oxide media of purity 99.99% and greater. In embodiments, use of zirconium oxide milling media may be preferable and may introduce zirconium oxide to the extent it remains in the sintered ceramic body in amounts of from 15 to 100 ppm, from 15 to 75 ppm, preferably from 15 to 60 ppm, preferably from 20 to 30 ppm.

Step b) of the method disclosed herein comprises heating the powder mixture to a calcination temperature and maintaining the calcination temperature for a duration to form a calcined powder mixture. Calcination as disclosed herein may be performed under ambient pressure in an oxygen containing environment, although other pressures and calcination environments may be used.

Calcination may be performed to remove moisture and ensure the surface condition of the powder mixture is uniform prior to sintering. In certain embodiments, calcination may be performed to reduce surface area. In other embodiments, calcination does not cause a reduction in surface area of the starting powders.

Calcination of the powder mixture in accordance with the heat treatment step may be performed at temperatures of from 600° C. to 1100° C., preferably from 600 to 1050° C., preferably from 600 to 1000° C., preferably from 700 to 1100° C., preferably from 800 to 1100° C., preferably from 800 to 1050° C., preferably from 900 to 1100° C., and preferably from 1000 to 1100° C. Calcination may be performed for durations of from 4 to 12 hours, preferably from 4 to 10 hours, preferably from 4 to 8 hours, preferably from 6 to 12 hours, preferably from 4 to 6 hours in an oxygen containing environment. The powder mixtures and/or calcined powder mixtures may be optionally sieved using a mesh having openings of for example from 45 to 400 um, and may be tumbled and/or mixed and/or blended and combinations thereof without limitation as to repetition or order as performed according to known methods. Tumbling and/or blending and/or mixing may be performed on the powder mixtures and/or calcined powder mixtures using high purity (>99.9%) alumina media, zirconia media as disclosed herein, or without media according to known methods.

The calcined powder mixture combined in a ratio to preferentially form the YAG phase upon sintering may have a d10 particle size of preferably from 0.06 to 4 μm, preferably from 0.08 to 4 μm, preferably from 0.1 to 4 μm, preferably from 0.2 to 4 μm, preferably from 0.3 to 4 μm, preferably from 0.4 to 4 μm, preferably from 0.08 to 3 μm, preferably from 0.08 to 2 μm, preferably from 0.08 to 1 μm, preferably from 0.5 to 3 μm, preferably from 1 to 2 μm, preferably from 1 to 3 μm.

The d50 particle size of the calcined powder mixture may vary from 0.7 to 50 μm, preferably from 1 to 40 μm, preferably from 1 to 30 μm, preferably from 1 to 20 μm, preferably from 1 to 10 μm, preferably from 1 to 5 μm, preferably from 5 to 50 μm, preferably from 10 to 50 μm, preferably from 20 to 50 μm, preferably from 30 to 50 μm, preferably from 3 to 8 μm, preferably from 5 to 10 μm, preferably from 6 to 15 μm.

The d90 particle size of the calcined powder mixture may be preferably from 10 to 350 μm, preferably from 10 to 300 μm, preferably from 10 to 250 μm, preferably from 10 to 200 μm, preferably from 10 to 175 μm, preferably from 10 to 150 μm, preferably from 10 to 100 μm, preferably from 10 to 75 μm, preferably from 10 to 50 μm, preferably from 10 to 40 μm, preferably from 10 to 30 μm, preferably from 15 to 45 μm, preferably from 20 to 40 μm, preferably from 20 to 350 μm, preferably from 40 to 350 μm, preferably from 60 to 350 μm, preferably from 100 to 350 μm, preferably from 150 to 350 μm, preferably from 200 to 350 μm, preferably from 12 to 330 um, preferably from 100 to 330 μm, preferably from 100 to 250 μm.

In certain embodiments, the calcination conditions as disclosed herein may result in formation of one or more of the crystalline phases of YAP, YAM and YAG and combinations thereof, and/or agglomeration of the powder mixture and thus a broad range of particle or agglomerate sizes may result. Thus, in embodiments, the particle size as referred to herein may include a single particle and in other embodiments, the particle size as referred to herein may include an agglomerate comprising more than one particle or an agglomeration of multiple particles which may be measured, using the laser particle size detection methods as disclosed herein, as a single, large particle. Particles comprising either or both of a single particle or an agglomerate of multiple particles may comprise at least one crystalline phase selected from the group consisting of yttrium oxide, aluminum oxide, yttrium aluminium perovskite (YAP), yttrium aluminium monoclinic (YAM), and YAG (garnet) phase, and combinations thereof. In other embodiments, lower temperature calcination conditions as disclosed herein may not affect particle size distributions relative to the starting materials and particle size distributions are in the same range, or similar to, the starting powder materials. Lot to lot variation and management of heat transfer during calcination may also contribute to broadened particle size distributions. The starting powders, powder mixtures and/or the calcined powder mixtures as disclosed herein may be subjected to any one or a combination of the mixing/milling processes as disclosed herein. Thus, a broad range of particle size distributions may result from calcination conditions and processes as disclosed herein.

The specific surface area (SSA) of the starting powders may be measured using BET methods as known to those skilled in the art. The calcined powder mixture may have a specific surface area of from 2 to 12 $m^2/g$, preferably from 2 to 10 $m^2/g$, preferably from 2 to 8 $m^2/g$, preferably from 2 to 6 $m^2/g$, preferably from 4 to 12 $m^2/g$, preferably from 6 to 12 $m^2/g$, preferably from 8 to 12 $m^2/g$, preferably from 4 to 10 $m^2/g$, preferably from 6 to 10 $m^2/g$, preferably from 8 to 10 $m^2/g$, preferably from 3 to 9 $m^2/g$, preferably from 2 to 8 $m^2/g$, preferably from 4 to 8 $m^2/g$, preferably from 4 to 6 $m^2/g$.

Table 10 lists ranges of measured particle sizes and specific surface area (SSA) characteristics as measured by laser particle size and BET methods and equipment as disclosed herein for calcined powder mixtures made by the wet ball milling process, using either axial or tumble/end over end mixing methods as disclosed herein and used to form a sintered ceramic body comprising YAG.

TABLE 10

| Powder | d10 (um) | d50 (um) | d90 (um) | SSA ($m^2/g$) |
|---|---|---|---|---|
| 247 | 0.12 to 0.18 | 3.2 to 4.3 | 12 to 16 | 4 to 5 |
| 359-05 | 0.36 to 0.51 | 7.3 to 9.8 | 25 to 36 | 3 to 4 |
| 286 (50 ppm Zr) | 0.15 to 0.45 | 4.5 to 7.0 | 17 to 24 | 2.5 to 4.5 |
| 299 | 0.16 to 0.22 | 6.4 to 8.7 | 30 to 42 | 3 to 4 |
| 300 | 0.18 to 0.25 | 6.7 to 9.1 | 23 to 33 | 3 to 4 |
| 247-1 | 0.21 to 0.3 | 5.1 to 6.8 | 126 to 178 | 3.5 to 4.5 |
| 12 | 0.52 to 0.73 | 4.9 to 6.6 | 93 to 132 | 3.5 to 4.5 |
| 8 | N/A | N/A | N/A | 2.5 to 3.5 |
| 279 (25 ppm SiO2) | N/A | N/A | N/A | 4.5 to 5.5 |
| 280 (160 ppm CeO2) | N/A | N/A | N/A | 9 to 10 |
| 347 (300 ppm Yb2O3) | 0.4 to 0.57 | 6.4 to 8.6 | 54 to 77 | 3 to 4 |
| 092-1 | 1.5 to 3.5 | 10 to 13 | 180 to 220 | 2.5 to 3.5 |
| 092-3 | 0.18 to 0.26 | 6.6 to 8.9 | 107 to 151 | 7 to 8 |
| 194-2 | 0.75 to 2.0 | 26 to 32 | 220 to 240 | 4 to 5 |
| 615 (54 ppm Zr) | 0.5 to 0.85 | 35 to 45 | 270 to 290 | 3.5 to 5 |
| 359-09 | 0.15 to 0.25 | 5.0 to 7.0 | 18 to 22 | 4 to 5 |
| 359-06 | 0.3 to 0.6 | 8 to 11 | 20 to 24 | 3.5 to 4.5 |
| 359-11 | 0.15 to 0.25 | 5 to 7 | 18 to 24 | 4 to 5 |
| 381 | 0.1 to 0.15 | 4.6 to 6.3 | 20 to 28 | 4 to 5 |
| 20261 | 1 to 3.5 | 5 to 8 | 130 to 160 | 3.5 to 5.5 |
| 20099 | N/A | N/A | N/A | 4 to 5 |
| 398-2 | N/A | N/A | N/A | 5 to 7 |
| 145 | 0.07 to 0.3 | 0.7 to 1.5 | 18 to 32 | 6.2 to 8.2 |

Zirconia in powder 286 was achieved through the addition of zirconyl chloride, and zirconia powder 615 was a result of the mixing process using zirconia media as described in example fifteen.

Phase identification of the calcined powder mixtures and ceramic sintered bodies as disclosed herein was performed using a PANanlytical Aeris model XRD capable of crystalline phase identification to about +/−5%. Dependent upon the calcination conditions of temperature and duration, in embodiments, calcination may result in a calcined powder mixture comprising yttrium oxide and aluminium oxide present from the starting powders. In other embodiments, higher temperature calcination conditions may result in a calcined powder mixture comprising at least one crystalline phase selected from the group consisting of yttrium oxide, aluminium oxide and the YAM (monoclinic) phase. In other embodiments, the higher temperature calcination conditions may result in a calcined powder mixture comprising at least one crystalline phase selected from the group consisting of yttrium oxide, aluminium oxide, the YAM (monoclinic) phase and the YAP phase. In alternate embodiments, the higher temperature calcination conditions may result in a calcined powder mixture comprising at least one crystalline phase selected from the group consisting of the YAM (monoclinic) phase and the YAP (perovskite) phase; in further embodiments, the higher temperature calcination conditions may result in a calcined powder mixture comprising the YAP (perovskite) phase and/or the YAG (garnet) phase wherein the YAG phase may be present in amounts of less than 10% by volume, preferably less than 8% by volume, preferably less than 5% by volume. In embodiments, the calcined powder mixture may comprise at least one crystalline phase selected from the group consisting of yttrium oxide, aluminum oxide, yttrium aluminium perovskite (YAP), yttrium aluminium monoclinic (YAM) and combinations thereof. In other embodiments, the calcined powder mixture may comprise at least one crystalline phase selected from the group consisting of yttrium oxide, aluminum oxide, yttrium aluminium perovskite (YAP), yttrium aluminium monoclinic (YAM), and YAG (garnet) phase wherein the YAG phase is present in an amount of less than 10% by volume, preferably less than 8% by volume, preferably less than 5% by volume, and combinations thereof. Calcination of the powder mixture will result in a calcined powder mixture which is preferably crystalline, comprising one or more crystalline phases as disclosed herein, and combinations thereof.

Table 11 lists calcination conditions, crystalline phases as measured by x ray diffraction (XRD) and purity of the calcined powder mixtures according to preferred embodiments as disclosed herein. All purity measurements disclosed herein are those measured above the reporting limit for a specific element and were completed using an ICP-MS from Agilent 7900 ICP-MS model G8403. Reporting limits to detect presence of lighter elements, such as from Sc and lighter, using ICPMS as disclosed herein are in general higher, about 1.4 ppm and less, than reporting limits of heavier elements which may be about 0.14 ppm and less. In particular, use of ICPMS methods as disclosed herein to detect Si may be done within a confidence of about 14 ppm and greater. As such, the starting powders, powder mixtures, calcined powder mixtures and sintered ceramic bodies may comprise silica in an amount of about 14 ppm. Si in the form of silica is not included in the % purity or impurity contents of the starting powders, calcined powder mixtures and sintered ceramic bodies as disclosed herein and may be taken to be about 14 ppm and greater, although Si was undetected.

TABLE 11

| Powder | Temp (° C.) | Time (hr) | Phase/s | % Purity | ppm |
|---|---|---|---|---|---|
| 247 | 600 | 8 | Y2O3, Al2O3 | 99.9996 | 4 |
| 359-05 | 850 | 4 | Y2O3, Al2O3 | 99.9983 | 17 |
| 286 (50 ppm Zr) | 850 | 12 | Y2O3, Al2O3 | 99.9969 | 53 |
| 299 | 850 | 4 | Y2O3, Al2O3 | 99.9989 | 11 |
| 300 | 850 | 4 | Y2O3, Al2O3 | 99.9991 | 9 |

TABLE 11-continued

| Powder | Temp (° C.) | Time (hr) | Phase/s | % Purity | ppm |
|---|---|---|---|---|---|
| 247-1 | 900 | 4 | Y2O3, Al2O3 | 99.9996 | 4 |
| 012 | 950 | 4 | Y2O3, Al2O3 | 99.9996 | 4 |
| 008 | 950 | 8 | Y2O3, Al2O3 | 99.9996 | 4 |
| 279 (25 ppm SiO2) | 950 | 4 | N/A | 99.9969 | 31 |
| 280 (160 ppm CeO2) | 950 | 4 | N/A | 99.983 | ~170 |
| 347 (300 ppm Yb2O3) | 950 | 4 | N/A | 99.969 | ~310 |
| 092-1 | 1100 | 8 | YAP, ≥10% YAG | 99.9984 | 16 |
| 092-3 | 1000 | 8 | Y2O3, Al2O3 | 99.9985 | 15 |
| 194-2 | 1000 | 10 | Y2O3, Al2O3, YAM | 99.9998 | 2 |
| 516 (ex 1) | 1000 | 8 | N/A | 99.9996 | 4 |
| 518 (ex 2) | 1000 | 4 | N/A | 99.9956 | 44 |
| 525 (ex 3) | 1000 | 8 | N/A | 99.9968 | 32 |
| 615 (54 ppm Zr) | 1100 | 8 | N/A | 99.9927 | 73 |
| 359-09 | 850 | 6 | Y2O3, Al2O3 | 99.9983 | 17 |
| 359-06 | 850 | 6 | Y2O3, Al2O3 | 99.9983 | 17 |
| 359-11 | 850 | 6 | Y2O3, Al2O3 | 99.9983 | 17 |
| 381 | 850 | 6 | Y2O3, Al2O3 | N/A | N/A |
| 20261 | 1050 | 6 | Y2O3, Al2O3, YAM | >99.9980 to ≥99.9994 | ~14 ppm |
| 20099 | 1000 | 10 | N/A | 99.9995 | 5 |
| 398-2 | 950 | 4 | Y2O3, Al2O3 | N/A | N/A |
| 145 | 800 | 4 | Y2O3, Al2O3 | 99.9985 to 99.9989 | 12-15 |

In accordance with the disclosure herein, a sintered ceramic body comprising the yttrium aluminum garnet (YAG) phase in amounts of greater than 90% by volume may be formed by in situ, reactive sintering during the sintering step by way of the combined properties of particle size distribution, purity and/or surface area of the calcined powder mixture as disclosed. In specific embodiments, it may be preferred that the calcined powder mixture comprises less than 10% by volume of YAG, preferably less than 8% by volume of YAG, preferably less than 5% by volume of YAG; in other embodiments disclosed herein is a calcined powder mixture which is free of, or substantially free of, the YAG phase. In other embodiments, it may be preferred that the calcined powder mixture has a specific surface area of greater than 2 m²/g. In other embodiments, it is preferable that the calcined powder mixture is free of a YAG phase having a specific surface area of 2 m²/g and greater in order to form a sintered ceramic body comprising YAG through the in situ, reactive phase sintering process as disclosed herein. Table 12 lists properties of the calcined powder mixtures which are not preferable according to the disclosure.

TABLE 12

| Powder | d10 (um) | d50 (um) | d90(um) | SSA (m²/g) | Temp (° C.) | Time (hr) | Phase/s |
|---|---|---|---|---|---|---|---|
| 127 | 30 | 68 | 243 | 0.01 | 1100 | 8 | YAG |
| 125-1 | 6 | 22 | 326 | 1 | 1100 | 8 | YAP/YAG |
| 092-2 | N/A | N/A | N/A | 0.25 | 1200 | 8 | YAG |

Calcined powder mixture 127 was sintered using the methods as disclosed herein at 1500° C. and pressure of 30 MPa for 30 minutes to form a YAG sintered ceramic body of 150 mm greatest dimension. Using Archimedes methods in accordance with ASTM B962-17, an average density of 3.895 g/cc across 5 repetitions was measured, corresponding to a theoretical density for YAG of 85.5%.

Calcined powder mixture 092-1 was sintered at 1550° C. and pressure of 30 MPa for 30 minutes to form a YAG sintered ceramic body of 150 mm greatest dimension. Using Archimedes methods in accordance with ASTM B962-17, an average density of 4.094 g/cc across 5 repetitions was measured, corresponding to a theoretical density for YAG of 89.9%.

Calcined powder mixture 125-1 was sintered at 1500° C. and pressure of 30 MPa for 30 minutes to form a YAG sintered ceramic body of 150 mm greatest dimension. Using Archimedes methods in accordance with ASTM B962-17, an average density of 4.400 g/cc across 5 repetitions was measured, corresponding to a theoretical density for YAG of 96.5% for the sintered ceramic body. Thus, the characteristics of the calcined powder mixtures of Table 12, and in particular the reduced SSA and thereby reduced driving force for sintering, resulted in a sintered ceramic body of low density which may be unacceptable to meet the requirements for use as corrosion resistant, sintered ceramic components in plasma processing chambers as disclosed herein.

Thus the calcined powder mixtures as disclosed herein may have a specific surface area of from 2 to 12 m²/g, preferably from 2 to 10 m²/g and further comprise at least one crystalline phase selected from the group consisting of yttrium oxide, aluminum oxide, YAP, YAM and YAG wherein the YAG phase is present in an amount of less than about 10% by volume as determined by XRD, and combinations thereof.

Step c) of the method disclosed herein comprises disposing the calcined powder mixture inside a volume defined by a tool set of a sintering apparatus and creating vacuum conditions inside the volume. A sintering apparatus used in the process according to an embodiment comprises a tool set comprising at least a graphite die which is usually a cylindrical graphite die having a volume and first and second openings, further comprising first and second punches. The first of the punches is moved within the first opening of the die, and the calcined powder mixture is disposed within the second opening of the die, and the second punch is moved within the second opening of the die, thereby disposing the calcined powder mixture inside the volume defined by the tool set of the sintering apparatus. At least one calcined powder mixture may be loaded into the die of the sintering apparatus. Vacuum conditions as known to those skilled in the art are established inside the volume defined by the tool set. Typical vacuum conditions include pressures of $10^{-2}$ to $10^{-3}$ torr. The vacuum is applied primarily to protect the graphite from burning and to remove air to of the air from the powder. The method as disclosed herein provides a process for production of ceramic sintered bodies and/or sintered ceramic components which is scalable and compatible with commercial manufacturing methods. The method utilizes powders having micron-sized average particle size distributions which are commercially available powders and/or prepared from chemical synthesis techniques, without the need for sintering aids, cold pressing, forming or machining a green body prior to sintering.

Step d) of the method disclosed includes applying pressure to the calcined powder mixture while heating to a sintering temperature and performing sintering to form the sintered ceramic body, and step e) comprises lowering the temperature of the sintered ceramic body by removing the heat source to the sintering apparatus to cool the sintered ceramic body. Pressure is applied to the calcined powder mixture disposed inside the volume defined by the tool set across ranges of from 5 MPa to 60 MPa, preferably from 5 MPa to 40 MPa, preferably from 5 MPa to 20 MPa, preferably from 5 MPa to 15 MPa, preferably from 10 MPa to 60 MPa, preferably from 10 MPa to 40 MPa, preferably from 10 MPa to 30 MPa, preferably from 10 MPa to 20 MPa, preferably from 13 MPa to 18 MPa, preferably from 15 MPa to 60 MPa preferably from 15 MPa to 40 MPa, preferably from 15 MPa to 30 MPa, preferably from 20 to 40 MPa. The pressure is applied axially on the powder mixture in the die.

In preferred embodiments, the powder mixture is heated directly by the punches and die of the sintering apparatus. The die may be comprised of an electrically conductive material such as graphite, which facilitates resistive/joule heating. The sintering apparatus and procedures are disclosed in US 2010/0156008 A1, which is incorporated herein by reference.

The temperature of the sintering apparatus according to the present disclosure is measured usually within the graphite die of the apparatus. Thereby, it is preferred that the temperature is measured as close as possible to the calcined powder mixture being processed so that the indicated temperatures are indeed realized within the calcined powder mixture to be sintered.

The application of heat to the powder mixture provided in the die facilitates sintering temperatures of from 1000 to 1700° C., preferably from 1200 to 1700° C., preferably from 1400 to 1700° C., preferably from 1500 to 1700° C., more preferably from 1600 to 1700° C., preferably from 1400 to 1650° C., preferably from 1500 to 1650° C., preferably from 1400 to 1600° C., preferably from 1500 to 1600° C. Sintering may typically be achieved with an isothermal time of from 0.5 to 180 minutes, preferably from 0.5 to 120 minutes, preferably from 0.5 to 100 minutes, preferably from 0.5 to 80 minutes, preferably from 0.5 to 60 minutes, preferably from 0.5 to 40 minutes, preferably from 0.5 to 20 minutes, preferably from 5 to 120 minutes, preferably from 10 to 120 minutes preferably from 20 to 120 minutes preferably from 40 to 120 minutes preferably from 60 to 120 minutes, preferably from 80 to 100 minutes, preferably from 850 to 95 minutes, preferably from 15 to 45 minutes. In certain embodiments, sintering may be achieved with an isothermal time of zero and upon reaching the sintering temperature, a cooling rate as disclosed herein is initiated. In process step e), the sintered ceramic body is passively cooled by removal of the heat source. Natural convection may occur until a temperature is reached which may facilitate handling of the sintered ceramic body and initiation of the optional annealing process.

During sintering, a volume reduction typically occurs such that the sintered ceramic body may comprise a volume that is about one third that of the volume of the starting powder mixture when disposed in the tool set of the sintering apparatus.

The order of application of pressure and temperature in one embodiment may vary according to the present disclosure, which means that it is possible to apply at first pressure within the disclosed ranges, and thereafter to apply heat to achieve a desired temperature. Moreover, in other embodiments it is also possible to apply at first the indicated heat to achieve a desired temperature and thereafter the indicated pressure. In a third embodiment according to the present disclosure, the temperature and the pressure may be applied simultaneously to the calcined powder mixture to be sintered and raised until the indicated values of temperature and pressure are reached. In some embodiments, the applied pressure may be varied while heating the calcined powder mixture to at least one temperature up to and including the sintering temperature as disclosed herein.

Inductive or radiant heating methods may also be used for heating the sintering apparatus and indirectly heating the calcined powder mixture in the tool set.

In contrast to other sintering techniques, preparation of the sample prior to sintering, i.e., by cold pressing or forming a green body before sintering is not necessary, and the calcined powder mixture is disposed directly in the volume defined by the tool set of the sintering apparatus. This reduced powder mixture handling may provide for higher purity in the final, sintered ceramic body.

In further contrast to other sintering techniques, sintering aids are not required (although they may be used if desired). Additionally, a high purity starting powder is desirable for optimal etch performance. The lack of sintering aids and the use of high purity starting materials, from 99.99% to about 99.9999% purity as disclosed herein, enables the fabrication of a high purity, high density/low porosity sintered ceramic body which provides improved etch resistance for use as a sintered ceramic component in semiconductor etch chambers.

In one embodiment of the present invention, process step d) may further comprise a pre-sintering step with at least one heating ramp of from 0.1° C./min to 100° C./min, from 0.1° C./min to 50° C./min, from 0.1° C./min to 25° C./min, preferably from 0.5° C./min to 50° C./min, preferably from 0.5 to 25° C./min, preferably from 0.5 to 10° C./min, preferably from 0.5° C./min to 5° C./min, preferably from 1 to 10° C./min, preferably from 1 to 5° C./min, preferably from 2 to 5° C./min until a specific pre-sintering time is reached.

In a further embodiment of the present invention, process step d may further comprise a pre-sintering step with at least one pressure ramp of from 0.15 to 30 MPa/min, from 0.15 to 20 MPa/min, from 0.15 to 10 MPa/min, from 0.15 to 5 MPa/min, from 0.25 to 20 MPa/min, from 0.35 MPa/min to 20 MPa/min, from 0.5 MPa/min to 20 MPa/min, from 0.75 MPa/min to 20 MPa/min, from 1 MPa/min to 20 MPa/min, from 5 MPa/min to 20 MPa/min, preferably from 0.15 to 5 MPa/min, preferably from 0.15 to 1 MPa/min, preferably from 0.15 to 0.5 MPa/min until a specific pre-sintering time is reached.

In another embodiment, process step d) may further comprise a pre-sintering step with the above-mentioned at least one heating ramp and with the above-mentioned at least one pressure ramp.

At the end of process step d), in an embodiment, the method may further comprise step e), cooling of the sintered ceramic body in accordance with a natural cooling of the process chamber (unforced cooling) under vacuum conditions as known to those skilled in the art. In a further embodiment in accordance with process step e), the sintered ceramic body may be cooled under forced convection with inert gas, for example, at 1 bar of argon, nitrogen or helium or any inert gas. Other gas pressures of greater than or less than 1 bar may also be used. In a further embodiment, the sintered ceramic body is cooled under static conditions using a gas selected from any one of argon, nitrogen or helium. To initiate the cooling step, the power and the pressure supplied to the sintering apparatus, and thereby to the sintered ceramic body, is removed at the end of the sintering step d) and thereafter cooling occurs in accordance with step e). Cooling rates for the sintered ceramic body as disclosed herein may be from 0.5 to 20° C./minute from 1 to 10° C./minute, preferably from 1 to 8° C./minute, preferably from 1 to 5° C./minute, preferably from 2 to 10° C./minute, preferably from 2 to 8° C./minute, preferably from 2 to 5° C./minute.

Step f) of the method disclosed herein comprises optionally annealing the sintered ceramic body (or in embodiments optionally annealing the sintered ceramic component) by applying heat to raise the temperature of the sintered ceramic body to reach an annealing temperature, performing annealing and step g) comprises lowering the temperature of the annealed sintered ceramic body (or annealed sintered ceramic component). Step f) is optional and may be performed on the sintered ceramic body or sintered ceramic component formed from the sintered ceramic body after a machining process as disclosed herein In embodiments, annealing may be performed in a furnace external to the sintering apparatus, or within the sintering apparatus itself, without removal from the apparatus.

For the purpose of annealing in accordance with embodiments as disclosed herein, the sintered ceramic body may be removed from the sintering apparatus after cooling in accordance with process step e), and the process step of annealing may be conducted in a separate apparatus such as a furnace.

This annealing leads to a refinement of the chemical and physical properties of the sintered body. The step of annealing can be performed by conventional methods used for the annealing of glass, ceramics and metals, and the degree of refinement can be selected by the choice of annealing temperature and the duration of time that annealing is allowed to continue.

In embodiments, the optional step f) of annealing the sintered ceramic body is carried out at a heating rate of from 0.5° C./min to 20° C./min, preferably from 0.5° C./min to 25° C./min, more preferably from 0.5° C./min to 10° C./min, and more preferably from 0.5° C./min to 5° C./min, more preferably from 1° C./min to 50° C./min, more preferably from 3° C./min to 50° C./min, more preferably from 5° C./min to 50° C./min, more preferably from 25° C./min to 50° C./min, preferably from 1° C./min to 10° C./min, preferably from 2° C./min to 10° C./min, preferably from 2° C./min to 5° C./min.

In embodiments, the optional step f) of annealing the sintered ceramic body is carried out at a temperature of from about 900 to about 1600° C., preferably from about 1100 to about 1600° C., preferably from about 1300 to about 1600° C., preferably from about 900 to about 1500° C. preferably from about 900 to about 1400° C. preferably from about 1400 to about 1600° C.

In embodiments, the optional step f) of annealing the sintered ceramic body is carried out at a cooling rate of from 0.5° C./min to 20° C./min, preferably from 0.5° C./min to 25° C./min, more preferably from 0.5° C./min to 10° C./min, and more preferably from 0.5° C./min to 5° C./min, more preferably from 1° C./min to 50° C./min, more preferably from 3° C./min to 50° C./min, more preferably from 5° C./min to 50° C./min, more preferably from 25° C./min to 50° C./min, preferably from 1° C./min to 10° C./min, preferably from 2° C./min to 10° C./min, preferably from 2° C./min to 5° C./min.

The optional step f) of performing annealing of the sintered ceramic body is intended to correct oxygen vacancies in the crystal structure back to stoichiometric ratio. The optional annealing step may be carried out at the annealing temperature for a duration of from 1 to 24 hours, preferably from 1 to 18 hours preferably from 1 to 16 hours preferably from 1 to 8 hours, preferably from 4 to 24 hours preferably from 8 to 24 hours preferably from 12 to 24 hours preferably from 4 to 12 hours preferably from 6 to 10 hours.

The optional process step f) of annealing the sintered ceramic body may be carried out in an oxidizing atmosphere, whereby the annealing process may provide increased albedo, lowered stress which may provide improved mechanical handling and reduced porosity. The optional annealing step may be carried out in air.

The pressure and current assisted process according to one embodiment and described above is suitable for use in the preparation of large sintered YAG bodies. The process as disclosed provides for rapid powder consolidation and densification, retaining a maximum grain size of less than about 10 um in the sintered ceramic body, and achieving high, uniform densities in excess of 96% of theoretical and volumetric porosities of less than 4%, with minimal (<5%) density variation across a greatest dimension. Reducing the variation in density may improve handleability and reduce overall stress in the sintered ceramic body. This combination of fine grain size, uniform and high density provides for a high strength sintered YAG body of large dimension suitable for machining, handling and use as a component in a semiconductor processing chamber.

After the optional process step f) of annealing the sintered ceramic body is performed, the temperature of the sintered, and in some instances, annealed sintered ceramic body is decreased to an ambient temperature in accordance with process step g) and the sintered and optionally annealed ceramic body is taken out of either the furnace in the instance that the annealing step is performed external to the sintering apparatus, or removed from the sintering apparatus in case the annealing step f) is carried out in the sintering apparatus. Table 13 lists a range of process conditions and sample sizes of exemplary ceramic sintered bodies as disclosed herein.

TABLE 13

| Size (mm) | Sample | Sintering T (° C.) | Sintering P (MPa) | Sintering Time (min) | Anneal Temp (° C.) | Anneal Time (hr) |
|---|---|---|---|---|---|---|
| 100 | 519 | 1450 | 30 | 30 | none | none |
| 100 | 529 | 1450 | 30 | 30 | none | none |
| 100 | 531 | 1450 | 30 | 30 | none | none |
| 100 | 514 | 1450 | 30 | 30 | none | none |
| 150 | 196 | 1450 | 30 | 30 | none | none |
| 150 | 617 | 1450 | 30 | 30 | none | none |
| 100 | 535 | 1400 | 30 | 30 | none | none |
| 150 | 162 | 1500 | 20 | 30 | none | none |
| 150 | 162-1 | 1500 | 20 | 30 | 1400 | 8 |
| 150 | 158 | 1500 | 30 | 30 | none | none |
| 150 | 158-1 | 1500 | 30 | 30 | 1400 | 8 |
| 150 | 151 | 1550 | 20 | 30 | None | none |
| 150 | 151-1 | 1550 | 20 | 30 | 1400 | 8 |
| 150 | 153 | 1500 | 30 | 30 | none | none |
| 150 | 153-1 | 1500 | 30 | 30 | 1400 | 8 |
| 150 | 165 | 1450 | 30 | 30 | 1400 | 8 |
| 150 | 166 | 1450 | 30 | 30 | 1400 | 8 |
| 150 | 167 | 1450 | 30 | 30 | none | none |

TABLE 13-continued

| Size (mm) | Sample | Sintering T (° C.) | Sintering P (MPa) | Sintering Time (min) | Anneal Temp (° C.) | Anneal Time (hr) |
|---|---|---|---|---|---|---|
| 150 | 17 | 1500 | 30 | 30 | none | none |
| 150 | 19 | 1500 | 30 | 30 | 1400 | 8 |
| 150 | 6 | 1500 | 30 | 30 | 1400 | 8 |
| 150 | 134 | 1500 | 30 | 30 | 1400 | 8 |
| 150 | 135 | 1550 | 30 | 30 | 1400 | 8 |
| 150 | 112 | 1550 | 30 | 30 | 1400 | 8 |
| 150 | 113 | 1550 | 30 | 30 | 1400 | 8 |
| 150 | 114 | 1550 | 30 | 30 | 1400 | 8 |
| 150 | 402 | 1500 | 15 | 60 | none | none |
| 150 | 402-1 | 1500 | 15 | 60 | 1400 | 8 |
| 150 | 401 | 1500 | 20 | 45 | none | none |
| 150 | 401-1 | 1500 | 20 | 45 | 1550 | 8 |
| 150 | 401-2 | 1500 | 20 | 45 | none | none |
| 150 | 377 | 1475 | 15 | 45 | none | none |
| 150 | 423 | 1450 | 20 | 30 | none | none |
| 406 | 191 | 1575 | 20 | 60 | none | none |
| 406 | 258 | 1550 | 20 | 60 | none | none |
| 406 | 258-10 | 1550 | 20 | 60 | 1200 | 8 |
| 406 | 258-11 | 1550 | 20 | 60 | 1100 | 8 |
| 572 | 355 | 1550 | 20 | 90 | none | none |
| 572 | 408 | 1600 | 15 | 90 | 1400 | 8 |
| 572 | 395 | 1600 | 20 | 90 | 1400 | 8 |
| 572 | 399 | 1600 | 20 | 120 | 1400 | 8 |
| 150 | 195 | 1500 | 20 | 30 | 1500 | 8 |
| 150 | 93 | 1500 | 30 | 30 | none | none |
| 572 | 418 | 1650 | 15 | 60 | none | none |
| 150 | 416 | 1450 | 15 | 30 | none | none |
| 150 | 322 | 1450 | 20 | 45 | none | none |
| 150 | 322-1 | 1450 | 20 | 45 | 1400 | 8 |
| 150 | 272 | 1450 | 20 | 45 | none | none |
| 150 | 272-5 | 1450 | 20 | 45 | 1550 | 8 |
| 150 | 298 | 1450 | 20 | 30 | none | none |
| 150 | 298-1 | 1450 | 20 | 30 | 1400 | 8 |
| 150 | 298-2 | 1450 | 20 | 30 | 1550 | 8 |
| 150 | 512 | 1500 | 20 | 30 | none | none |
| 150 | 512-1 | 1500 | 20 | 30 | 1400 | 8 |
| 150 | 432 | 1500 | 20 | 30 | none | none |
| 622 | 506 | 1650 | 15 | 60 | none | none |
| 622 | 487 | 1600 | 15 | 60 | none | none |
| 622 | 495 | 1600 | 15 | 60 | none | none |
| 622 | 521 | 1650 | 15 | 60 | none | none |

The ceramic sintered bodies prepared in accordance with the materials and methods as disclosed herein have very high purity. Purity of the sintered ceramic body may be about the same as that for the calcined powder mixtures. Table 14 lists impurities in ppm and purities in percent of the calcined powder mixtures and corresponding ceramic sintered bodies formed therefrom as disclosed herein as measured by ICPMS methods.

TABLE 14

| Ceramic Sample | Calcined Powder Total Impurity (ppm) | Calcined Powder Purity (%) | Ceramic Total Impurity (ppm) | Ceramic Purity (%) |
|---|---|---|---|---|
| 519 | 4 | 99.9996 | 28 | 99.9972 |
| 385 | 17 | 99.9983 | 23 | 99.9977 |
| 387-2 | 16.8 | 99.9983 | 36.2 | 99.9964 |
| 388 | 16.8 | 99.9983 | 15 | 99.9985 |
| 388-1 | 16.8 | 99.9983 | 16.6 | 99.9983 |
| 164-9 | 12 | 99.9988 | 23.6 | 99.9976 |
| 605 | 48 | 99.9952 | 50 | 99.995 |
| 199 | 4.2 | 99.9996 | 2.8 | 99.9997 |
| 206 | 42 | 99.9996 | 3.6 | 99.9996 |
| 218 | 4.1 | 99.9996 | 2.8 | 99.9997 |
| 195 | 2.2 | 99.9998 | 3.8 | 99.9996 |
| 601 | 32 (22 zr) | 99.9968 | 27 (19 zr) | 99.9973 |

The ICPMS method used to determine the impurity/purity content of the powders, powder mixtures and sintered ceramic bodies as disclosed herein measures individual elements on a weight basis at differing reporting limits based upon atomic number. In general, reporting limits to detect presence of lighter elements using ICPMS as disclosed herein are higher than reporting limits of heavier elements. In other words, heavier elements, such as from Sc and higher, are detected with greater accuracy than lighter elements, in particular at lower concentrations. For elements from Sc to U, reporting limits vary from <0.0007 to <0.204 ppm. For lighter elements, with the exception of Si, such as from Li up to and including Ca, reporting limits vary from <0.0007 to 1.4 ppm. Si, which may be present in the powders, powder mixtures and sintered ceramic bodies in the form of $SiO_2$, may be reported with accuracy in amounts of 14 ppm and greater using the ICPMS method as disclosed herein, although Si was not detected in the starting powders, calcined powder mixtures and/or the ceramic sintered bodies disclosed herein. Those elements detected in amounts exceeding their respective reporting limits are reported in ppm as total impurity content and associated % purity. Si, in the form of $SiO_2$, is not included in the total impurity content due to its higher reporting limit and is thus reported separately herein. In embodiments, the starting powders, calcined powder mixtures and/or the ceramic sintered bodies as disclosed herein may have a low silica content of for example about 14 ppm and greater, relative to the total mass of the starting powders, calcined powder mixtures and/or the ceramic sintered bodies as calculated from the contents of all constituents. Thus, in specific embodiments, the starting powders, calcined powder mixtures and/or the ceramic sintered bodies comprise silica in amounts of about 14 ppm.

A number of process parameters may be adjusted to form a sintered ceramic body having a visually apparent color which may be gray, white, red and combinations thereof. In embodiments, the sintered ceramic body before or after the annealing process as disclosed may be uniform on a surface and throughout in color and comprise one of the aforementioned colors. In other embodiments, the sintered ceramic body may vary on a surface and throughout in color and comprise more than one of the aforementioned colors. Sintered bodies in the as-sintered condition, prior to the optional annealing step, may have a surface and bulk/interior which may be gray throughout in appearance and may have densities exceeding 99% of the theoretical density for YAG. For example, upon visual inspection, sintered ceramic body sample 322 as disclosed herein displays a gray color within the bulk and on a surface of the sample. In order to produce a white sintered ceramic body, the annealing conditions of heating rate, annealing temperature and time may be varied to form a sintered ceramic body which visually appears white on a surface and throughout. For example, in certain embodiments to form a white sintered ceramic body, annealing at times and durations of between 8 to 24 hours at temperatures of about 1500° C. may be required, resulting in densities of from 97 to 99% of theoretical density of YAG. Sintered ceramic body sample 272-5, annealed at 1550° C. for 8 hours as disclosed in Table 13, displays a white color within the bulk and on a surface of the sample and has a density of 4.433 g/cc, or about 97.3% of theoretical for YAG. In alternate embodiments, a white sintered ceramic body may be produced by the presence of excess alumina (in amounts of between about 0.3 and 1% by volume) in the sintered ceramic body which after annealing at temperatures of between 1100 to 1400° C. for durations of 6 to 10 hours may produce a white sintered body in accordance with sintered ceramic body sample 322-1 as disclosed herein, having a density of 4.531 g/cc, or 99.451% of theoretical for YAG. In other embodiments, the presence of zirconia added to the starting powders and/or resulting from use of zirconia milling media in amounts of between 20 and 100 ppm may produce a sintered ceramic body having a reddish color in an as-sintered condition, and a density of between 98 and 99.5% of theoretical. For example, sintered ceramic body sample 298 was prepared with about 50 ppm zirconia and displayed a red color on a surface and within the bulk, having a density of 4.540 g/cc or 99.649% of theoretical for YAG. Excess alumina (in amounts of between about 0.1 and 3% by volume, preferably between 0.1 and 1% by volume) to the extent it may be present in the sintered ceramic body may provide a sintered ceramic body having a uniform color on a surface and within the bulk of the body, whether in an as-sintered condition or after an annealing process as disclosed herein, and a density of between 98.5 and 99.5% of theoretical for YAG. Densities and sample preparation for these and similar embodiments are listed in Tables 11 and 13, respectively.

Step h) of the method disclosed herein comprises machining the sintered ceramic body, or in some embodiments, machining the sintered ceramic body after an optional annealing process, to form a sintered ceramic component such as a dielectric window or RF window, a focus ring, a nozzle or a gas injector, a shower head, a gas distribution plate, an etch chamber liner, a plasma source adapter, a gas inlet adapter, a diffuser, an electronic wafer chuck, a chuck, a puck, a mixing manifold, an ion suppressor element, a faceplate, an isolator, a spacer, a protective ring and a deposition ring in etch chambers, and may be carried out according to known methods for machining of corrosion resistant components from the sintered ceramic bodies as disclosed herein. In embodiments, the sintered ceramic component formed from the sintered ceramic body may comprise preferably yttrium aluminum garnet of composition $Y_3Al_5O_{12}$ (YAG), and in additional embodiments the sintered ceramic body may further comprise yttrium oxide $(Y_2O_3)$, aluminium oxide $(Al_2O_3)$, yttrium aluminum perovskite of composition $YAlO_3$ (YAP), yttrium aluminum monoclinic of composition $Y_4Al_2O_9$ (YAM), and combinations thereof.

In certain embodiments, the sintered ceramic component formed from the sintered ceramic body may comprise YAG having a phase purity of up to and including 99.9% and less by volume and a chemical purity of greater than 99.99%. In alternate embodiments, the sintered ceramic component may comprise YAG having a phase purity of from 97 to 99.8% by volume, further comprising an aluminum oxide phase of from 0.2 to 3% by volume. The corrosion resistant sintered ceramic components may be formed from any of the aforementioned embodiments of the ceramic sintered bodies as disclosed herein.

Corrosion resistant, sintered ceramic components as required for semiconductor etch chambers may be made from embodiments of the sintered ceramic body as disclosed herein and may include RF or dielectric windows, nozzles or injectors, shower heads, (etch) chamber liners, mixing manifolds, wafer supports, electronic wafer chucks, and various rings such as focus rings and protective rings, among other shapes. Accordingly, properties such as density, volumetric porosity, hardness, purity, grain size, strength, etc. are transferred from the sintered ceramic body to the sintered ceramic component formed therefrom.

The sintered ceramic body/component may have mechanical properties sufficient to allow fabrication of a large body size for use in plasma etching chambers. The components as disclosed herein may have a size of from 200 mm to 622 mm, preferably from 300 to 622 mm, preferably from 350 to 622 mm, preferably from 400 to 622 mm, more preferably from 450 to 622 mm, more preferably from 500 to 622 mm, preferably from 100 to 605 mm, preferably from 200 to 605 mm, preferably from 550 to 622 mm, each with regard to the greatest dimension of the sintered body. To assess mechanical strength, sample 006 was polished in accordance with known techniques to prepare type B bars for 4-point strength testing. Sample 6 was prepared using a sintering temperature of 1500° C. at a pressure of 30 MPa for a duration of 30 minutes, followed by annealing in air at 1400° C. for a duration of 8 hours. A density using the methods disclosed herein was measured of 4.545 or 99.77% of theoretical, corresponding to porosity of 0.23%. High strength values are reported in Table 6, indicating the ceramic sintered bodies as disclosed herein will have mechanical strengths sufficient for preparation of chamber components as disclosed herein.

The method as disclosed herein provides for an improved control over the crystalline phase purity, chemical purity, density and density variation, mechanical strength and thereby handleability of the corrosion resistant sintered ceramic component in particular for those ceramic bodies of dimensions greater than, for example, 200 mm across a maximum feature size, and the reduction of oxygen vacancies in the lattice of the corrosion resistant sintered ceramic component. Table 15 lists greatest dimensions/size, average density across 5 measurements, percent of theoretical density for YAG, % density variation and volumetric porosity for exemplary YAG ceramic sintered bodies as disclosed herein.

TABLE 15

| Sample | Size (mm) | Ave D (g/cc) | % TD | % density variation | Average % vol. porosity |
|---|---|---|---|---|---|
| 519 | 100 | 4.534 | 99.517 | <1% | 0.483 |
| 531 | 100 | 4.552 | 99.912 | <1% | 0.088 |
| 514 | 100 | 4.549 | 99.846 | <1% | 0.154 |
| 172 | 150 | 4.553 | 99.930 | <1% | 0.070 |
| 6 | 150 | 4.545 | 99.766 | <1% | 0.234 |
| 191 | 406 | 4.464 | 97.971 | ≥0.120 | 2.029 |
| 258 | 406 | 4.542 | 99.696 | ≥0.601 | 0.304 |
| 164 | 406 | 4.467 | 98.050 | ≥2.061 | 1.950 |
| 355 | 572 | 4.429 | 97.220 | ≥4.164 | 2.652 |
| 395 | 572 | 4.389 | 96.335 | ≥1.712 | 3.656 |
| 506 | 622 | 4.546 | 99.783 | <0.208 | 0.217 |

Performance

Etching was carried out on a corrosion resistant sintered ceramic body comprising YAG prepared according to the method disclosed herein, as described following.

Etch Procedure:

To assess etch performance, a sample comprising the sintered ceramic body of sample 519 of example 1 having dimension 6 mm×6 mm×2 mm was mounted onto a c plane sapphire wafer using a heat sink compound. The surface quality was assessed by measuring Sa, Sz and Sdr before and after an etching process.

The dry etch process was performed using a Plasma-Therm Versaline DESC PDC Deep Silicon Etch which is standard equipment for the industry. Etching was completed using a 2-step process for a total duration of 6 hours. The etch method was performed having a pressure of 10 millitorr, a bias of 600 volts and ICP power of 2000 watts. The etch method was conducted with a first etch step having a $CF_4$ flow rate of 90 standard cubic centimetres per minute (sccm), an oxygen flow rate of 30 standard cubic centimetres per minute (sccm), an argon flow rate of 20 standard cubic centimetres per minute (sccm), and a second etch step having an oxygen flow rate of 100 standard cubic centimetres per minute (sccm) and an argon flow rate of 20 standard cubic centimetres per minute (sccm), wherein first and second etch steps are performed for 300 seconds each and repeated for a combined duration of 6 hours.

The etch conditions as used here to assess sample performance were selected to subject the disclosed materials to extreme etch conditions in order to differentiate performance. The surface of the sintered ceramic body as disclosed herein, both before and after an etching process, may be correlated to particulate generation in processing chambers. Thus, it is beneficial generally to have a reduced surface roughness. The parameters of Sa (arithmetical mean height), Sz (maximum height) and Sdr (developed interfacial area ratio) were measured on the sintered ceramic body. Generally, surface roughness after a plasma etch process may affect chamber particle generation in that low surface roughness, provided by corrosion resistant materials, reduces the release of contaminate particles into the chamber and correspondingly higher surface roughness after the etch may contribute to particle generation and release onto the wafer. Additionally, smoother surfaces as indicated by the lower surface roughness values of Sa, Sz and Sdr enable the chamber components as disclosed herein to be more easily cleaned to semiconductor grade levels.

Surface Roughness Measurement

Surface roughness measurements were performed using a Keyence 3D laser scanning confocal digital microscope model VK-X250X under ambient conditions in a class 1 cleanroom. The microscope rests on a TMC tabletop CSP passive benchtop isolator with 2.8 Hz Natural Frequency. This non-contact system uses laser beam light and optical sensors to analyse the surface through reflected light intensity. The microscope acquires 1,024 data points in the x direction and 786 data points in the y direction for a total of 786,432 data points. Upon completion of a given scan, the objective moves by the pitch set in the z direction and the intensity is compared between scans to determine the focus. The ISO 25178 Surface Texture (Areal Roughness Measurement) is a collection of international standards relating to the analysis of surface roughness with which this microscope is compliant.

The surface of the sample was laser scanned using the confocal microscope at 50× magnification to capture a detailed image of the sample. Roughness was obtained on a profile of 7 partitioned blocks. The lambda chi ($\lambda$), which represents the measurement sampling lengths, was adjusted so that the line reading was limited to measurements from the 5 middle blocks of the 7 according to ISO specification 4288: Geometrical Product Specifications (GPS)—Surface texture: Profile method—Rules and procedures for the assessment of surface texture.

Ra as known to those skilled in the art represents the arithmetic mean roughness of the 2D profile according to ISO 4287:1997 Geometrical Product Specifications (GPS)—Surface texture: Profile method. This is based upon a mechanical stylus in contact with a surface to create a linear profile.

Sa represents height differences across a 3D measurement surface using laser methods, while Ra represents height differences across a 2D linear profile scan.

Ra is limited by the stylus tip geometry and as such may result in loss of fine feature detail and distortion of peaks and valleys. This becomes problematic when measuring fine, submicron features and is a limitation in the use of Ra values to compare with Sa values.

Areas were selected within etched and unetched regions of the sintered ceramic body for measurement. Areas were selected to be most representative of the typical sample surface, and used to calculate Sa, Sz and Sdr.

Sa represents an average roughness value calculated across a user-defined area of a surface of the sintered ceramic body. Sz represents the maximum peak-to-valley distance across a user-defined area of a surface of the sintered ceramic body. Sdr is a calculated numerical value defined as the "developed interfacial area ratio" and is a proportional expression for an increase in actual surface area beyond that of a completely flat surface. A flat surface is assigned an Sdr of zero, and the value increases with the slope of the surface. Larger numerical values correspond with greater increases in surface area. This allows for numerical comparison of the degree of surface area increase of a sample. It represents additional surface area arising from texture or surface features as compared to a planar area.

The surface roughness features of Sa, Sz and Sdr are well-known parameters in the underlying technical field and, for example, described in ISO standard 25178-2-2012, section 4.3.2.

The present disclosure relates to a specific sintered ceramic body and/or component made therefrom having a corrosion resistant, polished surface before an etch or deposition process providing an arithmetical mean height, Sa, in an unetched area of less than 15 nm, more preferably less than 13 nm, more preferably less than 10 nm, more preferably less than 8 nm, preferably from 2 to 15 nm, preferably from 2 to 10 nm, preferably from 2 to 8 nm, preferably from 2 to 5 nm, preferably an average Sa of 3 nm, according to ISO standard 25178-2-2012, section 4.1.7, arithmetical mean height, Sa.

The present disclosure relates to a specific sintered ceramic body and/or component made therefrom having a corrosion resistant surface before an etch or deposition process providing a maximum height, Sz, of less than 5.0 μm, preferably less than 4.0 μm, preferably less than 3.5 μm, preferably less than 2.5 μm, preferably less than 2 μm, preferably less than 1.5 μm, preferably from 0.3 to 5 um, preferably from 0.3 to 4 um, preferably from 0.3 to 3 um, preferably from 0.3 to 2 um, preferably from 0.3 to 1 um, preferably from 0.3 to 0.5 um, preferably an average Sz of 0.4 um, according to ISO standard 25178-2-2012, section 4.1.6, maximum height, Sz.

The present disclosure relates to a specific sintered ceramic body and/or component made therefrom having a corrosion resistant surface before an etch or deposition process providing a developed interfacial area ratio, Sdr, of less than $1500 \times 10^{-5}$, more preferably less than $1200 \times 10^{-5}$, more preferably less than $1000 \times 10^{-5}$, more preferably less than $800 \times 10^{-5}$, more preferably less than $600 \times 10^{-5}$, more preferably less than $400 \times 10^{-5}$, preferably from 15 to $400 \times 10^{-5}$, preferably from 15 to $200 \times 10^{-5}$, preferably from 15 to $100 \times 10^{-5}$, preferably from 25 to $200 \times 10^{-5}$, preferably from 25 to $100 \times 10^{-5}$, preferably from 25 to $50 \times 10^{-5}$, according to ISO standard 25178-2-2012, section 4.3.2, developed interfacial area ratio, Sdr.

The present disclosure relates to a specific sintered ceramic body and/or component made therefrom having a corrosion resistant surface after the etch process as disclosed herein providing an arithmetical mean height, Sa, of less than 25 nm, less than 20 nm, more preferably less than 18 nm, more preferably less than 16 nm, more preferably less than 14 nm, more preferably less than 12 nm, according to ISO standard 25178-2-2012, section 4.1.7 arithmetical mean height, Sa.

The present disclosure relates to a specific sintered ceramic body and/or component made therefrom having a corrosion resistant surface after the etch or deposition process as disclosed herein providing a maximum height, Sz, of less than 4.8 µm, more preferably less than 3.8 µm, most preferably less than 3.2 µm, more preferably less than 2.5 µm, more preferably less than 2 µm, more preferably less than 1.5 µm, according to ISO standard 25178-2-2012, section 4.1.6, maximum height, Sz.

The present disclosure relates to a specific sintered ceramic body and/or component made therefrom having a corrosion resistant surface after the etch or deposition process as disclosed herein providing a developed interfacial area, Sdr, of less than $3000 \times 10^{-5}$, more preferably less than $2500 \times 10^{-5}$, more preferably less than $2000 \times 10^{-5}$, more preferably less than $1500 \times 10^{-5}$, more preferably less than $1000 \times 10^{-5}$, more preferably less than $800 \times 10^{-5}$, according to ISO standard 25178-2-2012, section 4.3.2, developed interfacial area ratio, Sdr.

Table 16 lists surface roughness measurements for a sintered ceramic body corresponding to sample 432 of example fourteen as disclosed herein.

TABLE 16

| | Sa µm | Sz µm | Sdr |
|---|---|---|---|
| | 0.004 | 0.414 | 0.0002964 |
| | 0.003 | 0.364 | 0.0002861 |
| | 0.003 | 0.342 | 0.0002431 |
| | 0.004 | 0.616 | 0.0004091 |
| Average | 0.003 | 0.434 | 0.0003 |
| SD | 0.000 | 0.125 | 0.0001 |

In one embodiment, the sintered ceramic body comprising from 90% to 99.8% by volume of polycrystalline yttrium aluminum garnet (YAG) and a volumetric porosity of from 0.1 to 4% as calculated from density measurements performed in accordance with ASTM B962-17 has an arithmetical mean height (Sa) in an unetched area of 15 nm or less, and an arithmetical mean height (Sa) in an etched area of 20 nm or less when exposed to an etch method having a pressure of 10 millitorr, a bias of 600 volts, ICP powder of 2000 watts, the etch method further comprising a first etch step having a $CF_4$ flow rate of 90 standard cubic centimetres per minute (sccm), an oxygen flow rate of 30 standard cubic centimetres per minute (sccm), an argon flow rate of 20 standard cubic centimetres per minute (sccm), and a second etch step having an oxygen flow rate of 100 standard cubic centimetres per minute (sccm) and an argon flow rate of 20 standard cubic centimetres per minute (sccm) wherein steps one and two are performed for 300 seconds each and repeated for a combined duration of 6 hours. In one embodiment, the sintered ceramic body has an arithmetical mean height (Sa) in an unetched area of 12 nm or less and an arithmetical mean height (Sa) in an etched area of 16 nm or less. In another embodiment, the sintered ceramic body has an arithmetical mean height (Sa) in an unetched area of 10 nm or less and an arithmetical mean height (Sa) in an etched area of 12 nm or less.

Figure 30:
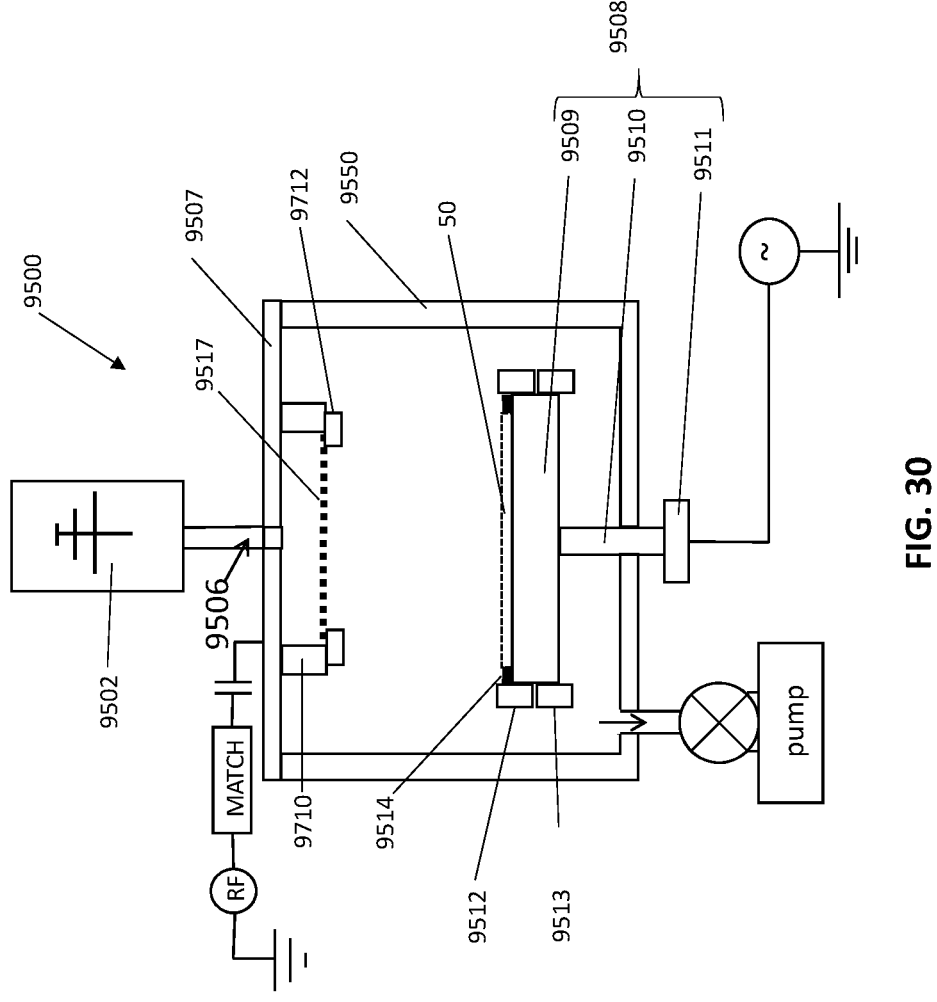
FIG. 30 shows an example of an exemplary plasma processing chamber which may be configured for semiconductor etching processes.
Figure 31:
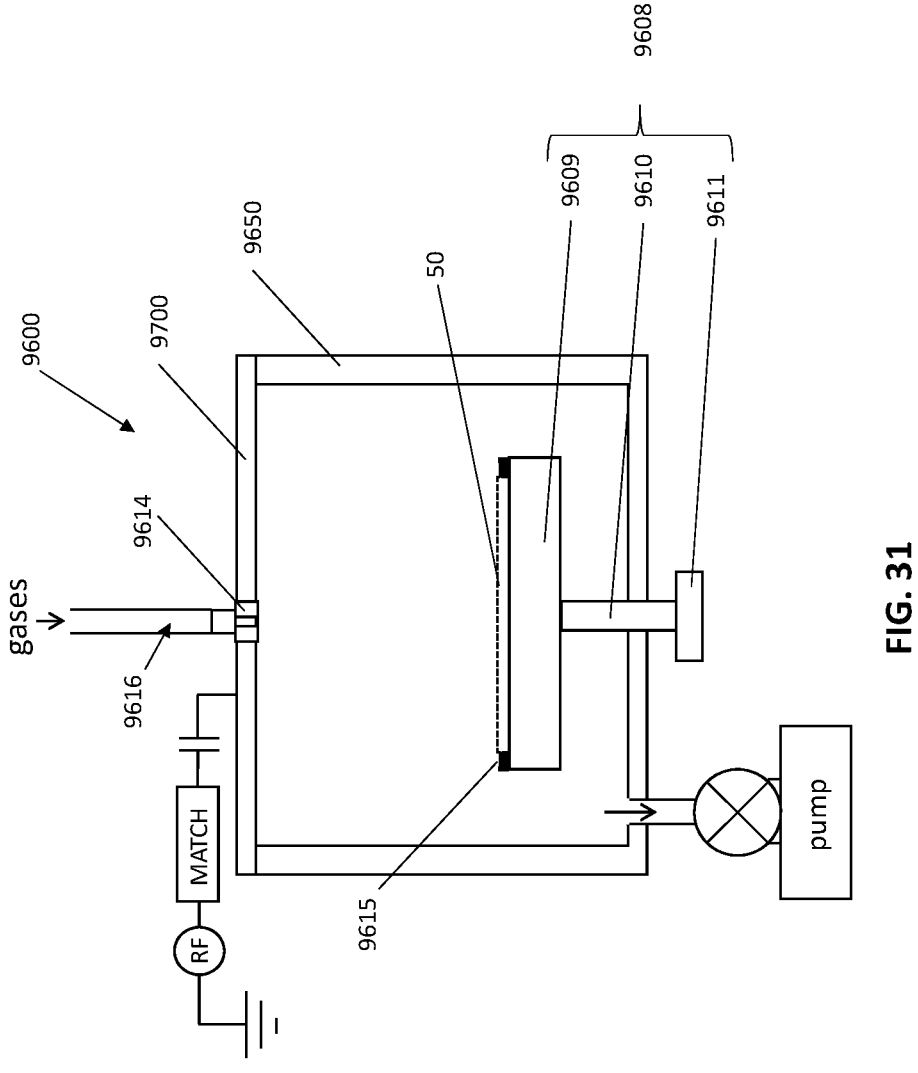
FIG. 31 depicts an example of an exemplary a plasma processing chamber which may be configured for semiconductor deposition processes.

Embodiments as disclosed herein include a polycrystalline sintered ceramic body and components fabricated therefrom which are adapted for use in exemplary plasma processing chambers depicted in FIGS. 30 and 31.

The embodiments of the sintered ceramic body as disclosed herein can be combined in any specific sintered ceramic body. Thus, two or more of the characteristics disclosed herein can be combined to describe the sintered ceramic body in more detail as, for example, outlined in the embodiments.

The sintered ceramic body and related corrosion resistant sintered components as disclosed herein have an improved behaviour in etch and deposition processes and improved ability to be handled and may be used as materials for the preparation of components for semiconductor etch and deposition chambers.

The yttrium aluminium oxide materials, and in particular those comprising the YAG phase and in embodiments further comprising an aluminum oxide phase, proposed for use as etch/deposition chamber parts until today suffer, as already mentioned above, from a problem that under harsh, corrosive and erosive conditions particles are generated which contaminate the products to be processed. Furthermore, it is known to be difficult to produce solid body, phase pure parts of high purity and large dimension from 100 mm to 622 mm comprising yttrium aluminium oxide, and in particular embodiments comprising phase pure (~99% and greater) yttrium aluminium garnet cubic phase (YAG). Oftentimes other phases may be present in addition to the YAG phase, which may reduce the corrosion and erosion resistance properties of the sintered ceramic body dependent upon the volumetric extent to which the other phases are present.

In contrast to this, the present disclosure provides a method to fabricate corrosion resistant sintered bodies and components formed therefrom for the use in plasma etching and/or deposition chambers with a focus on the phase purity, density and density variation, porosity, chemical purity, strength, hardness, surface condition, and handleability. According to the present disclosure, it was determined that the density and crystalline phase characteristics may have an important influence on the etch stability in addition to the sintered body purity, hardness and mechanical strength of the yttrium aluminium oxide materials and in particular sintered ceramic bodies formed of the YAG phase. The combined properties of highly phase pure (>99% by volume) YAG, high purity, low porosity and high density provide a synergistic effect of enhanced corrosion and erosion resistance in the sintered ceramic bodies when used as components in plasma processing chambers as disclosed herein.

As shown in FIG. 30, embodiments of the technology as disclosed herein may be useful as components for use in a plasma processing system 9500, which may be configured for use in semiconductor etching processes, also denoted as "processing system". Processing system 9500 may in embodiments include a remote plasma region. The remote plasma region may include a remote RF source/matching network 9502, which is also denoted as remote plasma source ("RPS").

Processing system 9500 may comprise a vacuum chamber 9550 having a corrosion resistant chamber liner (not shown), a vacuum source, and a chuck or electrostatic chuck ("ESC") 9509 on which a wafer 50, also denoted as substrate, is supported. A cover ring or electrode cover 9514, a top shield ring 9512 and shield ring 9513 surrounds the wafer 50 and puck 9509. A top plate/window/lid 9507 forms an upper wall of the vacuum chamber 9550. A showerhead 9517 forms an upper wall or is mounted beneath an upper wall of the vacuum chamber 9650. Top plate/window/lid 9507, gas distribution system 9506, showerhead 9517, cover ring or electrode cover 9514, top shield ring 9512, shield ring 9513, chamber liner (not shown), and chuck or ESC 9508 and puck 9509 may be made entirely or partially from embodiments of the sintered ceramic body as disclosed herein.

Parts of the surface of the showerhead 9517 may be covered with a shield ring 9712. Parts of the surface of the showerhead 9517, especially radial sides of the surface of the showerhead 9517 may be covered with a top shield ring 9710. Shield ring 9712, showerhead 9517 and top shield ring 9710 may be made entirely or partially from embodiments of the sintered ceramic body as disclosed herein.

The remote plasma source 9502 is provided outside of the window 9507 of the chamber 9550 for accommodating the wafer 50 to be processed. The remote plasma region may be in fluid communication with the vacuum chamber 9550 through a gas delivery system 9506. In the chamber 9550, a reactive plasma may be generated by supplying a processing gas to the chamber 9550 and a high frequency power to the plasma source 9502. By using the reactive plasma thus generated, a predetermined plasma processing is performed on the wafer 50. A planar antenna having a predetermined pattern is widely used for the high frequency antenna of the processing system 9500.

As shown in FIG. 31, embodiments of the technology as disclosed herein may be useful as components for use in a plasma processing system 9600 which may be configured for use in semiconductor deposition processes, also called "processing system". Processing system 9600 comprises a vacuum chamber 9650, a vacuum source, and a puck 9609 on which a wafer 50, also denoted as semiconductor substrate, is supported. The processing system may further include a nozzle or injector 9614 which is in fluid communication with a gas delivery system 9616 for supplying process gases to the interior of the vacuum chamber 9650. A top wall 9700 of the chamber 9650 may comprise a central opening configured to receive a central gas injector (also referred to as nozzle), 9614. In certain embodiments, the top wall 9700 of the chamber may comprise an RF or dielectric window configured with a central opening to accommodate injector, 9614. An RF energy source energizes the process gas into a plasma state to process the substrate 50. Embodiments of the top wall, comprising an RF or dielectric window 9700, the gas delivery system 9616 and the central gas injector 9614 may be made entirely or partially from embodiments of the sintered ceramic body as disclosed herein.

System 9600 may further include an electrostatic chuck 9608 that is designed to carry a wafer 50. The chuck 9608 may comprise a puck 9609, for supporting the wafer 50. Parts of the supporting surface of the puck 9609 may be covered with a deposition ring, 9615. Other names for deposition ring 9615 such as deposition shield or deposition ring assembly are taken as synonymous and may be used interchangeably herein. Deposition ring 9615 may be made entirely or partially from embodiments of the sintered ceramic body as disclosed herein.

The puck 9609 may be formed fully or in part from embodiments of the sintered ceramic body as disclosed herein and may have a chucking electrode disposed within the puck 9609 proximate a support surface of the puck 9609 to electrostatically retain the wafer 50 when disposed on the puck 9609. The chuck 9608 may comprise a base 9611 having a ring-like extending to support the puck 9609; and a shaft 9610 disposed between the base and the puck to support the puck above the base such that a gap is formed between the puck 9609 and the base 9610, wherein the shaft 9610 supports the puck proximate a peripheral edge of the puck 9609. Chuck 9608, puck 9609, and deposition ring 9615 may be made entirely or partially from embodiments of the sintered ceramic body as disclosed herein.

The aforementioned sintered ceramic body, comprised in certain embodiments of phase-pure YAG, and in alternate embodiments of at least one phase of YAG, YAP, YAM and combinations thereof, may lend itself to fabrication of large corrosion resistant components of dimensions from 100 mm to 622 mm, with regard to the greatest dimension of the sintered body. The large component dimensions described herein may be enabled by the increased density, density uniformity and hardness of the sintered ceramic body from which chamber components may be fabricated.

Disclosed herein is the use in semiconductor processing chambers of a sintered ceramic body in embodiments comprising the yttrium aluminum garnet (YAG) phase, and in other embodiments comprising the yttrium aluminum garnet (YAG) phase and aluminum oxide, and in other embodiments comprising at least one of the forms of yttrium aluminum oxide including YAG, YAP and YAM and, optionally, minor phases of yttrium oxide and/or aluminum oxide, and combinations thereof, providing a sintered ceramic body which displays improved plasma corrosion and erosion resistance over other materials when subjected to halogen-based plasma etch conditions as well as under deposition conditions.

The sintered ceramic body disclosed herein may have an aluminum oxide phase both on a surface and throughout the body. Thus, in embodiments, the sintered ceramic body may comprise an integral body comprising YAG made according to the process disclosed herein which further comprises an aluminum oxide phase distributed throughout the body. In other words, a structure measured on a surface is representative of a structure within a volume of the bulk sintered ceramic body comprising YAG and in embodiments further comprising aluminum oxide. Thus, disclosed herein is a sintered ceramic body comprising yttrium aluminum oxide having garnet crystallographic structure (YAG) in an amount of about 99.6% by volume and an aluminum oxide phase in an amount of about 0.4% by volume, as depicted in FIGS. 22a) and b).

EXAMPLES

Measurements for all examples were performed as described in the specification. Tables 13 and 15 disclose process conditions and properties for the exemplary sintered ceramic body examples. Table 14 discloses purity as measured using ICPMS methods for the sintered ceramic body examples.

Comparator Example One (562)

Figure 8:
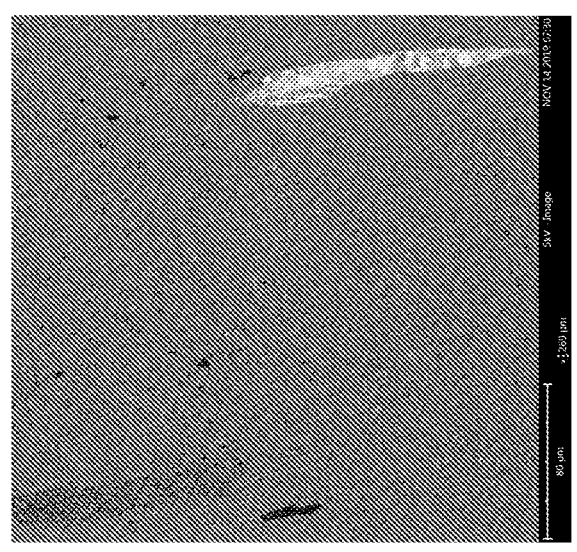
FIG. 8 illustrates an SEM microstructure at 1000× of a first comparator material.

A commercially available yttrium aluminum garnet (YAG) powder (Shin-Etsu lot RYAG-OCX-102) having a specific surface area of 4.3 m$^2$/g, a d10 particle size of 2.4 μm, a d50 particle size of 9 μm and a d90 particle size of 50 μm was sintered at 1450° C. at a pressure of 30 MPa for 30 minutes under vacuum to form a sintered body. FIG. 8 depicts SEM results, illustrating phases of yttria (white regions), YAP and/or YAM (each depicted by light gray regions in the image), and alumina (black regions) in the sintered body. YAG is represented by the dark gray regions in the SEM image. Poor powder compositional control and insufficient mixing of the starting powder during powder processing will result in the mixed crystalline phases upon sintering apparent in this example. Conditions for powder batching and mixing were unavailable. The microstructure reveals compositional inhomogeneities and mixed phase regions which are evident at SEM magnifications of at least 1000× and higher. The sintered ceramic body was found to have purity of from 99.99 to 99.995%, with iron levels of from 11 to 18 ppm, as well as Titanium contamination. These non-uniform microstructures and contaminant elements and their respective amounts may result in unacceptable performance during use in semiconductor etch and deposition applications.

Figure 9:
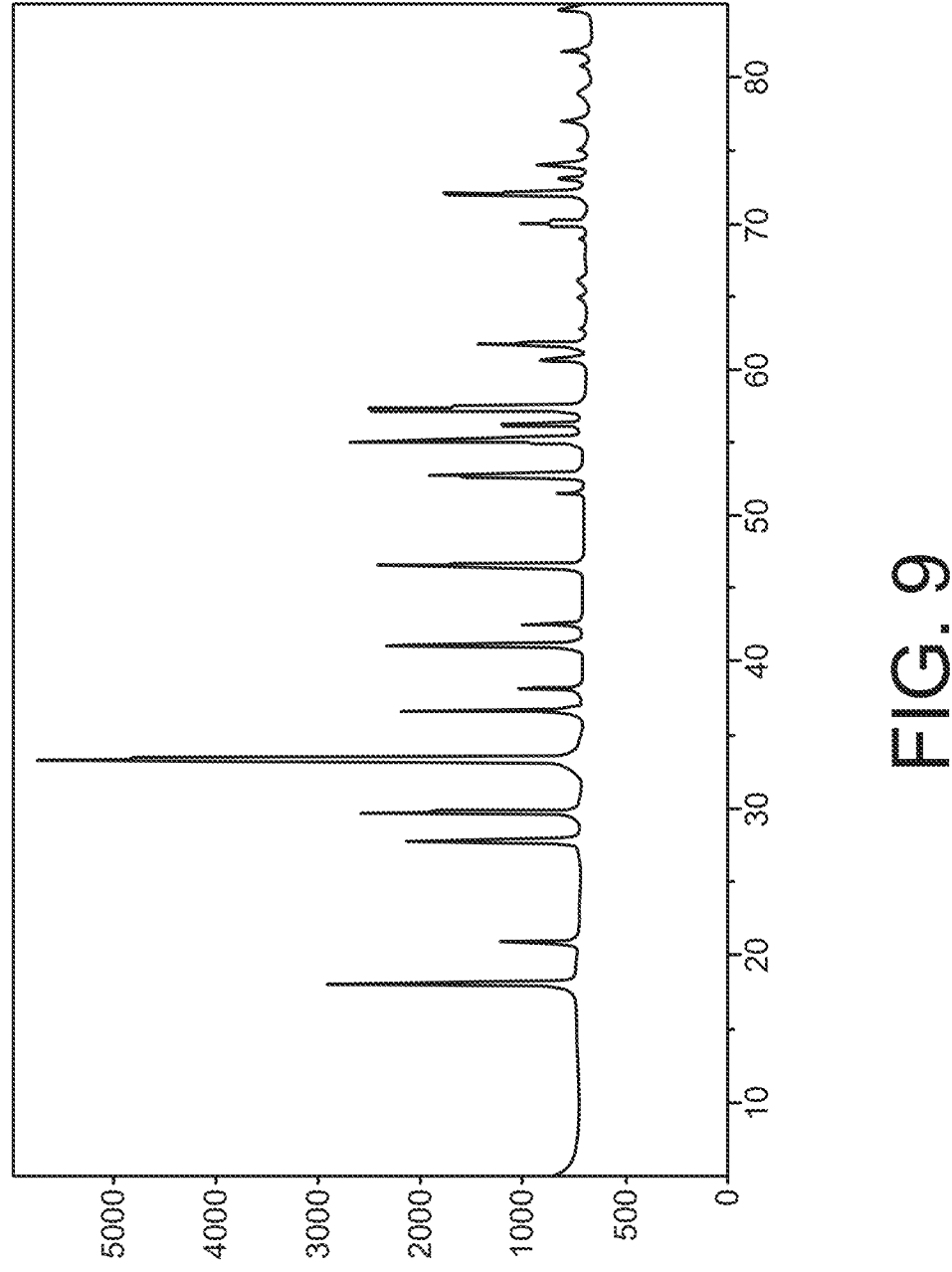
FIG. 9 depicts x ray diffraction results of the YAG powder used to form the first comparator material of FIG. 2.

FIG. 9 shows x ray diffraction results of the commercially available starting powder used to form the comparator material of FIG. 8, illustrating 100% of the YAG phase.

Comparator Example Two (592)

Figure 10:
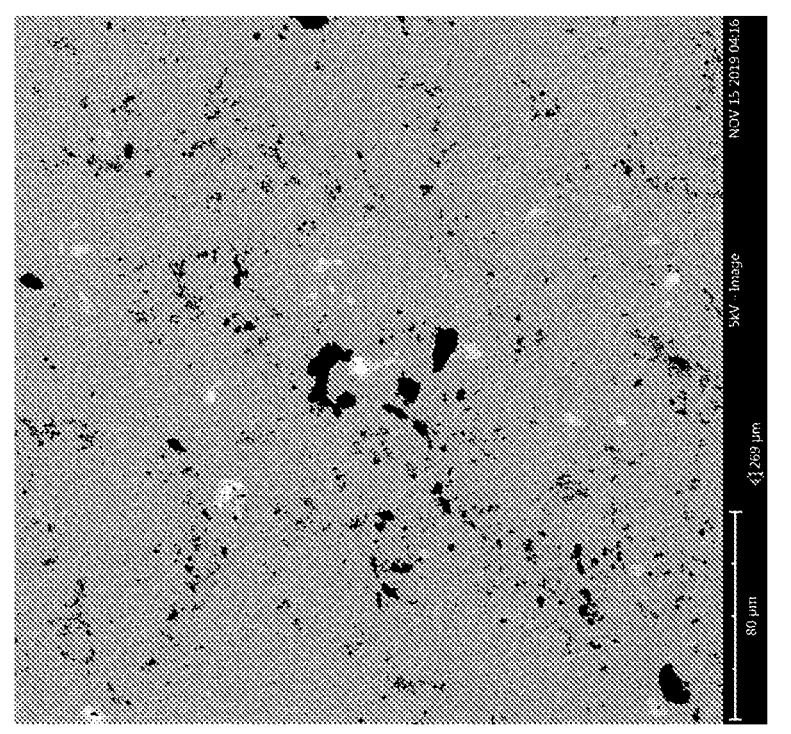
FIG. 10 illustrates an SEM microstructure at 1000× of a second comparator material.

A commercially available powder mixture of yttria and alumina having a specific surface area of 7.3 m$^2$/g, a d10 particle size of 0.15 µm, a d50 particle size of 3.5 µm and a d90 particle size of 64 µm was sintered at 1450° C. at a pressure of 30 MPa for 30 minutes under vacuum to form a sintered body having 100 mm diameter. The powder had total impurities of 48 ppm, including iron contamination of 7 ppm. FIG. 10 depicts SEM results, illustrating numerous phases of yttria, YAP and/or YAM (each depicted by light regions in the image), and alumina (black regions) resulting from powder composition inhomogeneity and/or insufficient mixing. YAG is represented by the predominately gray regions in the SEM image, while yttria regions appear white, and aluminum oxide regions appear black. Poor compositional control during powder processing will result in mixed crystalline phases upon sintering. Conditions for powder batching and mixing were unavailable. The microstructure displays compositional inhomogeneities and mixed phase regions which are evident at SEM magnifications of 1000× and higher. These non-uniform microstructures and contaminant elements and their respective amounts may result in unacceptable performance during use in semiconductor etch and deposition applications.

Figure 11:
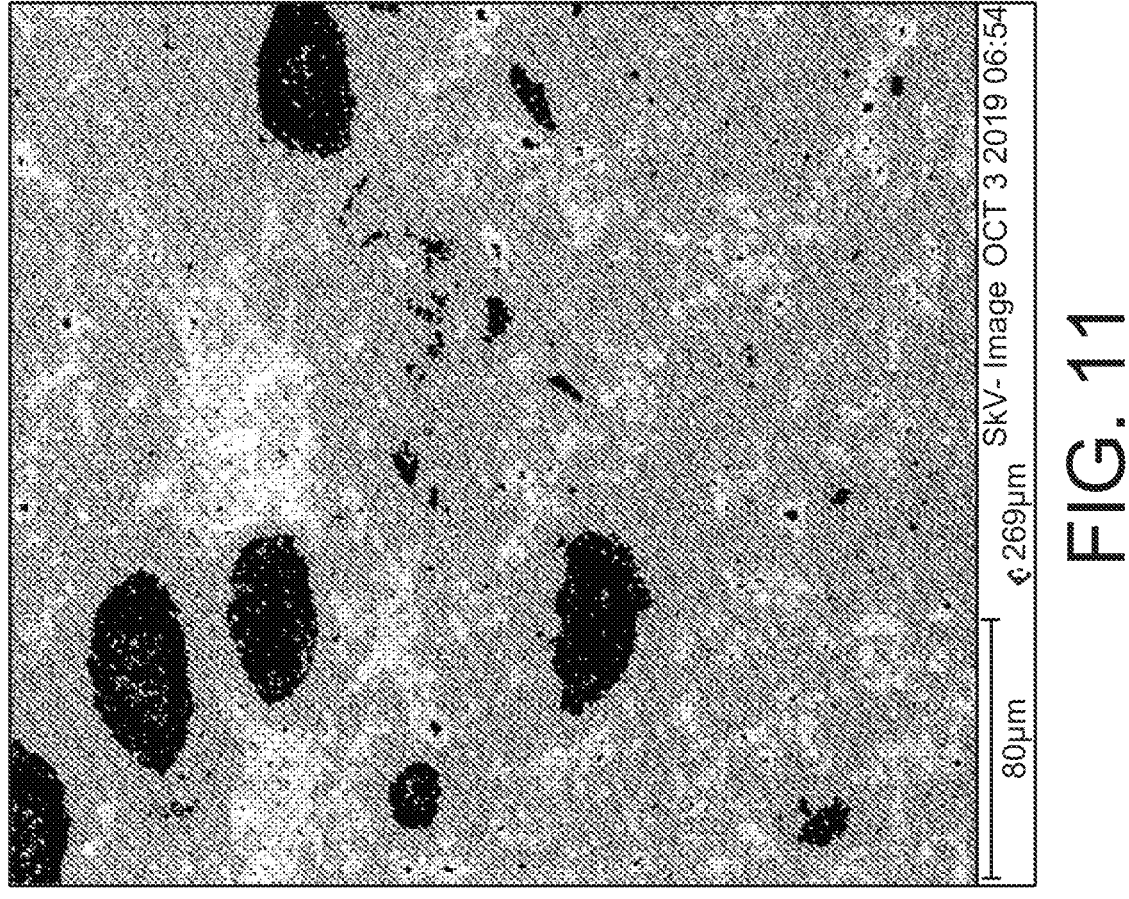
FIG. 11 depicts a 1000× micrograph of a sintered ceramic body comprising YAG, YAP and Alumina.

FIG. 11 illustrates SEM micrographs at from 1000 and 5000× of a sintered ceramic body comprising about 78% YAG (dark gray regions), about 13% YAP or YAM (light gray regions), white regions which may comprise yttria, and about 10% alumina (black regions) as confirmed by EDS. Mixing was performed for a duration of about 4 hours using 3N pure (99.9%) alumina media at a loading of about 5% by powder weight. The presence of non-uniformly distributed alumina from starting materials may indicate that an improved mixing process may be necessary in order to form phase-pure yttrium aluminum oxide having the garnet structure.

Figure 12:
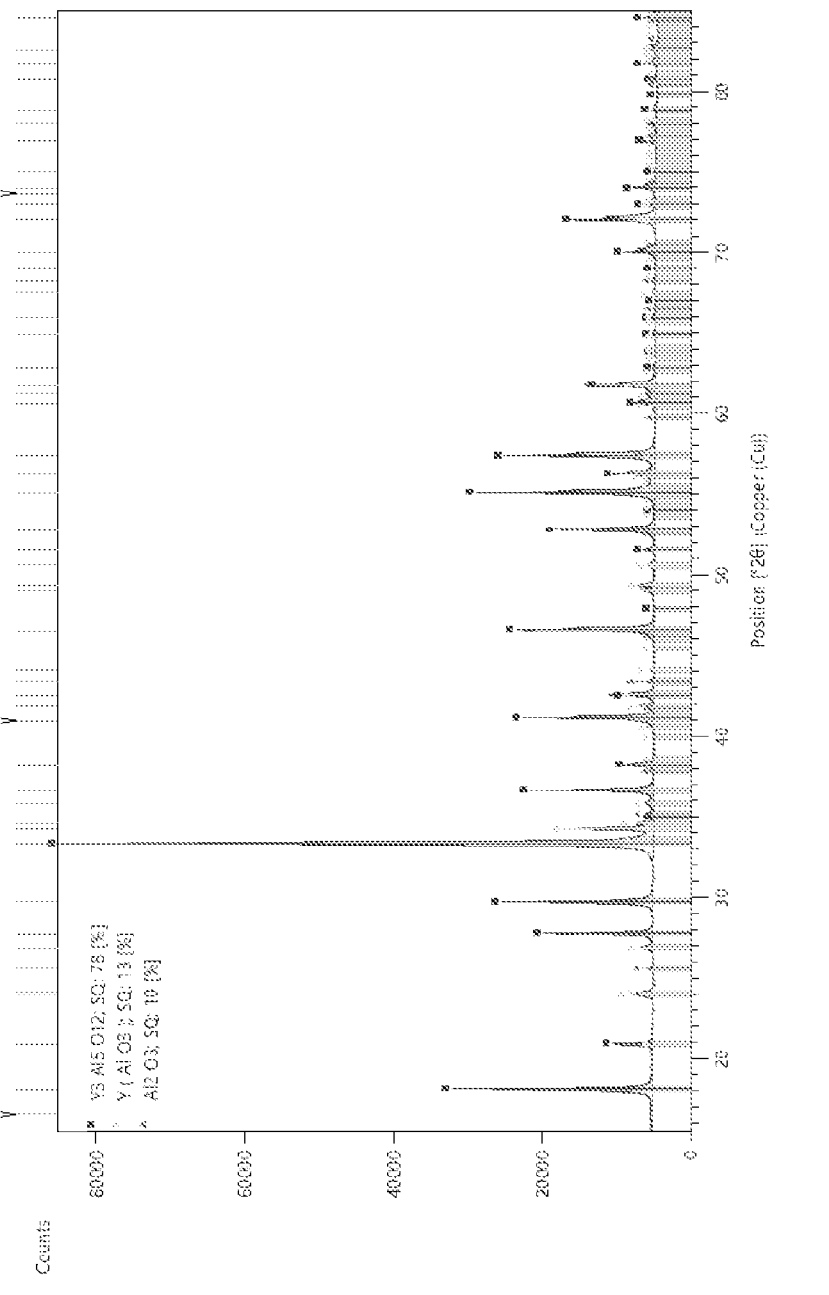
FIG. 12 depicts x ray diffraction results of the sintered ceramic body of FIG. 5.

FIG. 12 illustrates x ray diffraction results for the sintered ceramic body of FIG. 11, confirming a sintered body comprising multiple phases of about 78% YAG (gray regions), about 13% YAP (light gray regions) and about 10% alumina (black regions).

Comparator Example Three (Sample 094/Powder 092-2)

A powder of yttria having a specific surface area of 6 to 8 m$^2$/g, and an average d10 particle size of from 2 to 4 µm, an average d50 particle size of from 4.5 µm to 6.5 µm, and d90 average particle size of from 7 to 9 µm, and a powder of alumina having a specific surface area of from 22 to 24 m$^2$/g, a d10 particle size of from 0.08 to 0.15 µm, a d50 particle size of from 0.65 to 1.0 µm and a d90 particle size of from 2.5 to 5 µm were combined with about 50% by powder weight of high purity alumina media (≥99.9%) and ethanol to form a slurry in about 40 volume % by powder weight. Ball milling was performed at about 120 RPM for a duration of 12 hours and the powder was thereafter dried using methods as known to those skilled in the art. Upon calcination at 1200° C. for 8 hours in air, x ray diffraction according to pattern e) of FIG. 18 indicated the calcined powder mixture comprised YAG, and the powder mixture was measured to have a specific surface area of 0.25 m$^2$/g. The calcined powder mixture was sintered at 1500° C. at a pressure of 30 MPa for 30 minutes under vacuum and thereafter annealed at 1400° C. for 8 hours in air, forming a body having 150 mm diameter. Density measurements as disclosed herein were performed, and an average density of 4.245 g/cc was measured, corresponding to 93.2% of theoretical density for YAG, and having volumetric porosity of 6.8%. This density and porosity, resulting from the powder characteristics and reduced driving force for sintering, may result in handling issues and unacceptable performance during use in semiconductor processing applications.

Figure 18:
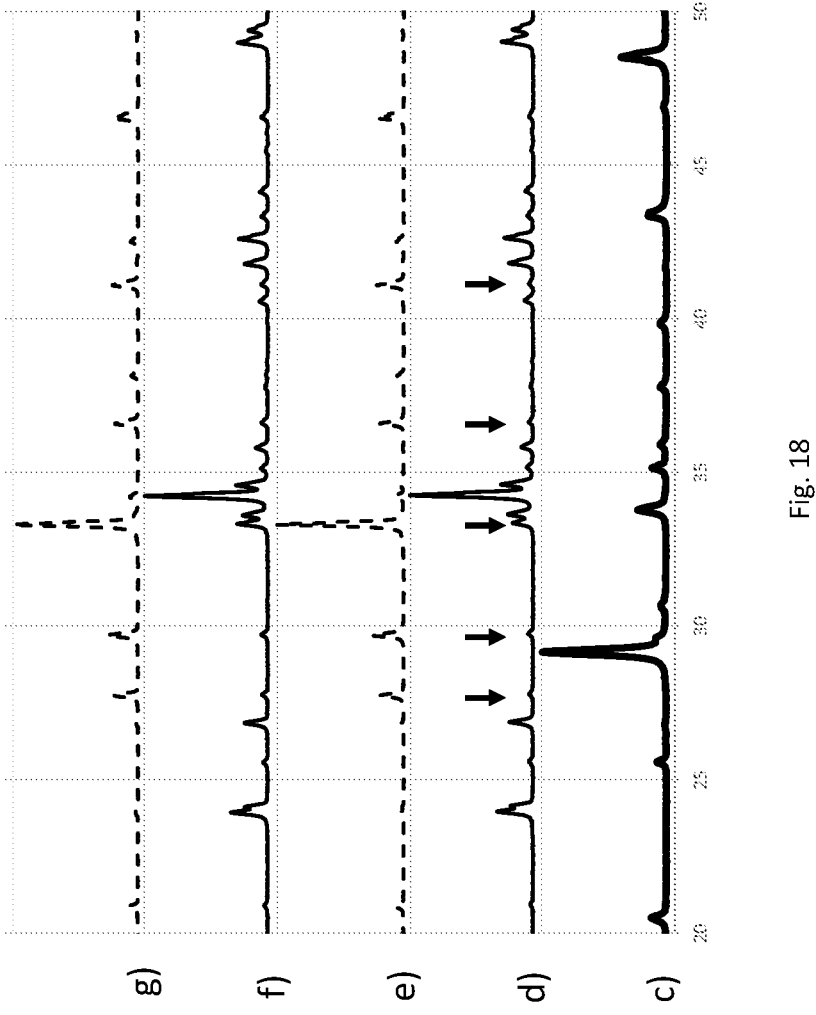
FIG. 18 depicts x-ray diffraction results for powder mixtures calcined under various conditions as disclosed herein.

FIG. 18 shows x ray diffraction results across a range of calcination conditions of the calcined powder mixtures at c) 1000° C./8 hours (powder 092-3), d) 1100° C./8 hours (powder 092-1), e) 1200° C./8 hours (powder 092-2) f) 1100° C./8 hours (powder 125-1), and g) 1100° C./8 hours (powder 127-1). With respect to powder c) as depicted, the crystalline phases from the starting powders of yttria and alumina are present after calcination and the powder has a specific surface area of from 7 to 8 m$^2$/g. Powder d) comprises predominately YAP crystalline phase, with the YAG crystalline phase present in amounts of less than 10% by volume, preferably less than 5% by volume as determined by XRD ad indicated by arrows in FIG. 18*d*). A specific surface area of from 2.5 to 3.5 m$^2$/g was measured for powder d). Powder e) comprises the YAG phase having a specific surface area of about 0.25 m$^2$/g. Powder f) comprises a mixture of YAP and YAG phases, having a specific surface area of about 1 m$^2$/g. Powder g) comprises the YAG phase having a specific surface area of about 0.01 m$^2$/g. Preferred are those calcined powder mixtures having the specific surface areas and x ray diffraction patterns of c) and d).

Formation of a sintered ceramic body comprising highly phase pure YAG may be accomplished through an in-situ, reactive sintering process using the calcined powder mixtures as disclosed herein. The driving force for this in situ/reactive phase sintering may be affected by the presence of a number of crystalline phases as disclosed herein and in particular the amount of YAG phase in the calcined powder mixture, and/or the specific surface area for the calcined powder mixture. Thus, in certain embodiments, the calcined powder mixture is substantially free of, or free of, the yttrium aluminum garnet phase (YAG). In other embodiments, the calcined powder mixture comprises the YAG phase in amounts of less than 10% by volume, preferably less than 5% by volume as measured using XRD. In certain embodiments, the calcined powder mixture may have a specific surface area of greater than 2 m$^2$/g, preferably greater than 4 m$^2$/g, preferably from 2 to 12 m$^2$/g, preferably from 3 to 10 m$^2$/g, preferably from 4 to 6 m$^2$/g. In other embodiments, the calcined powder comprises the yttrium aluminum garnet phase (YAG) in amounts of less than 10% by volume, preferably less than 5% by volume and has a specific surface area of from 2 to about 10 m$^2$/g.

Example One (Sample 519): Dry Mixing

Figure 21:
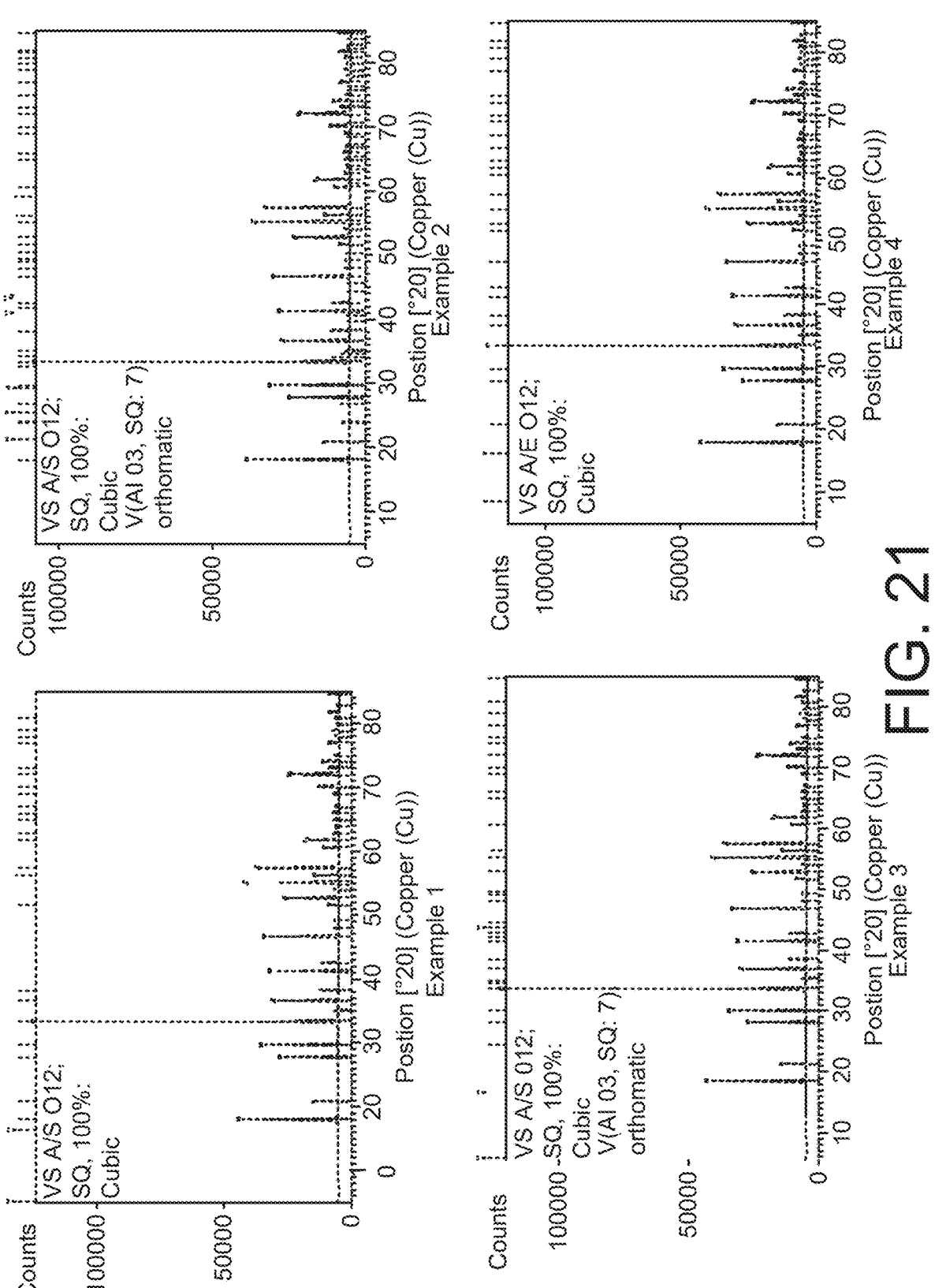
FIG. 21 illustrates phase identification using x ray diffraction for sintered ceramic body examples 1 through 4 of FIG. 14 as disclosed herein.

A powder of yttria having a surface area of 6-8 m$^2$/g and a powder of alumina having surface area of 16-18 m$^2$/g were weighed and combined to create a powder mixture in a molar ratio to form the yttrium aluminum garnet (YAG) phase upon sintering. The powder mixture was then transferred to a vertical tumble (end over end) mixer. A single zirconia media agitator of 30 mm diameter was used during the dry mixing process, performed at about 20 RPM. After 12 hours of dry mixing, the powder was removed from the mixer. Thereafter calcination was performed at 1000° C. for 8 hours. The BET specific surface area was measured from 4.5 to 5.5 g/cc. The calcined powder mixture had a purity of 99.9996% and impurities of about 4 ppm. The powder mixture may be sieved, blended and/or milled at various process steps according to known methods. The calcined powder mixture was then sintered at a temperature of 1450° C., a pressure of 30 MPa for a duration of 30 minutes under vacuum in accordance with the method as disclosed herein. The XRD of FIG. 21 depicts ≥99% YAG phase formation for the sintered ceramic body according to example 1. The sintered ceramic body was polished according to methods known in the art, and surface roughness measurements performed using the methods and equipment as disclosed herein. Sa and Sz values of about 0.010 μm and about 3.40 μm were measured, respectively. An Sdr value of about 498×10$^{-5}$ was also measured. Dry etch testing was performed using a Plasma-Therm Versaline DESC PDC Deep Silicon Etch. The etch method was performed having a pressure of 10 millitorr, a bias of 600 volts and ICP power of 2000 watts. The etch method was conducted with a first etch step having a CF$_4$ flow rate of 90 standard cubic centimetres per minute (sccm), an oxygen flow rate of 30 standard cubic centimetres per minute (sccm), an argon flow rate of 20 standard cubic centimetres per minute (sccm), and a second etch step having an oxygen flow rate of 100 standard cubic centimetres per minute (sccm) and an argon flow rate of 20 standard cubic centimetres per minute (sccm), wherein first and second etch steps are performed for 300 seconds each and repeated for a combined duration of 6 hours. After etching, a Sa value of about 0.016 μm and Sz value of about 3.2 μm were measured, and Sdr value of about 681×10$^{-5}$ was measured after the etching process as disclosed. Tables 3, 4, 5, 13, 14, and 15 summarize results of the polycrystalline ceramic sintered bodies of example 1 according to embodiments as disclosed herein.

Example Two (Sample 529): Wet Mixing

A powder of yttria having a surface area of 6-8 m$^2$/g and a powder of alumina having surface area of 6-8 m$^2$/g were weighed and combined to create a powder mixture in a molar ratio to form the yttrium aluminum garnet (YAG) phase upon sintering. The powder mixture was then transferred to a vertical (end over end) mixer. Ethanol was added to the powder mixture in the end over end mixer to form a slurry of about 50% by powder weight. A single media agitator of 30 mm diameter was used during the wet mixing process, conducted at about 20 RPM. After 12 hours of wet mixing, the slurry containing the powder mixture was removed from the mixer and the ethanol was extracted using a rotary evaporator. Thereafter calcination was performed at 1000° C. for 8 hours on the powder mixture. The powder mixture may be sieved, blended and/or milled at various process steps according to known methods. The calcined powder mixture had a purity of 99.9956% and impurities of about 44 ppm. The calcined powder mixture was then sintered at a temperature of 1450° C., a pressure of 30 MPa for a duration of 30 minutes under vacuum in accordance with the method as disclosed herein. XRD of FIG. 21 for the sintered ceramic body depicts 93% YAG and 7% YAP phase. The YAP phase is reported to have a theoretical density of 5.35 g/cc, thus overall densities for mixed phase samples may be higher than those of pure YAG, which has theoretical density of 4.556 g/cc. The polycrystalline sintered ceramic body was polished according to methods known in the art, and surface roughness measurements performed using the methods and equipment as disclosed herein. Sa and Sz values of about 0.010 μm and about 3.75 μm were measured, respectively. An Sdr value of about 720×10$^{-5}$ was also measured. Tables 3 and 13 summarize results of the ceramic sintered bodies of Example 2 according to embodiments as disclosed herein.

Example Three (Sample 531): Wet Ball Milling

A powder of yttria having a surface area of 6-8 m$^2$/g and a powder of alumina having surface area of 6 to 8 m$^2$/g were weighed and combined to create a powder mixture in a molar ratio to form a yttrium aluminum garnet (YAG) phase upon sintering. The powder mixture was then transferred to a container for ball milling. Alumina media at about a 50% loading by weight and ethanol in about 50% by weight were added to the container to form a slurry and enhance mixing. Ball milling using a rolling action about a horizontal axis was performed for a duration of 12 hours and thereafter the ethanol was extracted from the powder mixture using a rotary evaporator. The powder mixture was calcined at 1000° C. for 8 hours. The powder mixture may be sieved, blended and/or milled at various process steps according to known methods. The calcined powder mixture had a purity of 99.9968% and impurities of about 33 ppm. The calcined powder mixture was then sintered at a temperature of 1450° C., a pressure of 30 MPa for a duration of 30 minutes under vacuum in accordance with the method as disclosed herein. XRD of FIG. 21 for the sintered ceramic body depicts 95% YAG and 5% YAP phase. The YAP phase is reported to have a theoretical density of 5.35 g/cc, thus overall densities for mixed phase sintered bodies may be higher than those of pure YAG, having theoretical density of 4.556 g/cc. The polycrystalline sintered ceramic body was polished according to methods known in the art, and surface roughness measurements performed using the methods and equipment as disclosed herein. Sa and Sz values of about 0.010 μm and about 3.9 μm were measured, respectively. An Sdr value of about 885×10$^{-5}$ was also measured. Tables 3, 4, 5, 13, and 15 summarize results of the ceramic sintered bodies of example 3 according to embodiments as disclosed herein.

Example Four (Sample 514): Wet Ball Milling

A powder of yttria having a surface area of 6-8 m$^2$/g and a powder of alumina having surface area of 16 to 18 m$^2$/g were weighed and combined to create a powder mixture in a molar ratio to form a yttrium aluminum garnet (YAG) phase upon sintering. The powder mixture was then transferred to a container for ball milling. Alumina media at about a 50% loading by powder weight and ethanol in about 50% by weight were added to the container to form a slurry and enhance mixing. In other instances, ball milling may be performed with water or under dry conditions using only yttria or zirconia media. Ball milling using a rolling action about a horizontal axis was performed for a duration of 12 hours and thereafter the ethanol was extracted from the powder mixture using a rotary evaporator. The powder mixture was calcined at 1000° C. for 4 hours. The powder mixture may be sieved, blended and/or milled at various process steps according to known methods. The calcined powder mixture was then sintered at a temperature of 1450° C., a pressure of 30 MPa for a duration of 30 minutes under vacuum in accordance with the method as disclosed herein. At least 99% YAG phase in the sintered ceramic body was found using x ray diffraction as depicted in FIG. 21. The polycrystalline sintered ceramic body was polished according to methods known in the art, and surface roughness measurements performed using the methods and equipment as disclosed herein. Sa and Sz values of about 0.012 μm and about 3.63 μm were measured, respectively. An Sdr value of about 1138×10$^5$ was also measured. Tables 3, 4, 13, 14, and 15 summarize results of the ceramic sintered bodies of example 4 according to embodiments as disclosed herein.

FIG. 19 illustrates 1000×SEM micrographs of sintered ceramic bodies comprising at least one yttrium aluminum oxide as disclosed herein in accordance with Examples 2, 3 and 4. The YAG phase appears dark gray, phases of YAP or YAM appear light gray, aluminum oxide and porosity appears black. As depicted, Example 2 illustrates about 93% YAG phase (dark gray regions) with about 7% YAP phase (light gray regions), levels of aluminum oxide (black regions) below the XRD detection limit, and about 1% volumetric porosity (black regions) as calculated from density measurements, while Example 3 illustrates about 95% YAG phase, about 5% YAP phase, levels of aluminum oxide (black regions) below the XRD detection limit, and about 0.95% volumetric porosity (black regions) as calculated from density measurements. Example 4 confirms formation of ≥99% YAG phase with volumetric porosity of about 0.15% by volume.

FIG. 20 illustrates 5000× micrographs of sintered ceramic bodies comprising at least one yttrium aluminum oxide as disclosed herein in accordance with Examples 1, 2, 3 and 4. As depicted, example 1 depicts about 99% YAG formation with a grain size of about 8 um and less; example 2 illustrates about 93% YAG phase with about 7% YAP phase (lighter regions), while example 3 illustrates about 95% YAG phase and about 5% YAP phase (lighter regions), and example 4 confirms formation of about 99% YAG phase. FIG. 20 depicting example 1 further depicts a microstructure having a maximum grain size of about 8 um and less.

FIG. 21 illustrates x ray diffraction results for the ceramic sintered bodies of examples 1 through 4 of FIG. 20 as disclosed herein. Examples 1 and 4 depict formation of a sintered ceramic body comprising about 99% of the YAG phase. Examples 2 and 3 comprise YAG and from 5 and 7% of the YAP phase, respectively.

Example Five: (Sample 399, Powder 359-09) YAG Polycrystalline Sintered Ceramic Body, Low Temperature Calcination A powder of yttria having a specific surface area of 2 to 3 m$^2$/g, a d10 particle size of from 3 to 4 μm, a d50 particle size of from 6.5 to 7.5 μm and a d90 particle size of from 11.5 to 13 μm and a powder of alumina having a specific surface area of from 5.75 to 6.75 m$^2$/g, a d10 particle size of from 0.10 to 0.2 μm, a d50 particle size of from 2 to 3.5 μm and a d90 particle size of from 15 to 30 μm were combined in a molar ratio to form a calcined powder mixture to form the yttrium aluminum garnet (YAG) phase upon sintering. High purity alumina media (>99.99% as measured by ICPMS) was added at 50% loading by powder weight, and ethanol was added to form about a 40 volume % slurry. Ball milling using a rolling action about a horizontal axis was performed for a duration of 16 hours and thereafter the ethanol was extracted from the powder mixture using a rotary evaporator. Upon calcination at 850° C. for 6 hours in air, the calcined powder mixture was measured to have a specific surface area of from 4 to 5 m$^2$/g, a d10 particle size of from 0.15 to 0.25 μm, a d50 particle size of from 5 to 7 μm and a d90 particle size of from 18 to 22 μm. X ray diffraction confirmed only yttria and alumina phases present in the calcined powder mixture according to Table 11. The powder mixture may be sieved, blended and/or milled at various process steps according to known methods. The calcined powder mixture was sintered at 1600° C. at a pressure of 20 MPa for 120 minutes under vacuum and thereafter annealed at 1400° C. for 8 hours in air to form a polycrystalline sintered ceramic body of 572 mm greatest dimension. Density measurements were performed in accordance with ASTM B962-17, and an average density of 4.458 g/cc was measured across 5 measurements, corresponding to 97.859% of theoretical density for YAG and volumetric porosity of 2.141% as calculated from density measurements. Tables 3 and 13 summarize results of the sintered ceramic body and calcined powder of example 5 according to embodiments as disclosed herein.

Example Six: (Sample 195, Powder 194-2) YAG Polycrystalline Sintered Ceramic Body, High Temperature Calcine A powder of yttria having a specific surface area of from 4.5 to 6 m$^2$/g, a d10 particle size of from 2 to 3 μm, a d50 particle size of from 4 to 7 μm and a d90 particle size of from 7 to 8 μm and a powder of alumina having a specific surface area of from 5.5 to 6.5 m$^2$/g, a d10 particle size of from 0.10 to 0.2 μm, a d50 particle size of from 2 to 3.5 μm and a d90 particle size of from 15 to 30 μm were combined in a molar ratio to form a calcined powder mixture forming the yttrium aluminum garnet (YAG) phase upon sintering. High purity alumina media (>99.99% as measured by ICPMS) was added at 50% loading by powder weight, and ethanol was added to form about a 40 volume % slurry. Ball milling using a rolling action about a horizontal axis was performed for a duration of 12 hours and thereafter the ethanol was extracted from the powder mixture using a rotary evaporator. Upon calcination at 1000° C. for 10 hours in air, the calcined powder mixture was measured to have a specific surface area of from 4 to 5 m$^2$/g, a d10 particle size of from 0.75 to 2 μm, a d50 particle size of from 26 to 32 μm and a d90 particle size of from 220 to 240 μm. The powder mixture may be sieved, blended and/or milled at various process steps according to known methods. X ray diffraction confirmed the presence of yttria, alumina and YAM (yttrium aluminum monoclinic) phases in the calcined powder mixture according to Table 11. The calcined powder mixture was sintered at 1500° C. at a pressure of 20 MPa for 30 minutes under vacuum and thereafter annealed at 1500° C. for 8 hours in air to form a sintered ceramic body of 150 mm dimension. Density measurements were performed in accordance with ASTM B962-17, and an average density of 4.492 g/cc was measured across 5 measurements, corresponding to 98.604% of theoretical density for YAG and volumetric porosity of 1.396% as calculated from density measurements. SEM results indicated a uniform microstructure depicting presence of only the YAG phase in the polycrystalline sintered ceramic body. Tables 3, 10, 11, 13, and 14 summarize results of the sintered ceramic body and calcined powder of example 6 according to embodiments as disclosed herein.

Example Seven: (Sample 93/Powder 092-1) YAG Polycrystalline Sintered Ceramic Body, High Temperature Calcine A powder of yttria having a specific surface area of 6 to 8 $m^2$/g, and an average d10 particle size of from 1.5 to 3.5 to μm, an average d50 particle size of 4.5 μm to 6.5 μm, and d90 average particle size of 6.5 to 8.5 μm, and a powder of alumina having a specific surface area of from 5 to 7 $m^2$/g, a d10 particle size of from 0.10 to 0.5 μm, a d50 particle size of from 2 to 6 μm and a d90 particle size of from 15 to 40 μm were combined in a molar ratio to form a yttrium aluminum garnet (YAG) phase upon sintering. High purity alumina media (>99.99% as measured by ICPMS) was added at 50% loading by powder weight, and ethanol was added to form about a 40 volume % slurry. Ball milling using a rolling action about a horizontal axis was performed for a duration of 12 hours and thereafter the ethanol was extracted from the powder mixture using a rotary evaporator. Upon calcination at 1100° C. for 8 hours in air, the calcined powder mixture was measured to have a specific surface area of from 2.5 to 3.5 $m^2$/g, a d10 particle size of from 1.5 to 3.5 μm, a d50 particle size of from 10 to 13 μm and a d90 particle size of from 180 to 220 μm. The powder mixture may be sieved, blended and/or milled at various process steps according to known methods. X ray diffraction as listed in Table 11 and according to pattern d) of FIG. 18 confirmed the presence of the YAP phase and about 10% and less by volume of YAG (yttrium aluminum garnet phase as shown by arrow indicators) in the calcined powder mixture. The calcined powder mixture was sintered at 1500° C. at a pressure of 30 MPa for 30 minutes under vacuum to form a sintered ceramic body of 150 mm dimension. Density measurements were performed in accordance with ASTM B962-17, and an average density of 4.544 g/cc was measured across 5 measurements, corresponding to 99.730% of theoretical density for YAG and volumetric porosity of 0.270% as calculated from density measurements. SEM results indicated a uniform microstructure depicting presence of only the YAG phase in the polycrystalline sintered ceramic body. Tables 3, 10, 11, 13, and 14 summarize results of the sintered ceramic body and calcined powder mixture according to embodiments as disclosed herein.

Example Eight: (Sample 258) YAG Polycrystalline Sintered Ceramic Body

A powder of yttria having a specific surface area of from 4.5 to 6 $m^2$/g and a powder of alumina having a specific surface area of from 3.5 to 5 $m^2$/g were combined in a molar ratio to form the yttrium aluminum garnet (YAG) phase upon sintering. High purity alumina media (>99.99% as measured by ICPMS) was added at 50% loading by powder weight, and ethanol was added to form about a 40 volume % slurry. Ball milling using a rolling action about a horizontal axis was performed for a duration of 12 hours and thereafter the ethanol was extracted from the powder mixture using a rotary evaporator. Upon calcination at 1000° C. for 10 hours in air, the calcined powder mixture was measured to have a specific surface area of from 7 to 8 $m^2$/g, a d10 particle size of from 0.75 to 1.75 μm, a d50 particle size of from 90 to 110 μm and a d90 particle size of from 240 to 280 μm. The powder mixture may be sieved, blended and/or milled at various process steps according to known methods. The calcined powder mixture was sintered at 1550° C. at a pressure of 20 MPa for 60 minutes under vacuum to form a disc shaped sintered ceramic body of 406 mm greatest dimension. Density measurements were performed in accordance with ASTM B962-17 from 9 samples taken along a greatest dimension of the sintered body, and an average density of 4.542 g/cc was measured across 135 measurements, corresponding to 99.70% of theoretical density for YAG, and average volumetric porosity of 0.3% as calculated from density measurements. The density was found to vary across the greatest dimension of the polycrystalline sintered ceramic body from 4.526 to 4.553 g/cc (or from 99.335 to 99.936% of theoretical for YAG) and the density variance was determined to be about 0.601%. The polycrystalline sintered ceramic body had a thickness of 31 mm and the density variance across the thickness was determined by measuring the density in top, middle and bottom portions of each of the 9 samples taken along the greatest dimension, and density across the thickness was measured to vary by 0.3% and less. Using the methods as disclosed herein, density measurements may have an accuracy of about 0.1%, thus density variation across the thickness of the sintered ceramic body may be from about 0.1 to 0.3%. SEM results indicated a uniform microstructure depicting presence of only the YAG phase in the polycrystalline sintered ceramic body. The SEM images of FIGS. 24a) at 1000× and b) at 5000× reveal a highly dense and uniform microstructure depicting presence of the YAG phase (dark gray) in an amount of about 99% and greater by volume of the sintered ceramic body. Tables 3, 10, 11, 13, and 14 summarize results of the sintered ceramic body and calcined powder mixture according to embodiments as disclosed herein. An additional sample was sintered in accordance with this example, annealed at 1200° C. for 8 hours in air and had an average density of 99.73% of theoretical for YAG using the methods as disclosed herein. A further sample was sintered in accordance with this example, annealed at 1100° C. for 8 hours in air and had an average density of 99.75% of theoretical for YAG using the methods as disclosed herein.

Example Nine: (Sample 408/Powder 359-06) YAG Polycrystalline Sintered Ceramic Body Formed at Low Pressure A powder of yttria having a specific surface area of 2 to 3 $m^2$/g, a d10 particle size of from 3 to 4 μm, a d50 particle size of from 6.5 to 7.5 μm and a d90 particle size of from 11.5 to 13 μm and a powder of alumina having a specific surface area of from 5.75 to 6.75 $m^2$/g, a d10 particle size of from 0.10 to 0.2 μm, a d50 particle size of from 2 to 3.5 μm and a d90 particle size of from 15 to 30 μm were combined in a molar ratio to form a powder mixture forming the yttrium aluminum garnet (YAG) phase with 0.5% by volume excess aluminum oxide upon sintering. High purity alumina media (>99.99% as measured by ICPMS) was added at 50% loading by powder weight, and ethanol was added to form about a 40 volume % slurry. Ball milling using a rolling action about a horizontal axis was performed for a duration of 12 hours and thereafter the ethanol was extracted from the powder mixture using a rotary evaporator. Upon calcination at 850° C. for 6 hours in air, the calcined powder mixture was measured to have a specific surface area of from 3.5 to 4.5 m²/g, a d10 particle size of from 0.3 to 0.6 μm, a d50 particle size of from 8 to 11 μm and a d90 particle size of from 20 to 24 μm. X ray diffraction confirmed only yttria and alumina phases present in the calcined powder mixture according to Table 11. ICPMS of the calcined powder mixture measured impurities of about 17 ppm. The powder mixture may be sieved, blended and/or milled at various process steps according to known methods. The calcined powder mixture was sintered at 1600° C. at a pressure of 15 MPa for 90 minutes under vacuum and thereafter annealed at 1400° C. for 8 hours in air to form a polycrystalline sintered ceramic body of 572 mm greatest dimension comprising YAG with excess alumina to the extent it remains in the polycrystalline sintered ceramic body. Density measurements were performed in accordance with ASTM B962-17, and an average density of 4.378 g/cc was measured across 5 measurements, corresponding to 96.088% of theoretical density for YAG and volumetric porosity of 3.912% as calculated from density measurements. Tables 3, 10, 11, 13, and 14 summarize results of the sintered ceramic body and calcined powder according to embodiments as disclosed herein.

Example Ten: (Sample 395, 359-11) YAG Polycrystalline Sintered Ceramic Body

A powder of yttria having a specific surface area of 2 to 3 m²/g, a d10 particle size of from 3 to 4 μm, a d50 particle size of from 6.5 to 7.5 μm and a d90 particle size of from 11.5 to 13 μm and a powder of alumina having a specific surface area of from 5.75 to 6.75 m²/g, a d10 particle size of from 0.10 to 0.3 μm, a d50 particle size of from 2.5 to 5 μm and a d90 particle size of from 15 to 30 μm were combined in a molar ratio to form a yttrium aluminum garnet (YAG) phase upon sintering. High purity alumina media (>99.99% as measured by ICPMS) was added at 50% loading by powder weight, and ethanol was added to form about a 40 volume % slurry. Ball milling using a rolling action about a horizontal axis was performed for a duration of 16 hours and thereafter the ethanol was extracted from the powder mixture using a rotary evaporator. Upon calcination at 850° C. for 6 hours in air, the calcined powder mixture was measured to have a specific surface area of from 4 to 5 m²/g, a d10 particle size of from 0.15 to 0.25 μm, a d50 particle size of from 5 to 7 μm and a d90 particle size of from 18 to 24 μm. X ray diffraction confirmed only yttria and alumina phases present in the calcined powder mixture according to Table 11. The powder mixture may be sieved, blended and/or milled at various process steps according to known methods. The calcined powder mixture was sintered at 1600° C. at a pressure of 20 MPa for 90 minutes under vacuum and thereafter annealed at 1400° C. for 8 hours to form a polycrystalline sintered ceramic body of 572 mm greatest dimension. Density measurements were performed in accordance with ASTM B962-17, and an average density of 4.389 g/cc was measured across 5 measurements, corresponding to 96.334% of theoretical density for YAG and volumetric porosity of 3.656% as calculated from density measurements. The density variation was measured across the greatest dimension and found to be 1.712%. Tables 3, 10, 11, 13, and 14 summarize results of the sintered ceramic body and calcined powder according to embodiments as disclosed herein.

Example Eleven: (Sample 506, Powder 20261); Polycrystalline YAG Sintered Ceramic Body of 622 mm Greatest Dimension A powder of yttria (average purity of 99.9980%, average impurities of about 21 ppm) having a specific surface area of 2 to 3 m²/g, a d10 particle size of from 2.5 to 4.5 μm, a d50 particle size of from 6 to 8 μm and a d90 particle size of from 11 to 13 μm, and a powder of alumina (purity 99.9994%, impurities about 6 ppm) having a specific surface area of from 6.5 to 8.5 m²/g, a d10 particle size of from 0.75 to 1.5 μm, a d50 particle size of from 2 to 5 μm and a d90 particle size of from 18 to 24 μm were combined in a molar ratio to form a sintered ceramic body comprising the yttrium aluminum garnet (YAG) phase upon sintering. High purity alumina media (≥99.9% as measured by ICPMS) was added at about 60% loading relative to powder weight, and ethanol was added in an amount of about 35% by combined weight of ethanol and powder to form a slurry. Ball milling as known to those skilled in the art was performed for a duration of about 20 hours and thereafter the ethanol was extracted from the powder mixture using rotary evaporation for about 3 hours at temperatures of from 60 to 75° C. according to known methods. Upon calcination at 1050° C. for 6 hours in air, the calcined powder mixture was measured to have a specific surface area of from 3.5 to 5.5 m²/g, a d10 particle size of from 1 to 3.5 μm, a d50 particle size of from 5 to 8 μm and a d90 particle/agglomerate size of from 130 to 160 μm as listed in Table 10. In certain embodiments, the calcination conditions as disclosed herein may result in agglomeration of the powder mixture and thus greater variability in particle size distributions may result. Thus, in embodiments, the particle size as referred to herein may include a single particle and in other embodiments, the particle size as referred to herein may include an agglomerate comprising more than one particle or an agglomeration of multiple particles which may be measured, using the laser particle size detection methods as disclosed herein, as a single, large particle. X ray diffraction confirmed yttria, alumina and YAM phases present in the calcined powder mixture. The purity of the calcined powder mixture was about the same as that of the starting powders as measured using ICPMS methods as disclosed herein, thus, a high purity (>99.999%) sintered ceramic body may be formed therefrom. The detection limit using ICPMS methods as disclosed herein for Si in the form of SiO₂ is about 14 ppm, thus the starting powders of yttria and alumina, as well as the calcined powder mixture may comprise Si in the form of silica at a detection level of about 14 ppm, although silica was not detected using ICPMS in the starting powders and calcined powder mixture. Table 11 lists calcination conditions, calcined powder phases and powder purity. The powders, powder mixture and/or calcined powder mixture may be sieved, tumbled, blended and/or milled at various process steps according to known methods. The calcined powder mixture was disposed inside a volume defined by a tool set of a sintering apparatus as disclosed herein, and vacuum conditions of from 10⁻² to 10⁻³ torr were created inside the volume. The calcined powder mixture inside the volume was heated at 5° C./minute to 800° C., at which temperature a pressure of 5 MPa was applied, then simultaneously heat was applied at a heating rate of from about 2 to about 3° C./minute and pressure was applied at a rate of from about 0.2 to about 0.25 MPa/min to reach the sintering conditions of 1650° C. and 15 MPa for 60 minutes to form a polycrystalline YAG sintered ceramic body in a disc shape having 622 mm greatest dimension or diameter. Use of high purity alumina media during the milling process may result in excess alumina in amounts of about 0.1% and less by volume to the extent it remains in the sintered ceramic body. Density measurements were performed in accordance with ASTM B962-17 from samples cut across a radius of the sample and the density results are illustrated in FIG. 25b.

Five measurements each were taken at 6 locations along the radius, and an average density of 4.546 g/cc was measured, corresponding to 99.783% of theoretical for YAG, and volumetric porosity of 0.217%. Densities across the radius were from 99.7 to 99.9% of theoretical for YAG. The variation in density as depicted in FIG. 25b) was measured relative to the highest density measurement along the radius, and a maximum variation in density of 0.208% was measured. During sintering of the calcined powder mixture, pressure and temperature are applied in a radially symmetric configuration. Thus, properties such as high density (>99% of theoretical for YAG) and minimal density variation (≤0.21%) are maintained across a radius, and also correspondingly across a diameter or greatest dimension of the sintered ceramic body. Thus, disclosed herein is a sintered ceramic body having an average density of 4.546 g/cc, ranging in density from 99.7 to 99.9% of the theoretical density for YAG, comprising average volumetric porosity of 0.217%, and having a maximum density variation of 0.208% and less across the diameter of the sintered ceramic body.

A 5000×SEM image was analyzed for grain size using the Heyn Line Intercept Method as known to those skilled in the art, and an average grain size of 6.2 um with a standard deviation of 0.71 um was measured across 25 repetitions. A maximum and minimum grain size of 7.7 um and 5.0 um respectively, were also measured as listed in Table 3. Hardness measurements were performed using a load cell of 0.025 kgf as measured in accordance with ASTM Standard C1327, and an average hardness of about 14.8 GPa was measured wherein the average was calculated from 8 measurements, with maximum and minimum hardness values of 16 and 12.7 GPa, respectively.

Measurements of crystalline phase purity of sample 506 were performed using a combination of XRD, SEM imaging and use of image processing software in accordance with methods as disclosed in Example 11. XRD confirmed sample 506 comprised YAG in an amount of at least 95% by volume. The combination of XRD, SEM and image processing software may provide for the determination of phase purity to about +/−0.10% by volume. Using the disclosed methods of Archimedes density measurements, XRD, SEM imaging and image analysis software, sample 506 comprised about 0.3% by volume of the alumina phase, about 0.2% of volumetric porosity, and about 99.5% by volume of the YAG phase. Using SEM and ImageJ processing, a minimum pore size of 0.1 um may be measured. For the sintered ceramic body disclosed herein, a maximum pore size of 1.7 um was measured using SEM imaging and the image processing methods as disclosed. Thus, according to embodiments as disclosed herein, the sintered ceramic body comprising YAG may comprise pores wherein the pores may have a maximum size of from 0.1 to 5 um, preferably from 0.1 to 4 um, preferably from 0.1 to 3 um, preferably from 0.1 to 2 um, preferably from 0.1 to 1.7 um.

The sintered ceramic body according to sample 506 may comprise an integral body as made according to the process disclosed herein, and thus may comprise the YAG phase, an aluminum oxide phase and volumetric porosity distributed on a surface and throughout the body. In other words, a structure measured on a surface is representative of a structure within a volume of the bulk sintered ceramic body comprising YAG and in embodiments further comprising aluminum oxide. Thus, sintered ceramic bodies comprising the YAG phase in amounts from 90 to 99.7%, preferably from 90 to 99.5%, preferably from 90 to 99.3%, preferably from 95 to 99.7%, preferably from 95 to 99.5%, preferably from 95 to 99.3%, each by volume, may be formed using the materials and methods as disclosed herein. In further embodiments, sintered ceramic bodies comprising the YAG phase in amounts as specified may further comprise porosity in an amount by volume of from 0.1 to 0.3%, and aluminum oxide in an amount by volume of from 0.2 to 0.4%.

Tables 3, 4, 5, 13 and 15 summarize results of the sintered ceramic body and calcined powder according to embodiments as disclosed herein.

Figure 26:
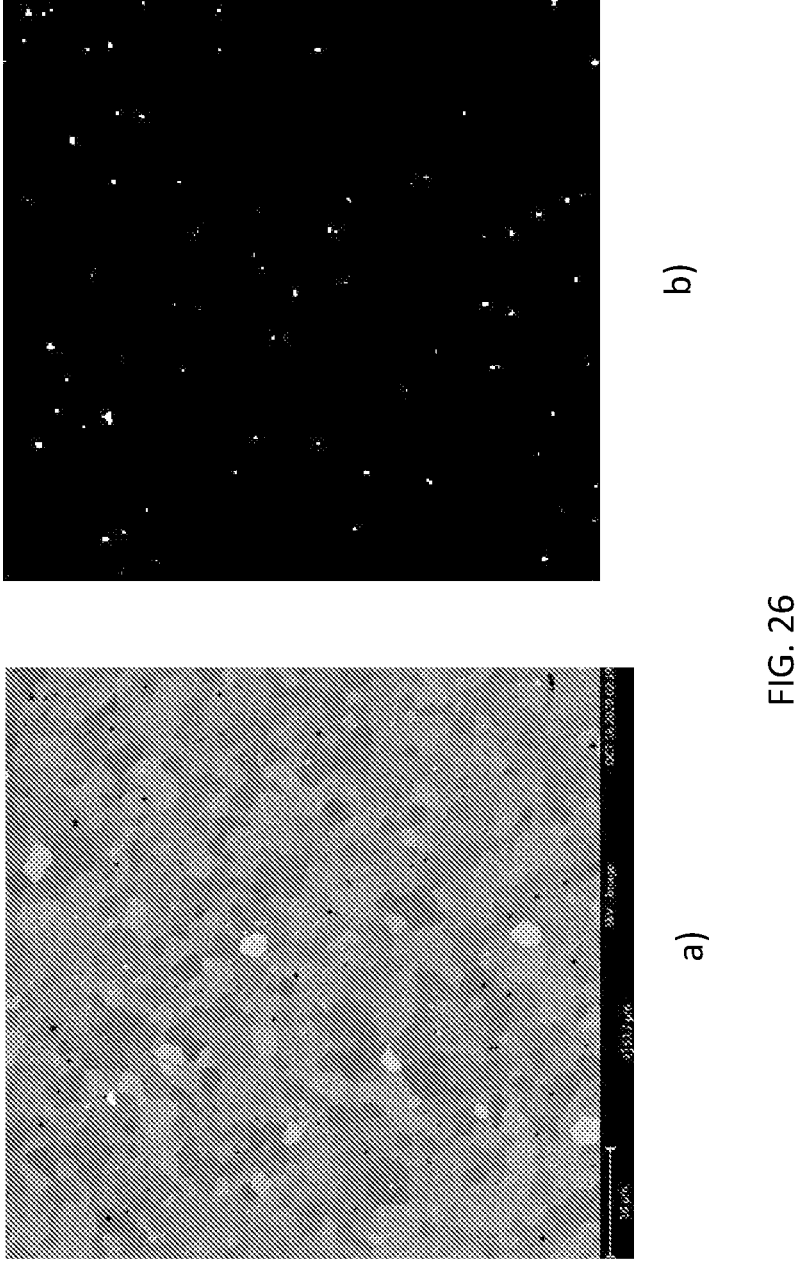
FIG. 26a) depicts an SEM micrograph of a sample region using backscatter detection methods and b) an SEM image from the same region after thresholding to reveal porosity and alumina phases corresponding to example 12 as disclosed herein.

Example Twelve: (samples 512, 512-1, powder 505-1); polycrystalline YAG sintered ceramic body; A powder of yttria (purity about 99.9992% relative to 100% pure yttria) having a specific surface area of from 0.75 to 2 m$^2$/g, a d10 particle size of from 3.5 to 6.5 μm, a d50 particle size of from 7.5 to 10.5 μm and a d90 particle size of from 15 to 20 μm, and a powder of alumina (purity about 99.9998% relative to 100% pure alumina) having a specific surface area of from 5 to 7 m$^2$/g, a d10 particle size of from 1 to 3 μm, a d50 particle size of from 3.5 to 6.5 μm and a d90 particle size of from 50 to 70 μm were combined in a molar ratio to form a powder mixture which upon sintering forms a ceramic sintered body comprising the cubic, yttrium aluminum garnet (YAG). High purity alumina media (≥99.9% as measured by ICPMS methods) was added at about 100% loading by powder weight, and ethanol was added in an amount of about 40% by combined weight of ethanol and powder to form a slurry. Ball milling using an axial rolling action about a horizontal axis at 150 rpm in a 1-liter container was performed for a duration of 20 hours and thereafter the ethanol was extracted from the powder mixture using rotary evaporation according to known methods. Upon calcination at 1050° C. for 6 hours in air, the calcined powder mixture was measured to have a specific surface area of from 2 to 3 m$^2$/g, a d10 particle size of from 1 to 4 μm, a d50 particle size of from 3.5 to 6.5 μm and a d90 particle size of from 75 to 95 μm. The powders, powder mixture and/or calcined powder mixture may be sieved using aperture sizes of from 45 to 400 um, calcined, blended and/or milled at various process steps according to methods known to those skilled in the art. Purity was measured using ICPMS methods as disclosed herein, and a total impurity content of the calcined powder mixture of about 5 ppm relative to a total mass of the oxides calculated from all constituents was measured, corresponding to a purity of 99.9995%. Purity limits and impurity contents for the starting powders of yttria and alumina, as well as the calcined powder mixtures as disclosed herein do not include Si. The detection limit using ICPMS methods to measure purity as disclosed herein for Si is about 14 ppm, thus the starting powders of yttria and alumina as well as the calcined powder mixtures may comprise Si in the form of silica at a detection level of about 14 ppm. The calcined powder mixture was disposed inside a volume defined by a tool set of a sintering apparatus as disclosed herein, and vacuum conditions of from $10^{-2}$ to $10^{-3}$ torr were created inside the volume. A pressure of 5 MPa was applied, and the calcined powder mixture inside the volume was heated from ambient temperature at about 10° C./minute to 800° C., and thereafter pressure was ramped at a rate of about 0.4 to about 0.6 MPa/minute and the temperature ramp was continued as previously disclosed to reach the sintering conditions of 1500° C. and 20 MPa for 30 minutes to form a polycrystalline YAG sintered ceramic body in a disc shape having 150 mm greatest dimension. Sample 512-1 was sintered according to the same conditions and thereafter annealed in air at 1400° C. for 8 hours in a furnace. Density measurements were performed in accordance with ASTM B962-17 on the as-sintered and the annealed sample. Densities of 4.547 g/cc and 4.542 g/cc were averaged across 5 measurements for the as sintered (512) and annealed (512-1) samples, respectively. This corresponds to 99.81% and 99.70% of the theoretical density for YAG and corresponding volumetric porosity of 0.19% and 0.30% respectively, as calculated from density measurements as disclosed herein. Tables 1, 8, 9 and 11 summarize results of the sintered ceramic body and calcined powder according to embodiments as disclosed herein. Measurements of crystalline phase purity of sample 512 were performed using a combination of XRD, SEM imaging and use of image processing software as disclosed herein. XRD was performed using a PANanlytical Aeris model XRD capable of crystalline phase identification to about +/−5% by volume, thus sample 512 was measured to comprise YAG to an upper limit of about 95% by volume using XRD. In order to determine the phase purity to greater accuracy, for example up to and including about 99.8%, SEM images were taken using backscatter detection (BSD) methods as known to those skilled in the art. Using BSD, the YAG phase appears gray, varying somewhat dependent upon grain orientation, the aluminum oxide phase appears black, the yttrium oxide phase appears white, and porosity, if present, also appears black. Images were taken at 5000× using BSD methods as known to those skilled in the art to identify the YAG, alumina and yttria phases, and any porosity present as depicted in FIG. 20a) for sample 512. In order to differentiate between black regions comprising alumina and those comprising porosity, the BSD image was black and white thresholded using ImageJ processing software to highlight regions which may comprise either porosity or alumina as depicted for the same region in FIG. 20b). ImageJ has been developed at the National Institute of Health (NIH), USA, and is a Java-based public domain image processing and analysis program for image processing of scientific multi-dimensional images. The BSD detector as used for measurements disclosed herein has further capability to measure topographic features, thereby highlighting any deviations in the surface topography, such as porosity. Using the topographic mode of the BSD detector, images were taken at 5000× across a surface of the same region of the ceramic sintered body of sample 512 of FIG. 20a) and the topographic images are shown in FIG. 21a). Regions comprising porosity were highlighted as illustrated in FIG. 21b) after thresholding in ImageJ. The area comprising porosity within the topographic image of FIG. 21b) was thereafter subtracted from the area comprising alumina and/or porosity in the BSD images of FIG. 20b), providing the % area, and thereby % by volume, comprising alumina in the sintered ceramic body corresponding to sample 512. The combination of these analytical tools and methods may provide for the determination of phase purity to about +/−0.1% by volume. Using the disclosed methods of Archimedes density measurements, XRD, SEM imaging and image analysis software, sample 512 may comprise about 0.2% by volume of the alumina phase, about 0.19% of volumetric porosity, and about 99.6% by volume of the YAG phase. Table 1 lists crystalline phase purity and volumetric porosities of the sintered ceramic bodies as disclosed herein. The sintered ceramic body according to sample 512 may comprise an integral body as made according to the process disclosed herein, and thus may comprise the YAG phase, an aluminum oxide phase and volumetric porosity distributed on a surface and throughout the body. In other words, a structure measured on a surface is representative of a structure within a volume of the bulk sintered ceramic body. Thus, sintered ceramic bodies comprising the YAG phase in amounts from 90 to 99.8%, preferably from 90 to 99.6%, preferably from 90 to 99.4%, preferably from 95 to 99.8% by volume, preferably from 95 to 99.6%, preferably from 95 to 99.4%, each by volume, may be formed using the materials and methods as disclosed herein. Accounting for measurement variance, sintered ceramic bodies comprising the YAG phase in amounts as specified herein may further comprise porosity in an amount by volume of from 0.1 to 0.3%, and aluminum oxide in an amount by volume of from 0.1 to 0.3%. FIGS. 26, 27 and Tables 3, 10, 11 and 13 disclose properties of the calcined powder mixture and sintered ceramic body.

Example Thirteen: (samples 272, 272-5, powder 20099); polycrystalline YAG sintered ceramic body; A powder of yttria (purity about 99.9984%, impurities about 16 ppm relative to total oxides) having a specific surface area of from 4.5 to 6 m²/g, a d10 particle size of from 2.0 to 3.5 μm, a d50 particle size of from 4.0 to 6.5 μm and a d90 particle size of from 6.5 to 10 μm, and a powder of alumina (purity about 99.9995%, impurities about 5 ppm relative to total oxides) having a specific surface area of from 6 to 8 m²/g, a d10 particle size of from 0.075 to 0.2 μm, a d50 particle size of from 2.5 to 5.5 μm and a d90 particle size of from 15 to 22 μm were combined in a molar ratio to form a powder mixture which upon sintering forms a ceramic sintered body comprising the cubic, yttrium aluminum garnet (YAG) phase. High purity alumina media (≥99.9% as measured by ICPMS) was added at about 60% loading relative to powder weight, and ethanol was added in an amount of about 35% by combined weight of ethanol and powder to form a slurry. A dispersant of polyvinyl pyrrolidone (PVP) was added at about 0.07% by weight relative to total slurry weight. Tumble or end-over-end mixing as known to those skilled in the art was performed for a duration of 12 hours and thereafter the ethanol was extracted from the powder mixture using rotary evaporation according to known methods. Upon calcination at 1000° C. for 10 hours in air, the calcined powder mixture was measured to have a specific surface area of from 4 to 5 m²/g. The powders, powder mixture and/or calcined powder mixture may be sieved using aperture sizes of from 45 to 400 um, calcined, blended and/or milled at various process steps according to methods known to those skilled in the art. Purity was measured using ICPMS methods as disclosed herein, and a total impurity content of the calcined powder mixture of about 5 ppm relative to a total mass of the oxides calculated from all constituents was measured, corresponding to a purity of about 99.9995%. Purity limits and impurity contents for the starting powders of yttria and alumina, as well as the calcined powder mixtures as disclosed herein do not include Si. The detection limit using ICPMS methods to measure purity as disclosed herein for Si is about 14 ppm, thus the starting powders of yttria and alumina as well as the calcined powder mixtures may comprise Si in the form of silica at a detection level of about 14 ppm. The calcined powder mixture was disposed inside a volume defined by a tool set of a sintering apparatus as disclosed herein, and vacuum conditions of from $10^{-2}$ to $10^{-3}$ torr were created inside the volume. A pressure of 5 MPa was applied, and the calcined powder mixture inside the volume was heated from ambient temperature at about 10° C./minute to 800° C., and thereafter pressure was ramped at a rate of about 0.4 to about 0.6 MPa/minute and the temperature ramp was continued as previous to reach the sintering conditions of 1450° C. and 20 MPa for 45 minutes to form a polycrystalline YAG sintered ceramic body in a disc shape having 150 mm greatest dimension. Sample 272-5 was sintered under the same conditions and thereafter annealed in air at 1550° C. for 8 hours in a furnace. Density measurements were performed in accordance with ASTM B962-17 on the as-sintered and the annealed sample. Densities of 4.549 g/cc and 4.433 g/cc were averaged across 5 measurements for the as sintered (272) and annealed (272-5) samples. This corresponds to 99.854% and 97.300%, respectively, of the theoretical density for YAG (reported herein as 4.556 g/cc) and corresponding volumetric porosity of 0.146% and 2.70% respectively, as calculated from density measurements. The visually apparent color of the sintered ceramic bodies in accordance with this example may be affected by volumetric porosity and pore size distribution which may result from differences in annealing. The presence of porosity contributes to light scattering in accordance with the Mie scattering theory as known to those skilled in the art. The high density, unannealed sample 272 appears gray in color which may be due to lower volumetric porosity levels, and thereby less scattering of light. By comparison, annealed sample 272-5, which has higher volumetric porosity levels, resulted in greater scattering of incident light and upon visual inspection appears white in color.

The sintered ceramic body according to sample 272 and 272-5 may comprise an integral body as made according to the process disclosed herein, and thus may comprise YAG, an aluminum oxide phase and volumetric porosity distributed on a surface and throughout the body. In other words, a structure measured on a surface is representative of a structure within a volume of the bulk sintered ceramic body comprising YAG and in embodiments further comprising aluminum oxide. Sample 272, formed in accordance with this example, may comprise aluminum oxide in an amount of about 0.3% by volume, volumetric porosity in an amount of about 0.15% by volume, and the YAG phase in an amount of about 99.55% by volume. Sample 272-5, formed in accordance with this example, may comprise aluminum oxide in an amount of about 0.3% by volume, volumetric porosity in an amount of about 2.70% by volume, and the YAG phase in an amount of about 97.00% by volume.

Tables 3, 10, 11 and 13 summarize results of the sintered ceramic body and calcined powder.

Example Fourteen: (Sample 432, Powder 398-2) Polycrystalline YAG Sintered Ceramic Body A powder of yttria (average purity of 99.9980%, average impurities of about 21 ppm) having a specific surface area of 2 to 3 m²/g, a d10 particle size of from 2.5 to 4.5 μm, a d50 particle size of from 6 to 8 μm and a d90 particle size of from 11 to 13 μm, and a powder of alumina (purity 99.9994%, impurities about 6 ppm) having a specific surface area of from 6.5 to 8.5 m²/g, a d10 particle size of from 0.1 to 0.2 μm, a d50 particle size of from 1 to 3 μm and a d90 particle size of from 13 to 20 μm were combined in a molar ratio to form a sintered ceramic body comprising the yttrium aluminum garnet (YAG) phase upon sintering. High purity alumina media (≥99.9% as measured by ICPMS) was added in an amount of about 60% loading by powder weight, and ethanol was added in an amount of about 35% by combined weight of ethanol and powder to form a slurry. Axially rotating ball milling as known to those skilled in the art was performed for a duration of about 20 hours and thereafter the ethanol was extracted from the powder mixture using rotary evaporation for about 3 hours at temperatures of from 60 to 75° C. according to known methods. Upon calcination at 950° C. for 4 hours in air, the calcined powder mixture was sieved and measured to have a specific surface area of from 5 to 7 m²/g. X ray diffraction confirmed yttria and alumina phases present in the calcined powder mixture. The powders, powder mixture and/or calcined powder mixture may be sieved, calcined, tumbled, blended and/or milled at various process steps according to known methods. The calcined powder mixture was disposed inside a volume defined by a tool set of a sintering apparatus as disclosed herein, and vacuum conditions of from $10^{-2}$ to $10^{-3}$ torr were created inside the volume. The calcined powder mixture inside the volume was heated at about 3° C./minute to 800° C., at which temperature a pressure of 5 MPa was applied, then simultaneously heat was applied at a rate of from 1 to 3° C./minute and pressure was applied at a rate of from about 0.2 to about 0.3 MPa/min to reach the sintering conditions of 1500° C. and 20 MPa for 30 minutes to form a polycrystalline YAG sintered ceramic body in a disc shape having 150 mm greatest dimension.

Area based porosity and pore size measurements were performed on sample 432 using SEM imaging combined with ImageJ software for image processing. SEM images were taken using backscatter detection (BSD) methods as known to those skilled in the art. Using BSD, the YAG phase appears gray, varying somewhat dependent upon grain orientation, the yttrium oxide phase appears white, and porosity, if present, appears black. The sintered ceramic body as disclosed herein in accordance with sample 432 may be an integral body comprising the YAG crystalline phase and further comprising porosity and/or pores both on a surface and throughout. Thus, features such as crystalline phases, pore size and frequency, and porosity/pore area as measured on a surface is representative of features within the bulk sintered ceramic body. The BSD image was black and white thresholded using ImageJ processing software to highlight black regions in the BSD image which may comprise porosity. ImageJ has been developed at the National Institute of Health (NIH), USA, and is a Java-based public domain image processing and analysis program for image processing of scientific multi-dimensional images. The surface area comprising porosity was calculated using ImageJ software. FIGS. 22a) and b) illustrate area-based pore/porosity measurements for a surface of the sintered ceramic body of sample 432. FIG. 22a) depicts the percent of surface area comprising pores or porosity (pore area) for each of 7 SEM images taken from the sample surface on the vertical axis and a horizontal axis representing the corresponding pore size in microns contributing to a given % pore area. Pore size and total pore area were measured across 7 SEM images using ImageJ software methods as disclosed herein. Images were taken at 5000×, each of total area about 53.7 um×53.7 um corresponding to a single image measurement area of about 2885 um². The total pore area was used with the single image measurement area to arrive at the % pore area. An area within any one of the 7 images comprised porosity by a percent of total surface area of from about 0.0005 to about 0.012%, preferably from about 0.0005 to about 0.011%, preferably from about 0.0005 to about 0.0105%.

FIG. 22b) illustrates the cumulative fractional area comprising porosity (cumulative pore area) in um²/mm² as normalized across each of the 7 total image areas of FIG. 22a) on a logarithmic scale with the respective pore size on the horizontal axis. Sample 432, comprising YAG, may comprise a cumulative pore area fraction of from about 2 to about 800 um²/mm², preferably from about 2 to about 600 um²/mm², preferably from about 2 to about 400 um²/mm², preferably from about 2 to about 300 um²/mm². No pores of pore size larger than about 0.6 um were measured across the 7 images analyzed within the YAG sintered ceramic body of sample 432. Thus, the YAG sintered ceramic bodies as disclosed herein may comprise pores wherein the pores may have a pore size of 1 um and less across a surface and throughout.

FIG. 23*a*) illustrates an SEM micrograph of a sintered ceramic body comprising YAG after a thermal etching process, performed as known in the art, illustrating few pores of small dimension on a surface, and thereby within the sintered body. The YAG sintered ceramic body as disclosed herein may comprise pores wherein the pores may have a size on the order of 5 um and less, down to sub-micron scale pore sizes of as low as about 0.1 um. A surface of the sintered ceramic body as depicted in FIG. 23*a*) comprised about 20 pores across a surface area of about 2884 um². According to embodiments as disclosed herein, the sintered ceramic body comprising YAG may comprise pores wherein the pores may have a maximum size of from 0.1 to 5 um, preferably from 0.1 to 4 um, preferably from 0.1 to 3 um, preferably from 0.1 to 2 um, preferably from 0.1 to 1 um, preferably from 0.1 to 0.6 um. According to further embodiments as disclosed herein, the sintered ceramic body comprising YAG may comprise pores wherein the pores may have a frequency of about 20 pores, preferably from 3 to 25 pores, preferably from 3 to 20 pores, preferably from 3 to 15 pores, preferably from 5 to 25 pores, preferably from 5 to 20 pores, preferably from 5 to 15 pores, preferably from 5 to 10 pores, across a surface of about 2885 um².

Figure 22:
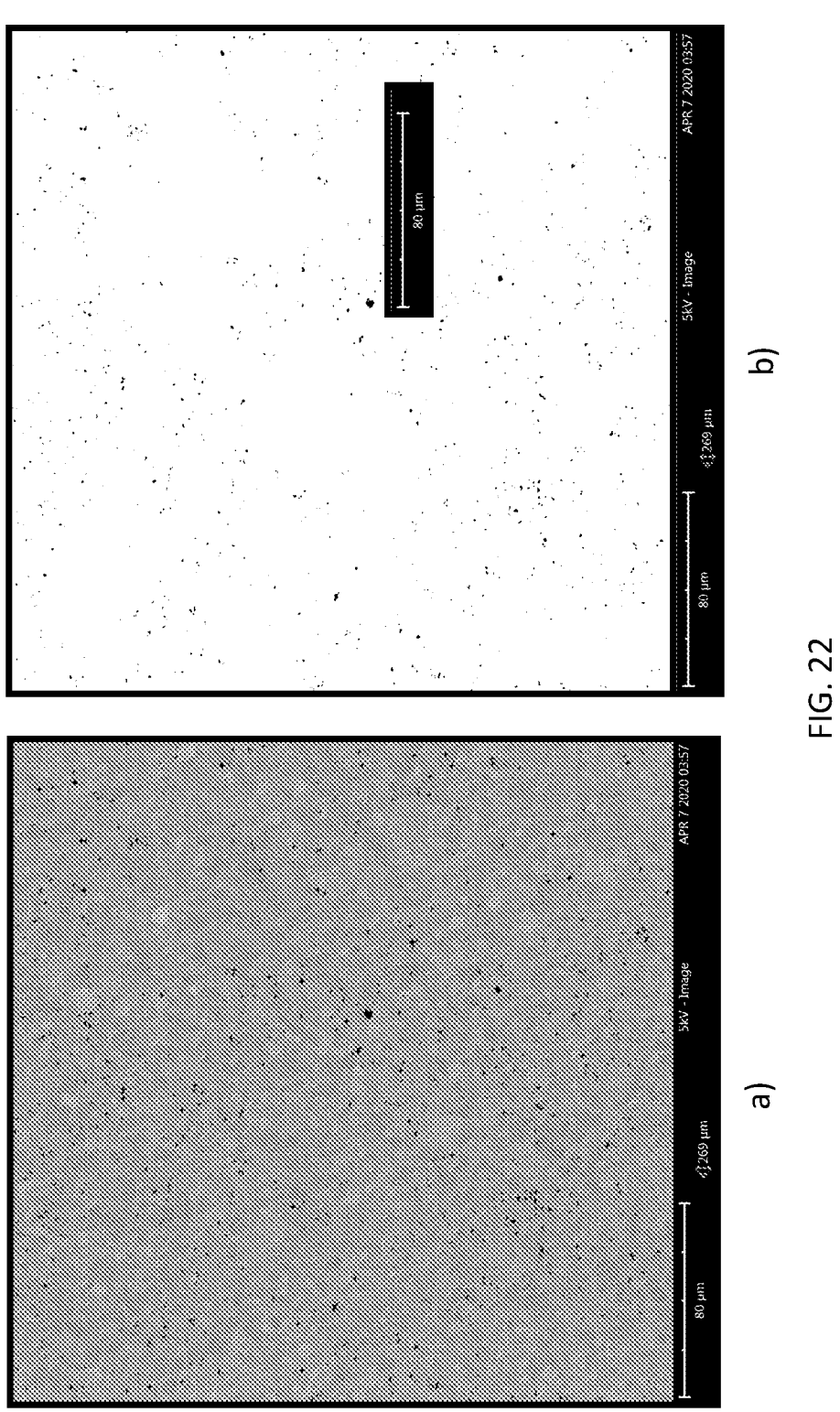
FIG. 22a) depicts an exemplary sintered ceramic body having excess alumina from sample 153 at 1000× comprising highly phase pure YAG; and b) results from thresholding of the SEM image using ImageJ software of a) illustrating YAG in an amount of 99.6% by volume with about 0.4% of the aluminum oxide phase and porosity, according to an embodiment as disclosed herein.

FIG. 23*b*) depicts a summation of total % area comprising porosity for each of the 7 SEM micrographs of FIG. 22 for sample 432. Across all images, the % of total porosity was from 0.001 to 0.03%, preferably from 0.001 to 0.025%, preferably from 0.001 to 0.02%, preferably from 0.001 to 0.015%, preferably from 0.001 to 0.010%. Thus, across a surface area of about 54 um×54 um, the sintered ceramic bodies as disclosed herein may have a surface comprising porosity in very low (<1% by area) percentages, thus providing a corrosion and erosion resistant surface, and thereby volume, of the sintered ceramic body for use in plasma processing chambers.

Surface roughness measurements of Sa, Sz, and Sdr were performed on sample 432 in accordance with ISO standard 25178-2-2012 from sections section 4.1.7, arithmetical mean height Sa, section 4.1.6, maximum height Sz, and section 4.3.2, developed interfacial area ratio, Sdr. Surface roughness measurements were performed using a Keyence 3D laser scanning confocal digital microscope model VK-X250X under ambient conditions in a class 1 cleanroom. The microscope rests on a TMC tabletop CSP passive benchtop isolator with 2.8 Hz Natural Frequency. This non-contact system uses laser beam light and optical sensors to analyse the surface through reflected light intensity. The microscope acquires 1,024 data points in the x direction and 786 data points in the y direction for a total of 786,432 data points. Upon completion of a given scan, the objective moves by the pitch set in the z direction and the intensity is compared between scans to determine the focus.

An Sa of from 2 to 15 nm, preferably from 2 to 10 nm, preferably from 2 to 8 nm, preferably from 2 to 5 nm, preferably an average Sa of 3 nm was measured across a polished surface in accordance with the methods as disclosed herein.

An Sz of from 0.3 to 5 um, preferably from 0.3 to 4 um, preferably from 0.3 to 3 um, preferably from 0.3 to 2 um, preferably from 0.3 to 1 um, preferably from 0.3 to 0.5 um, preferably an average Sz of 0.4 um, was measured across a polished surface in accordance with the methods as disclosed herein.

An Sdr of preferably from 15 to 400×10⁻⁵, preferably from 15 to 200×10⁻⁵, preferably from 15 to 100×10⁻⁵, preferably from 25 to 200×10⁻⁵, preferably from 25 to 100×10⁻⁵, preferably from 25 to 50×10⁻⁵, was measured across a polished surface in accordance with the methods as disclosed herein. Tables 10, 11, 13 and 16 list methods of fabrication and properties in accordance with Sample 432.

Example Fifteen: (Samples 298, 617, Powders 286, 615); Polycrystalline YAG Sintered Ceramic Bodies Comprising Zirconia In embodiments, it may be preferable for the sintered ceramic body to comprise zirconia in amounts of from about 20 to 100 ppm. The presence of zirconia may provide small grain size and microstructural uniformity in sintered ceramic bodies formed therefrom. Zirconia may be intentionally added during powder batching or may result from the use of zirconia media during powder mixing.

When included as part of the powder batching process, zirconia may be added for example as the oxide, chloride, nitrate or carbonate powder form, whereby these compounds may dissociate during slurry formation, which may provide a uniform dispersion of zirconia in the calcined powder mixture and sintered ceramic bodies formed therefrom.

In a first embodiment, zirconia was added in the form of zirconyl chloride in an amount of about 50 ppm relative to the total mass of the oxides calculated from the contents of all constituents to form powder 286. A powder of yttria (purity about 99.9983%, impurities about 17 ppm relative to total mass of the oxides calculated from the contents of all constituents) having a specific surface area of from 2.0 to 3.0 m²/g, a d10 particle size of from 2.5 to 4.5 μm, a d50 particle size of from 6.0 to 9.0 μm and a d90 particle size of from 10.5 to 18 μm, and a powder of alumina (purity about 99.9994%, impurities about 6 ppm relative to total mass of the oxides calculated from the contents of all constituents) having a specific surface area of from 6 to 8 m²/g, a d10 particle size of from 0.075 to 0.3 μm, a d50 particle size of from 2.5 to 5.5 μm and a d90 particle size of from 35 to 42 μm were combined in a molar ratio to form powder mixture 286 which upon sintering forms a ceramic sintered body comprising the cubic, yttrium aluminum garnet (YAG) phase, further comprising zirconia. High purity alumina media (≥99.9% as measured by ICPMS) was added at about 60% loading relative to powder weight, and ethanol was added in an amount of about 35% by combined weight of ethanol and powder to form a slurry. Tumble or end-over-end mixing as known to those skilled in the art was performed for a duration of 20 hours and thereafter the ethanol was extracted from the powder mixture using rotary evaporation according to known methods. Upon calcination at 850° C. for 12 hours in air, the calcined powder mixture was measured to have a specific surface area of from 2.5 to 4.5 m²/g, a d10 particle size of from 0.5 to 0.45 μm, a d50 particle size of from 4.5 to 7.0 μm and a d90 particle size of from 17 to 24 μm. The calcined powder mixture comprised yttria and alumina phases. The powders, powder mixture and/or calcined powder mixture may be sieved using aperture sizes of from 45 to 400 um, calcined, blended and/or milled at various process steps according to methods known to those skilled in the art. Zirconium oxide is an inorganic sintering aid and thus will remain at the same levels in the calcined powder mixture and sintered ceramic body as was added to the starting powders. As such, powder 286, in addition to zirconia as a sintering aid in an amount of about 50 ppm, comprised about 3 ppm impurities relative to the total mass of the oxides calculated from the contents of all constituents. The calcined powder mixture 286 was disposed inside a volume defined by a tool set of a sintering apparatus as disclosed herein, and vacuum conditions of from $10^{-2}$ to $10^{-3}$ torr were created inside the volume. A pressure of 5 MPa was applied, and the calcined powder mixture inside the volume was heated from ambient temperature at about 10° C./minute to 800° C., and thereafter pressure was ramped at a rate of about 0.4 to about 0.6 MPa/minute and the temperature ramp was continued as previous to reach the sintering conditions of 1450° C. and 20 MPa for 30 minutes to form sample 298, a polycrystalline YAG sintered ceramic body in a disc shape having 100 mm greatest dimension. Samples 298-1 and 298-2 were sintered under the same conditions and thereafter annealed in air at 1400° C. and 1550° C. for 8 hours, respectively, in a furnace.

Density measurements were performed in accordance with ASTM B962-17 on the as-sintered and the annealed samples. Densities of 4.540 g/cc, 4.525 and 4.379 g/cc were averaged across 5 measurements for the as sintered (298), 298-1 and 298-2 annealed samples, respectively. This corresponds to 99.65%, 99.33 and 96.15%, respectively, of the theoretical density for YAG (reported herein as 4.556 g/cc) and corresponding volumetric porosity of 0.35%, 0.67 and 3.85% respectively, as calculated from density measurements. The visually apparent reddish gray color of the sintered ceramic body of sample 298 in accordance with this example may be affected by volumetric porosity, presence of zirconia and pore size distribution which may result from differences in annealing. The presence of porosity contributes to light scattering in accordance with the Mie scattering theory as known to those skilled in the art. Sample 298-1 also appears reddish gray in color both on a surface and throughout, which may be due to lower volumetric porosity levels, and thereby less scattering of light. By comparison, annealed sample 298-2, which has higher volumetric porosity levels, resulted in greater scattering of incident light and upon visual inspection appears white in color both on a surface and throughout. X ray diffraction revealed the presence of the YAG phase in an amount of about 99% by volume for all samples.

Wear and abrasion of zirconia media used during mixing may also result in zirconia present in the sintered ceramic body in varying amounts, dependent upon mixing/milling parameters of media loading, type of media and duration of mixing.

A powder of yttria (average purity about 99.9988%, average impurities about 12 ppm relative to total mass of the oxides calculated from the contents of all constituents) having a specific surface area of from 6.5 to 8.0 m²/g, a d10 particle size of from 1.5 to 3.5 μm, a d50 particle size of from 3.5 to 5.5 μm and a d90 particle size of from 6.5 to 8.5 μm, and a powder of alumina (purity about 99.9985%, impurities about 15 ppm relative to total mass of the oxides calculated from the contents of all constituents) having a specific surface area of from 17 to 18 m²/g, a d10 particle size of from 0.08 to 0.3 μm, a d50 particle size of from 1.0 to 3.0 μm and a d90 particle size of from 4.5 to 7 μm were combined in a molar ratio to form powder mixture 615 which upon sintering formed sample 617, a ceramic sintered body comprising the cubic, yttrium aluminum garnet (YAG) phase further comprising zirconia to the extent it remains in the sintered body.

Zirconia media was added at 100% loading by mass relative to total powder mass, and ethanol was added in an amount of about 40% by combined weight of ethanol and powder to form a slurry. Axially rotating wet ball milling as known to those skilled in the art was performed for a duration of 12 hours at an RPM of about 150 and thereafter the ethanol was extracted from the powder mixture using rotary evaporation according to known methods. Upon calcination at 1100° C. for 8 hours in air, the calcined powder mixture was measured to have a specific surface area of from 3.5 to 5.0 m²/g, a d10 particle size of from 0.5 to 0.85 μm, a d50 particle size of from 35 to 45 μm and a d90 particle size of from about 270 to 290 μm. ICPMS was used to measure powder impurities and about 73 ppm, including about 54 ppm of zirconia was measured. In certain embodiments, the calcination conditions as disclosed herein may result in agglomeration of the powder mixture and thus greater variability in particle size distributions may result. Thus, in embodiments, the particle size as referred to herein may include a single particle and in other embodiments, the particle size as referred to herein may include an agglomerate comprising more than one particle or an agglomeration of multiple particles which may be measured, using the laser particle size detection methods as disclosed herein, as a single, large particle. The powders, powder mixture and/or calcined powder mixture may be sieved using aperture sizes of from 45 to 400 um, calcined, blended and/or milled at various process steps according to methods known to those skilled in the art.

The calcined powder mixture 615 was disposed inside a volume defined by a tool set of a sintering apparatus as disclosed herein, and vacuum conditions of from $10^{-2}$ to $10^{-3}$ torr were created inside the volume. A pressure of 5 MPa was applied, and the calcined powder mixture inside the volume was heated from ambient temperature at about 10° C./minute to 800° C., and thereafter pressure was ramped at a rate of about 0.4 to about 0.6 MPa/minute and the temperature ramp was continued as previous to reach the sintering conditions of 1450° C. and 30 MPa for 30 minutes to form sample 617, a polycrystalline YAG sintered ceramic body in a disc shape having 100 mm greatest dimension.

Zirconium oxide is an inorganic, compound oxide and thus will remain at the same levels in the calcined powder mixture and within the sintered ceramic body. Powder 615 comprised about 73 ppm of impurities total, including about 54 ppm zirconia as measured using ICPMS methods, thus sintered ceramic body 617 comprises zirconia levels which are about the same as that of the powder. The sintered ceramic body was measured to be about 99% of theoretical density for YAG and comprising greater than 99% by volume of the YAG phase.

Purity limits and impurity contents for the starting powders of yttria and alumina, as well as the calcined powder mixtures as disclosed herein do not include Si. The detection limit using ICPMS methods to measure purity as disclosed herein for Si is about 14 ppm, thus the starting powders of yttria and alumina as well as the calcined powder mixtures may comprise Si in the form of silica at a detection level of about 14 ppm.

The sintered ceramic bodies according to this example may comprise an integral body as made according to the process disclosed herein, and thus may comprise YAG, zirconium oxide and volumetric porosity distributed on a surface and throughout the body. In other words, a structure measured on a surface is representative of a structure within a volume of the bulk sintered ceramic body comprising YAG and in embodiments further comprising zirconium oxide and volumetric porosity.

Tables 3, 10, 11 and 13 summarize results of the sintered ceramic bodies and calcined powders.

Example Sixteen: (Sample 151 & 151-1, Powder 145); Polycrystalline Sintered Ceramic Body Comprising YAG A powder of yttria (average purity 99.9985%, average impurities of about 15 ppm) having a specific surface area of 4 to 6 m²/g, a d10 particle size of from 1.5 to 3.5 μm, a d50 particle size of from 3.5 to 5.5 μm and a d90 particle size of from 6.5 to 8.5 μm, and a powder of alumina (average purity 99.9989%, average impurities about 12 ppm) having a specific surface area of from 6.5 to 8.5 m²/g, a d10 particle size of from 0.05 to 0.15 μm, a d50 particle size of from 0.15 to 0.35 μm and a d90 particle size of from 0.35 to 1 μm were combined in a molar ratio to form a powder mixture which upon sintering forms a sintered ceramic body comprising the yttrium aluminum garnet (YAG) phase. A difference in the d10 and d90 particle sizes of the alumina powder was measured from not less than about 0.2 um and not greater than about 0.95 um. The powder mixture was dry mixed by roller blending without the use of media for about 8 hours. Thereafter, calcination was performed at 800° C. for 4 hours in air, and jet milling as known to those skilled in the art was performed at a pressure of 100 psi. The calcined and milled powder mixture was measured to have a specific surface area of from 6.2 to 8.2 m²/g, a d10 particle size of from 0.07 to 0.3 μm, a d50 particle size of from 0.7 to 1.5 μm and a d90 particle size of from 18 to 32 μm. A difference in the d10 and d90 particle sizes of the calcined powder mixture was measured from not less than about 1 um and not greater than about 35 um. The purity of the calcined powder mixture was analyzed using ICPMS methods as disclosed herein, and the purity was measured to be about the same as that disclosed for the starting powders. The detection limit using ICPMS methods as disclosed herein for Si in the form of $SiO_2$ is about 14 ppm, thus the starting powders of yttria and alumina, as well as the calcined powder mixture may comprise Si in the form of silica at a detection level of 14 ppm, although silica was not detected using ICPMS in the starting powders and calcined powder mixture. Table 11 lists calcination conditions, calcined powder phases and powder purity. The powders, powder mixture and/or calcined powder mixture may be sieved, tumbled, blended and/or milled at various process steps according to known methods. The calcined powder mixture was disposed inside a volume defined by a tool set of a sintering apparatus as disclosed herein, and vacuum conditions of from $10^{-2}$ to $10^{-3}$ torr were created inside the volume. A pressure of 5 MPa was applied, and the calcined powder mixture inside the volume was heated from ambient temperature at about 10° C./minute to 800° C., and thereafter pressure was ramped at a rate of 0.5 MPa/minute to reach the sintering conditions of 1550° C. and 20 MPa for 30 minutes to form a polycrystalline YAG sintered ceramic body in a disc shape having 150 mm greatest dimension. Sample 151-1 was sintered at the same conditions and thereafter annealed in air at 1400° C. for 8 hours. Microstructural observation using SEM revealed the presence of a yttria-rich, higher density phase of YAP in an amount estimated at about 5% by volume, thus increasing overall density results. Archimedes density measurements were performed in accordance with ASTM B962-17 across 5 repetitions as known to those skilled in the art. Samples 151 and 151-1 had densities of 4.579 g/cc and 4/565 g/cc, corresponding to about 99.64% and 99.33% of theoretical, accounting for about 5% by volume of higher density YAP phase. Volumetric porosity may be calculated from Archimedes density measurements according to methods as known to those skilled in the art, and about 0.36% and about 0.67% of volumetric porosity was calculated for samples 151 and 151-1, respectively. Thus, disclosed herein is a sintered ceramic body having a theoretical density relative to YAG and 5% by volume YAP of from about 99.3 to 99.6%. Tables 3, 10, 11 and 13 summarize results of the sintered ceramic body and calcined powder.

Miscellaneous Examples

Figure 13:
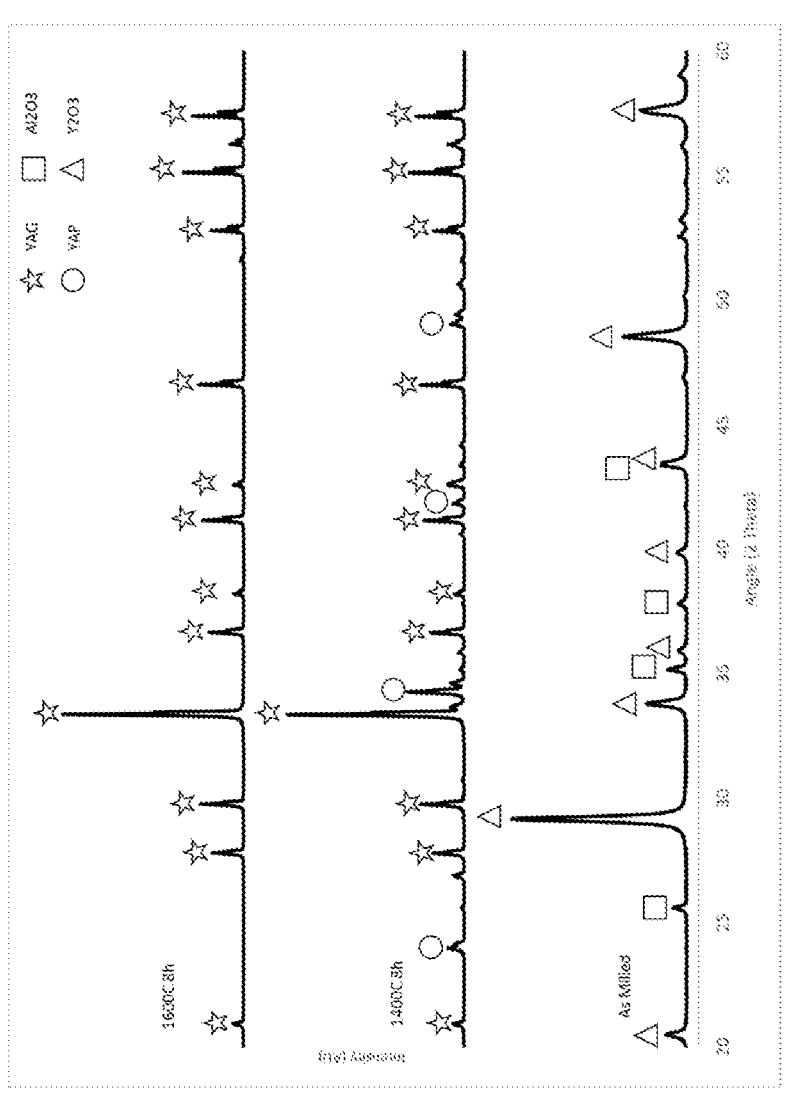
FIG. 13 depicts x ray diffraction results of a powder mixture of yttrium oxide and aluminum oxide prior to sintering (as milled xrd pattern), and sintered samples prepared therefrom using pressureless sintering methods sintered at 1400° C. and 1600° C. for 8 hours.

FIG. 13 depicts x ray diffraction results for a starting yttria/alumina powder mixture and ceramic sintered bodies formed using pressureless sintering methods to comparatively illustrate differences between pressureless sintering and the pressure and current assisted SPS sintering methods as disclosed herein. The "as milled" x ray diffraction pattern corresponds to the starting powder mixture comprising yttria and alumina. As illustrated, a mixed phase sintered body comprising YAP and YAG results from pressureless sintering at 1400° C. for 8 hours. In order to obtain phase-pure yttrium aluminum garnet (YAG) phase, pressureless sintering temperatures of 1600° C. and higher, combined with sintering durations of 8 hours or more are required. Geometric densities were measured for this sample and found to be about 55% of the theoretical density of YAG as disclosed herein. Use of pressureless sintering methods at elevated temperatures for long (8 hours and more) durations as known in the art results in densities that may not impart sufficient mechanical properties such as strength and hardness to enable the sintered bodies useful as components in semiconductor etch and deposition chambers. As such, a pressure and current assisted sintering method such as depicted in FIG. 14 and disclosed herein is required in order to form phase pure, high (>97%) density/low volumetric porosity (<3%) ceramic sintered bodies comprising YAG.

Figure 14:
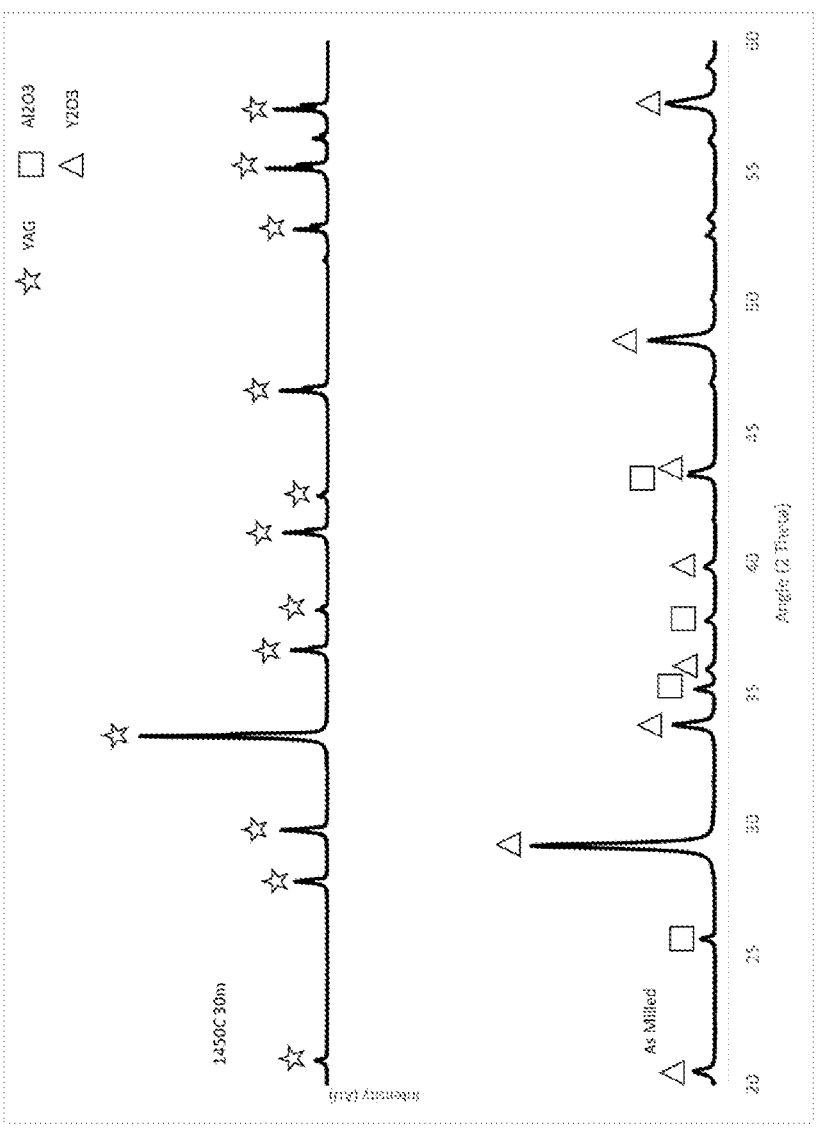
FIG. 14 depicts x ray diffraction results of an as prepared yttria/alumina crystalline powder mixture prior to sintering, and a corresponding sintered ceramic body comprising a single crystalline phase of at least 95% YAG using pressure and current assisted sintering, according to embodiments as disclosed herein.

FIG. 14 depicts x ray diffraction results illustrating formation of a sintered ceramic body comprising at least 95% by volume of yttrium aluminum garnet (YAG) phase from yttria and alumina powders using pressure and current assisted sintering conditions of 1450° C. for 30 minutes at 30 MPa under vacuum in accordance with the method disclosed herein. The sintering method as disclosed herein provides a sintered ceramic body comprising at least 95% by volume of YAG as confirmed by XRD at lower temperatures and shorter durations as compared to traditional sintering methods.

FIG. 16 depicts powder mixtures using a) wet mixing and b) dry mixing methods prior to calcination, according to embodiments of the disclosure. In both powder mixtures, mixing conditions as disclosed herein provide a finely mixed, uniform mixture of the yttria (white particles) and alumina (gray/black particles) powders.

Figure 17:
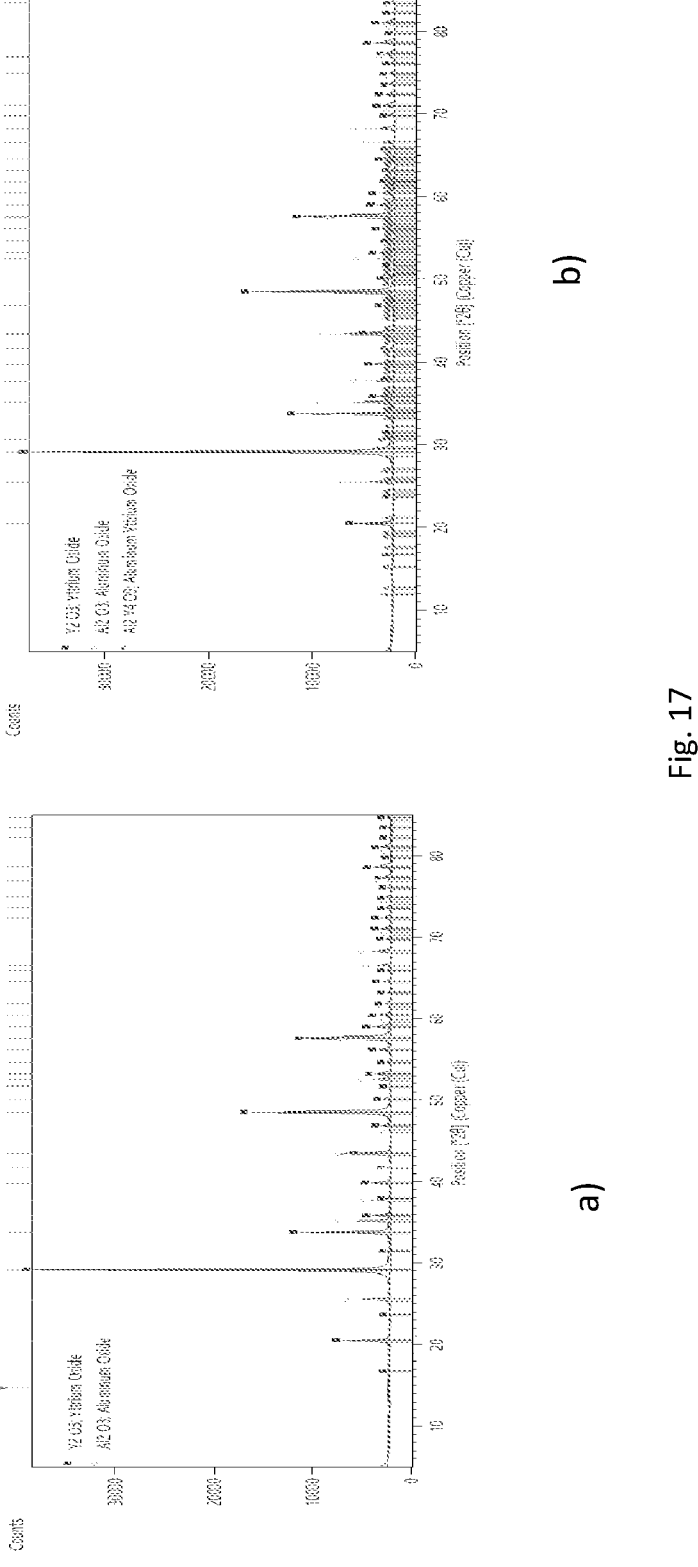
FIG. 17 shows x-ray diffraction results for calcined powder mixtures as disclosed herein.

FIG. 17 illustrates x ray diffraction results for calcined powder mixtures calcined at a) 950° C. for 8 hours (powder 008) and b) 1000° C. for 10 hours in air (powder 194-2). With respect to calcined powder mixture 008 depicted in FIG. 17a), the crystalline phases from the starting powders of yttria and alumina are present after calcination, and the powder has a specific surface area of 2.5 to 3.5 m²/g. For calcined powder mixture 194-2 depicted in FIG. 17b), the crystalline phases from the starting powders of yttria and alumina are present, and a crystalline phase of YAM was further detected. The powder had a specific surface area of 4 to 5 m²/g.

FIG. 22a) depicts SEM results at 1000× for sample 153 having 150 mm diameter, comprising YAG which was prepared to have excess alumina, the sample having an average Archimedes density of 4.541 g/cc or 99.674% of theoretical for YAG, and volumetric porosity of about 0.33%. All SEM images as disclosed herein were obtained from a Nano Science Instruments scanning electron microscope (SEM) model Phenom XL equipped with an energy-dispersive spectroscopy (EDS) and a backscatter electron (BSD) detector which also has a topographic mode. SEM images combined with ImageJ image processing as disclosed herein may allow for phase identification up to about +/−0.1% by area of the sintered ceramic body as disclosed herein. The sintered ceramic body comprising YAG made according to the process disclosed herein is an integral body. As such, phase purity and other features measured on a surface may be representative of phase purity and other features within the bulk, or volume of, the sintered ceramic body. In alternate embodiments, the sintered ceramic body disclosed herein comprising YAG may have an excess aluminum oxide phase up to and including 3% by volume, and as such, an aluminum oxide phase measured on a surface may be representative of an aluminum oxide phase present within the bulk sintered ceramic body comprising YAG and excess alumina. In other words, features such as porosity, grain size, amounts of crystalline phases as measured on a surface may be representative of these features within the bulk yttrium aluminum oxide body to within about +/−0.10% by volume.

Scanning electron microscopy (SEM) images for sample 153 were imported into ImageJ Software for phase analysis using black and white thresholding techniques as depicted in FIG. 22b). Using SEM images combined with ImageJ processing software, SEM images of sample 153, a sintered ceramic body comprising yttrium aluminum garnet (YAG) having excess aluminum oxide was analyzed for phase purity. FIG. 22b) depicts the same region within the sintered ceramic body as FIG. 22a) after ImageJ analysis, whereby regions of the aluminum oxide phase and any porosity present may be shown in black from EDS/EDX analysis. As illustrated in FIG. 22b), the area of regions depicted in black, representing aluminum oxide and/or porosity, comprise about 0.40% of the image area and may have a diameter of from about 1 to 10 um, preferably from about 1 to 5 um, more preferably from about 1 to 3 um as compared to the reference scale in FIG. 22b). The starting powders of yttria and alumina, and the calcined powder mixtures may be mixed/blended/sieved prior to sintering, thus the sintered ceramic body as disclosed herein may be uniform throughout and thereby may have features measured on the surface which are indicative of the bulk or volume of the sintered body. Results from image analysis of FIG. 22b) verify that the sintered ceramic body comprises about 99.6% YAG phase by volume, about 0.3% volumetric porosity as calculated from Archimedes methods, and an excess alumina phase (black regions) of about 0.1% by volume.

Figure 23:
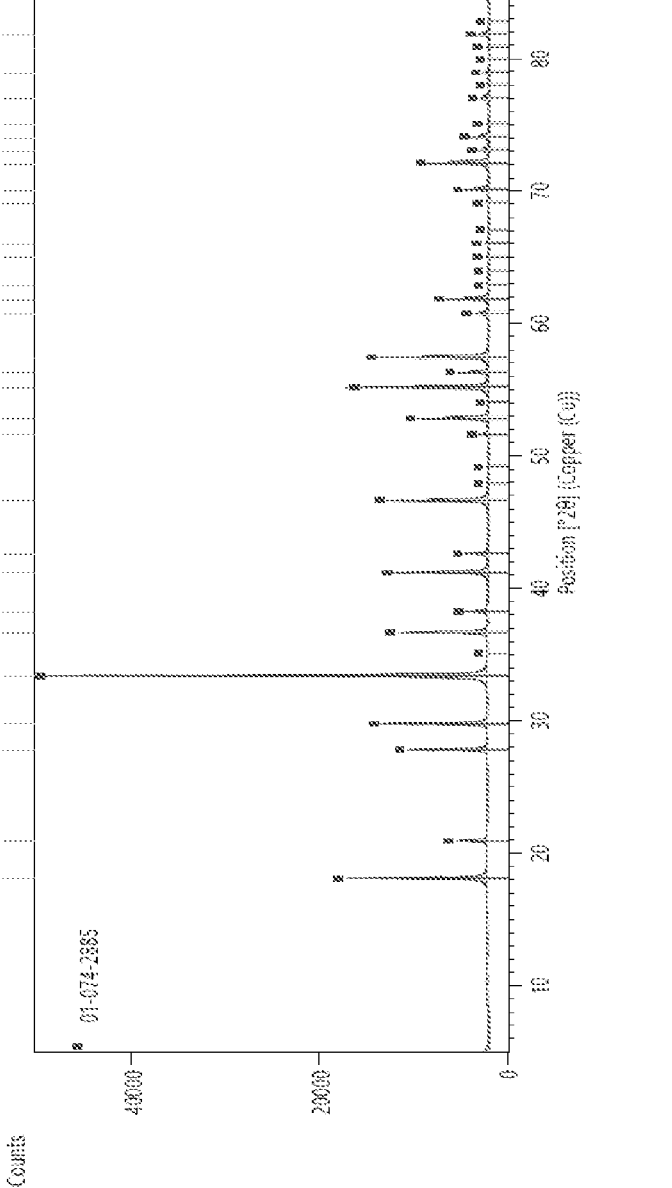
FIG. 23 shows corresponding x ray diffraction results for the sintered ceramic body of FIG. 16.

FIG. 23 illustrates x ray diffraction results for the sintered ceramic body of FIGS. 22a) and b) confirming formation of a sintered ceramic body having the YAG phase in an amount up to and including 99.6% using XRD and SEM/ImageJ processing combined. The aluminum oxide phase was confirmed via SEM and image analysis at 5000× as described in FIG. 16. Table 13 lists the processing conditions for formation of sample 153.

FIGS. 24a) and b) depict SEM micrographs at 1000× and 5000× respectively, corresponding to sample 258 as listed in Tables 13 and 15, also in accordance with Example 8. A highly dense microstructure is illustrated, having minimal volumetric porosity and comprising 99% by volume and greater of the YAG phase.

FIG. 25a) depicts an SEM micrograph at 5000× of a highly dense microstructure of sample 506 in accordance with example eleven which details methods for fabrication. About 0.3% by volume of alumina was found to be present in the sample, thus black regions as depicted in the left half of the image comprise aluminum oxide. The 5000×SEM image of FIG. 25a) was analyzed for grain size measurements using the Heyn Line Intercept Method as known to those skilled in the art, and an average grain size of 6.2 um with a standard deviation of 0.71 um was measured across 25 repetitions. A maximum and minimum grain size of 7.7 um and 5.0 um respectively, were also measured as listed in Table 3. Hardness measurements were performed in accordance with ASTM Standard C1327, and an average hardness of about 14.8 GPa was measured, wherein the average hardness is calculated from 8 measurements or repetitions across a sample surface, with maximum and minimum hardness values of 16 and 12.7 GPa respectively, using an applied load of 0.025 kgf.

Measurements of crystalline phase purity of sample 506 were performed using a combination of XRD, SEM imaging and use of image processing software in accordance with the methods as disclosed in Example 11. XRD confirmed sample 506 comprised YAG in an amount of at least 95% by volume. The combination of XRD, SEM and image processing software may provide for the determination of phase purity to about +/−0.10% by volume. Using the disclosed methods of Archimedes density measurements, XRD, SEM imaging and image analysis software, sample 506 comprised about 0.3% by volume of the alumina phase, about 0.2% of volumetric porosity, and about 99.5% by volume of the YAG phase. Using SEM and ImageJ processing, a minimum pore size of 0.1 um may be measured. For the sintered ceramic body disclosed herein, a maximum pore size of 1.7 um was measured using SEM imaging and the ImageJ processing methods as disclosed. Thus, according to embodiments as disclosed herein, the sintered ceramic body comprising YAG may comprise pores wherein the pores may have a maximum size of from 0.1 to 5 um, preferably from 0.1 to 4 um, preferably from 0.1 to 3 um, preferably from 0.1 to 2 um, preferably from 0.1 to 1.7 um.

The sintered ceramic body according to sample 506 may comprise an integral body as made according to the process disclosed herein, and thus may comprise the YAG phase, an aluminum oxide phase and volumetric porosity distributed on a surface and throughout the body. In other words, a structure measured on a surface is representative of a structure within a volume of the bulk sintered ceramic body comprising YAG and in embodiments further comprising aluminum oxide. Thus, sintered ceramic bodies comprising the YAG phase in amounts from 90 to 99.7%, preferably from 90 to 99.5%, preferably from 90 to 99.3%, preferably from 95 to 99.7%, preferably from 95 to 99.5%, preferably from 95 to 99.3%, each by volume, may be formed using the materials and methods as disclosed herein. In further embodiments, sintered ceramic bodies comprising the YAG phase in amounts as specified may further comprise porosity in an amount by volume of from 0.1 to 0.3%, and aluminum oxide in an amount by volume of from 0.2 to 0.4%.

FIG. 25b) shows the % of theoretical density for YAG and the density variation across a greatest dimension for a sintered ceramic body according to sample 506 of Example 11 as disclosed herein. The calcined powder mixture 20261 was disposed inside a volume defined by a tool set of a sintering apparatus as disclosed herein, and vacuum conditions of from $10^{-2}$ to $10^{-3}$ torr were created inside the volume. The calcined powder mixture inside the volume was heated at 5° C./minute to 800° C., at which temperature a pressure of 5 MPa was applied, then simultaneously heat was applied at a heating rate of from about 2 to about 3° C./minute and pressure was applied at a rate of from about 0.2 to about 0.25 MPa/min to reach the sintering conditions of 1650° C. and 15 MPa for 60 minutes to form a polycrystalline YAG sintered ceramic body in a disc shape having 622 mm greatest dimension or diameter. Density measurements were performed in accordance with ASTM B962-17 from samples cut across a radius of the sample and the density results are as illustrated in FIG. 25*b*. Five measurements each were taken at 6 locations along the radius, and an average density of 4.546 g/cc was measured, corresponding to 99.783% of theoretical for YAG, and volumetric porosity of 0.217%. Densities across the radius were from 99.7 to 99.9% of theoretical for YAG. The variation in density as depicted in FIG. 25*b*) was measured relative to the highest density measurement along the radius, and a maximum variation in density of 0.208% was measured. During sintering of the calcined powder mixture, pressure and temperature are applied in a radially symmetric configuration. Thus, properties such as high density (≥99% of theoretical for YAG) and minimal density variation (≤0.21%) are maintained across a radius, and also correspondingly across a diameter or greatest dimension of the sintered ceramic body. Thus, disclosed herein is a sintered ceramic body having an average density of 4.546 g/cc, ranging in density across a diameter from 99.7 to 99.9% of the theoretical density for YAG, comprising average volumetric porosity of 0.217%, and having a maximum density variation of 0.208% and less across the diameter of the sintered ceramic body.

A number of embodiments have been described as disclosed herein. Nevertheless, it will be understood that various modifications may be made without departing from the spirit and scope of the embodiments as disclosed herein. Accordingly, other embodiments are within the scope of the following claims.

What is claimed is:

1. A sintered ceramic body comprising from 90 to 99.9% by volume of polycrystalline yttrium aluminum garnet (YAG) as measured using XRD and image processing methods and a volumetric porosity of from 0.1 to 4% as calculated from density measurements performed in accordance with ASTM B962-17, wherein the sintered ceramic body has a greatest dimension of from 350 mm to 622 mm and has an average hardness of from 13.5 to 14.5 GPa using an applied load of 0.2 kgf as measured in accordance with ASTM Standard C1327, wherein the average hardness is calculated from 8 measurements.

2. The sintered ceramic body of claim 1 wherein the volumetric porosity is from 0.1 to 0.5%.

3. The sintered ceramic body of claim 1 wherein the sintered ceramic body comprises pores having a maximum pore diameter of from 0.1 to 0.6 pm as measured using SEM and image processing methods.

4. The sintered ceramic body of claim 1 wherein the polycrystalline yttrium aluminum garnet is present in an amount of from 90 to 99.4% by volume.

5. The sintered ceramic body of claim 1 having a purity of 99.995% or higher as measured using ICPMS methods.

6. The sintered ceramic body of claim 5 wherein the purity is 99.999% or higher.

7. The sintered ceramic body of claim 1 wherein the total impurity content is 10 ppm or less relative to the total sintered body mass as measured using ICPMS methods.

8. The sintered ceramic body of claim 1 wherein the sintered ceramic body comprises silica in an amount of about 14 ppm relative to the total mass of the sintered ceramic body as measured using ICPMS methods as disclosed herein.

9. The sintered ceramic body of claim 1 further comprising at least one crystalline phase selected from the group consisting of yttrium aluminum perovskite (YAP) and yttrium aluminum monoclinic (YAM) and combinations thereof, wherein the at least one crystalline phase is present in an amount of from 0.1 to 2% by volume.

10. The sintered ceramic body of claim 1 having an arithmetical mean height (Sa) of about 12 nm or less on a surface as measured in accordance with ISO standard 25178-2-2012, section 4.3.2.

11. The sintered ceramic body of claim 10 wherein an arithmetical mean height (Sa) is about 20 nm or less on the surface when exposed to an etch method having a pressure of 10 millitorr, a bias of 600 volts, ICP powder of 2000 watts, the etch method further comprising a first etch step having a $CF_4$ flow rate of 90 standard cubic centimeters per minute (sccm), an oxygen flow rate of 30 standard cubic centimeters per minute (sccm), an argon flow rate of 20 standard cubic centimeters per minute (sccm), and a second etch step having an oxygen flow rate of 100 standard cubic centimeters per minute (sccm) and an argon flow rate of 20 standard cubic centimeters per minute (sccm) wherein steps one and two are performed for 300 seconds each and repeated for a combined duration of 6 hours.

* * * * *